United States Patent [19]

Ryan et al.

[11] Patent Number: 5,655,085
[45] Date of Patent: Aug. 5, 1997

[54] COMPUTER SYSTEM FOR AUTOMATED COMPARING OF UNIVERSAL LIFE INSURANCE POLICIES BASED ON SELECTABLE CRITERIA

[75] Inventors: Ronald D. Ryan, Wilton, Conn.; Ronald G. Marquart, Oakland, Calif.

[73] Assignee: The Ryan Evalulife Systems, Inc., Stamford, Conn.

[21] Appl. No.: 210,395

[22] Filed: Mar. 18, 1994

Related U.S. Application Data

[63] Continuation-in-part of Ser. No. 912,978, Aug. 17, 1992.

[51] Int. Cl.[6] .................................................. G06F 19/00
[52] U.S. Cl. ............................................. 364/401 R
[58] Field of Search ............................ 364/401, 406, 364/408; 395/925

[56] References Cited

U.S. PATENT DOCUMENTS

| | | | |
|---|---|---|---|
| 4,831,526 | 5/1989 | Luchs et al. | 364/408 |
| 4,839,804 | 6/1989 | Roberts et al. | 364/408 |
| 4,953,085 | 8/1990 | Atkins | 364/408 |
| 5,083,270 | 1/1992 | Gross et al. | 364/408 |
| 5,237,500 | 8/1993 | Perg et al. | 364/408 |

*Primary Examiner*—Donald E. McElheny, Jr.
*Attorney, Agent, or Firm*—Peter K. Trzyna

[57] ABSTRACT

A computerized system for initiating, processing, preparing, storing, and transmitting illustrations of universal life insurance. A computer accesses a database into which data is written and from which data is read, the data including information regarding the life to be insured, general applicant information, insurance information and predetermined text data for incorporation into insurance illustrations. The computer is operable by connecting to the database and at least one other digital computer, including input and display apparatus, to permit data to be entered in and retrieved from the database. The computer is also provided with the capability of merging entered or stored data with the predetermined text data to compile the data and text into output embodying an illustration of life insurance.

52 Claims, 48 Drawing Sheets

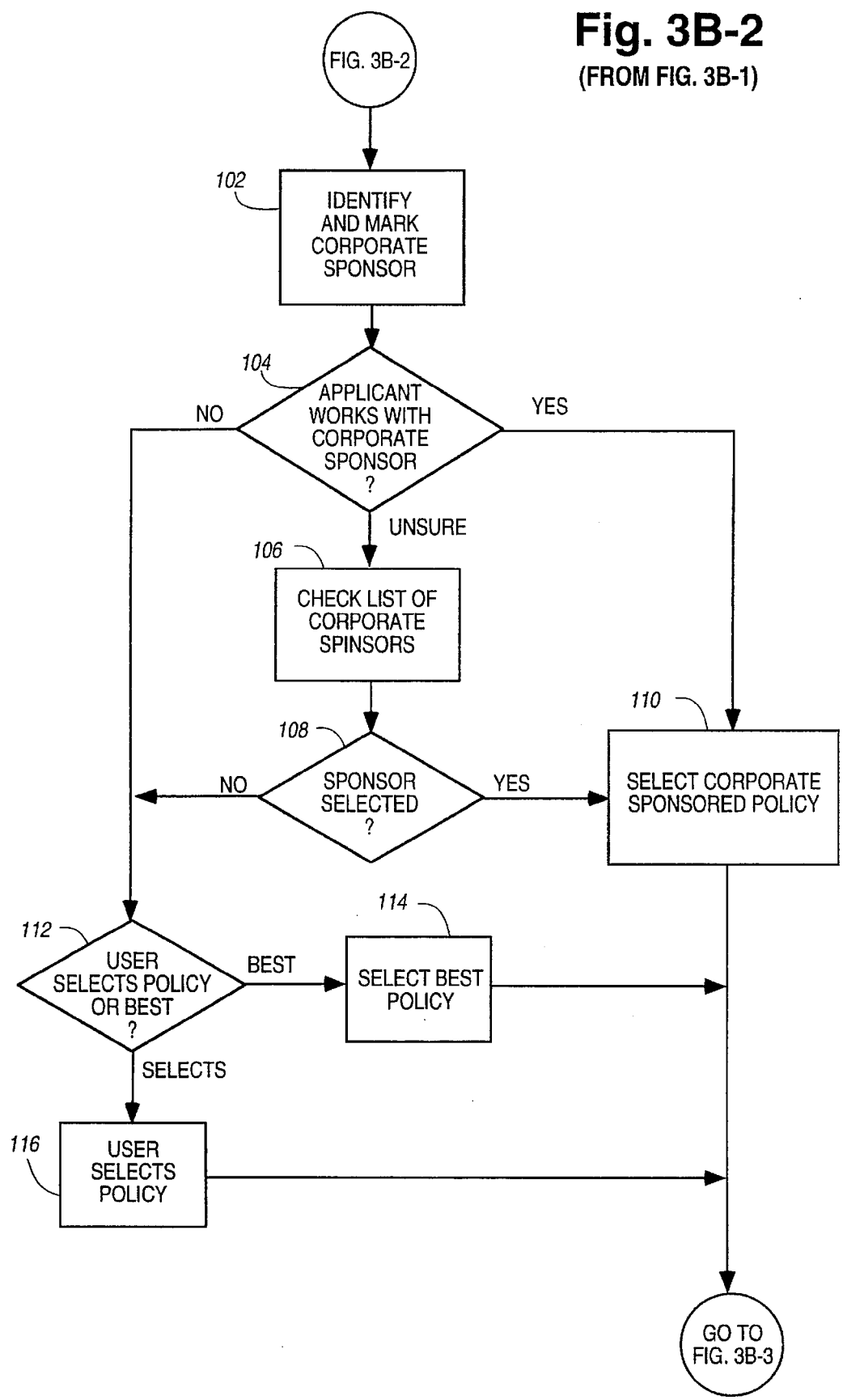

(FROM FIG. 3B-2)

(FROM FIG. 3B-3)

(FROM FIG. 3B-4)

(FROM FIG. 3B-5)

(FROM FIG. 3B-6)

(FROM FIG. 3B-7)

(FROM FIG. 3B-8)

Screen 1. Main Menu with Illustration Submenu

Fig. 6

| Policy Information |
| --- |

| | |
| --- | --- |
| Choose Policy Type: | Individual |
| | Joint & Survivor |

Screen 2. Selecting Policy Type

Fig. 7

```
┌─────────────────────────────────────────────────────────────┐
│                     Personal Information                    │
│                                                             │
│ Last Name:      _____ │
│ First Name:     _____ │
│ Middle Name:    _____ │
│                                                             │
│ Address:        _____ │
│                 _____ │
│                                                             │
│ City:           _____      State: __  Zip Code: _____ │
│                                                             │
│ Phone: _____             Date of Birth: _____        │
│                                                             │
│ Sex: __      Smoking: __     Marital Status: __             │
└─────────────────────────────────────────────────────────────┘
┌─────────────────────────────────────────────────────────────┐
│ F5-Help  F6-Main Menu  F7-Exit  F8-Cancel  PgUp-Last  PgDn-Next │
└─────────────────────────────────────────────────────────────┘
```

Screen 3. Personal Information

Fig. 8

```
                          Employer Information

Employer Name:    _____

Address:    _____

City:    _____  State: __ Zip: _____

Phone:    _____

Occupation:    _____

Title:    _____
```

| F5-Help  F6-Main Menu  F7-Exit  F8-Cancel  PgUp-Last  PgDn-Next |
|---|

Screen 4. Employer Information

Health Information

Simplified issue questions for Boseman Amorey Stella

[N]  Has the proposed insured applied for and been declined or postponed life insurance in the last 5 years?

[N]  Has the proposed insured ever been treated for, or been diagnosed as having deficiency of the immune system?

[N]  Has the proposed insured ever consulted or been treated by a physician for cancer?

Answer Y or N for each question

---

F5-Help  F6-Main Menu  F7-Exit  F8-Cancel  PgUp-Last  PgDn-Next

Screen 5. Health Questionnaire Input Screen - Insured

Fig. 10

| Insurance Requirements - Insured |
|---|

| Choose Two of the Following: |
|---|
| Minimum Death Benefit: _____ |
| Cash Value and Year Attained: _____  \_\_ |
| Yearly Payment: _____ |

| Number of Years Required to Pay in Full: \_\_ |
| or Pay Till Age: \_\_ |

Screen 6. Insurance Requirements - Insured

Fig. 11

| Additional Coverage - Insured |
|---|

Waiver of Premium Annual Benefit (Y/N): _____

Accidental Death Benefit: _____

Additional Death Benefit: _____

Spouse Death Benefit: _____

Screen 7  Additional Benefits - Insured

Fig. 12

| State in which policy will be issued: __ |
|---|

Screen 8. State Solicitation

Fig. 13

Select from a list of available policies or
allow system to choose the Best available policy:

[S(elect) / B(est)]? _

Screen 9. Select or Best Solicitation

Fig. 14

```
                    You have specified the following:

Policy Type: [Individual/Joint/Survivor]

Insured        Co-Insured
Date of Birth                            _____       _____
Sex                                          _               _
Smoking                                      _               _
Marital Status                               _               _
# of Indemnity Exceptions                    _               _
Minimum Death Benefit                    _____
Cash Value                               _____
Years for Cash Value                         _
Number of Years to Pay                       _
Yearly Payment - Base Policy             _____
Riders
      Waiver of Premium                  _____
      Accidental Death                   _____
      Additional Death Benefit           _____
      Spouse Death Benefit               _____

Check/Correct Values, PgDn - Start Calculation, PgUp - Cancel, F5 - Help
```

Screen 10. Summary of Parameters

Screen 11. Progress Report for Best Policy Selection

Fig. 16

| Company Name | Policy Name | Yearly Payment | Total Insurance Payments | Moody's Rating |
|---|---|---|---|---|
| | | Choose Best Policy | | |

Available Insurance Policies
Find: _____

| Company Name | Policy Name | Yearly Payment | Total Insurance Payments | Moody's Rating |
|---|---|---|---|---|
| Beneficial Mutual | Life Strat II | 15,000.00 | 350,000.00 | AA |
| GA Mutual Life | Life M-2 | 15,350.00 | 357,600.00 | AAA |
| Providential Life | Safety-Life | 16,475.00 | 382,000.00 | AA+ |
| Metro Life | Retire Roll | 17,000.00 | 396,500.00 | AAC |
| Voyage Life | Zero Sprd | 18,500.00 | 403,000.00 | AAB |
| Gibralter Life | Rock Solid | 18,560.00 | 404,400.00 | AA+ |
| ANGIC | GTD Return + | 18,700.00 | 405,000.00 | A |

Screen 12. Choosing a Policy from among the Best

Fig. 17

| Insurance Policy | | | | |
|---|---|---|---|---|
| Company Name | Policy Name | Current Rate | Guarntd Rate | Moody's Rating |

Available Insurance Policies
Find: _____

| | | | | |
|---|---|---|---|---|
| Beneficial Mutual | Life Strat II | 6.5 | 2.5 | AA |
| GA Mutual Life | Life M-2 | 7.25 | 2.5 | AAA |
| Providential Life | Safety-Life | 7 | 2.6 | AA+ |
| Metro Life | Retire Roll | 7.5 | 2.5 | AAC |
| Voyage Life | Zero Sprd | 8 | 2.6 | AAB |
| Gibralter Life | Rock Solid | 7.75 | 2.5 | AA+ |
| ANGIC | GTD Return + | 7.3 | 2.5 | A |

Screen 13. Choosing a Policy from Available Policies

Fig. 18

```
The Ryan Insurance Illustration System

Carrier Name

Policy Name

Illustration 4750 Developed for:

Stella Amorey
666 Greenwich Street
Apt. 933
New York, NY 10014

Insurance Assumptions:
Current                             Guarantees

Mortality:      1983 GAM            Mortality:    1980 CSO
  Percent:      100 %                 Percent:    100 %
Unloaned Credited Rate: 5.5 %       Unloaned Credited Rate: 2.5%
```

Screen 14. Online Insurance Illustration

Screen 15. Determining Whether to Create the Insurance Application

Insurance Application

Company Name

Policy Name

---

Question:
Beneficiary and Relationship

---

Answer:
Monty Stella - Husband

---

F5-Help   F6-Main Menu   F7-Exit   F8-Cancel   PgUp-Last   PgDn-Next

Screen 16  Insurance Application Question and Answer

Screen 17. Main Menu with Update Application Submenus

Screen 18. Main Menu with Update Application Design Submenus

Screen 19. Main Menu with Update Client Submenus

Screen 20 Main Menu with Illustration Submenus

Screen 21. Main Menu with Insurance Submenus

Fig. 26

| Evergreen Help Facility  Current Topic: Employment [1] |
|---|

| Enter the employer information requested on the screen for the applicant or the co-applicant. Please note that if the employer is already in our database you may retrieve the information merely by entering the first few letters of the employer name and then pressing the LIST key. You will be provided with a list of employers whose name starts with the letters that you enter. Select from this list by highlighting the appropriate employer by moving the UP and DOWN arrow keys and pressing the ENTER key to make the selection. If the application or co-applicant's employer is not in the database, merely enter the name and address information as requested. The occupation and title information is associated with the applicant or co-applicant. |
|---|

| [List] Choose Topic    [Help] Using Help    [Exit] Exit Help<br>[Down] Move Down  [--] At Top |
|---|

Screen 22. Help Message

THE EVALULIFE MORTGAGE ILLUSTRATION SYSTEM

ILLUSTRATION FOR THE PRODUCT OF:

ABC Insurance Company

---

Illustration 2026 Developed For:

Bozeman Amorey Stella
666 Greenwich Street
Apt. 933
New York, NY 10014

By:

ED FREES
ABC Realtors Inc
1 Realtors Way
Anytown, AZ 11111

---

INDIVIDUAL DATA FOR: Bozeman Amorey Stella

Age: 32
Sex: Male
Smoker: N

---

TARGET AND CALCULATED PARAMETERS:

| Target: | | Calculated: | |
|---|---|---|---|
| Death Benefit: | 300,000 | Death Benefit: | 304,651.39 |
| Premium: | | Premium: | 9,165.23 |
| No. of Years: | 4 | No. of Years: | 4 |
| Cash Value in Year 30: | 375,000 | Cash Value in Year 30: | 378,767.16 |

---

INSURANCE ASSUMPTIONS FOR: ABC Insurance Company

| Current Rates: | | Guarantees: | |
|---|---|---|---|
| Mortality: | 1983 GAM - 104 | Mortality: | 1980 CSO-N |
| Percent: | 100.00 % | Percent: | 100.00 % |
| Credited Rate: | 9.50 % | Credited Rate: | 4.00 % |

---

RIDERS

| Riders Selected: | Amount | Duration |
|---|---|---|
| Waiver of Stipulated Premium | N/A | N/A |
| Accidental Death Benefit | N/A | N/A |
| Additional Term Insurance (on Insured) | N/A | N/A |
| Additional Term Insurance (for Spouse) | N/A | N/A |

THE EVALULIFE MORTGAGE ILLUSTRATION SYSTEM

ILLUSTRATION FOR THE PRODUCT OF:

ABC Insurance Company

---

IMPORTANT COMMENTS CONCERNING THE ATTACHED ILLUSTRATION

The information contained in the attached illustration is based on both assumptions furnished by the client for whom it is developed and the current assumptions of the insurance plan chosen. Unless otherwise indicated, those rates assumed initially continue throughout the life of the illustration.

Premium costs may change if the purchase date differs from the one given. They may also change if any of the other assumptions used vary.

Premium payments are subject to change with variations in interest rates.

Interest rates credited on policy values and the cost of insurance charges may vary after the first year. Interest rates charged on policy loans and credited on loaned policy values also may vary after the first year.

The Ryan EvaluLife Illustration System cannot approve insurance applications. It can only forward life insurance applications to participating financial services institutions and provide you information as to their response.

The attached illustration should not be construed as, and is not offered as, legal, tax or investment advice. Please consult your accountant, tax advisor or legal counselor prior to entering into any transaction.

---

The data shown is based on both assumptions furnished by the client for whom it is developed and the current assumptions of the insurance plan chosen. These assumptions are shown on pages 1 and 2 of this illustration.

This illustration is based on these assumptions and is only valid with all pages attached.

THE RYAN EVALULIFE ILLUSTRATION SYSTEM

ILLUSTRATION FOR THE PRODUCT OF:

ABC Insurance Company

---

UNIVERSAL LIFE INSURANCE VALUES

---

Life Insurance has certain tax advantages. Under current law, cash value accumulation inside the policy is tax free. In addition, any death benefits paid out by the policy will be tax free. However, if you surrender the policy, you will have to pay taxes on that amount by which your policy's cash value exceeds the cumulative amount of premiums you have paid.

The projected values below are not guaranteed. Changes in interest credited rates and carrier expense charges could result in an increase or decrease in the projected values.

| Year | Premium | Death Benefit | Cash Value |
|---|---|---|---|
| 1 | 9,165.23 | 301,651.39 | 8,511.06 |
| 2 | 9,165.23 | 301,651.39 | 17,988.94 |
| 3 | 9,165.23 | 301,651.39 | 28,361.58 |
| 4 | 9,165.23 | 301,651.39 | 39,710.18 |
| 5 | 0.00 | 301,651.39 | 43,230.09 |
| 6 | 0.00 | 301,651.39 | 47,074.51 |
| 7 | 0.00 | 301,651.39 | 51,271.94 |
| 8 | 0.00 | 301,651.39 | 55,853.43 |
| 9 | 0.00 | 301,651.39 | 60,852.24 |
| 10 | 0.00 | 301,651.39 | 66,305.01 |
| 11 | 0.00 | 301,651.39 | 72,251.73 |
| 12 | 0.00 | 301,651.39 | 78,735.67 |
| 13 | 0.00 | 301,651.39 | 85,805.38 |
| 14 | 0.00 | 301,651.39 | 93,514.03 |
| 15 | 0.00 | 301,651.39 | 101,920.44 |
| 16 | 0.00 | 301,651.39 | 111,091.40 |
| 17 | 0.00 | 301,651.39 | 121,101.80 |
| 18 | 0.00 | 301,651.39 | 132,035.57 |
| 19 | 0.00 | 301,651.39 | 143,987.26 |
| 20 | 0.00 | 301,651.39 | 157,062.61 |
| 21 | 0.00 | 301,651.39 | 171,379.88 |
| 22 | 0.00 | 306,793.54 | 187,069.23 |
| 23 | 0.00 | 320,678.21 | 204,251.73 |
| 24 | 0.00 | 334,579.39 | 223,052.92 |
| 25 | 0.00 | 355,647.10 | 243,593.90 |
| 26 | 0.00 | 377,778.62 | 266,041.28 |
| 27 | 0.00 | 400,996.78 | 290,577.37 |
| 28 | 0.00 | 425,319.16 | 317,402.36 |
| 29 | 0.00 | 450,758.56 | 346,737.35 |
| 30 | 0.00 | 484,821.97 | 378,767.16 |

---

The data shown is based on both assumptions furnished by the client for whom it is developed and the current assumptions of the insurance plans chosen. These assumptions are shown on pages 1 and 2 of this illustration.

This illustration is based on these assumptions and is only valid with all pages attached.

Fig. 27D

```
THE RYAN EVALULIFE ILLUSTRATION SYSTEM

ILLUSTRATION FOR THE PRODUCT OF:

ABC Insurance Company
```

```
GUARANTEED LIFE INSURANCE VALUES
```

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued.

| Year | End of Year Cash Value | End of Year Death Benefit |
|---|---|---|
| 1 | 7,795.28 | 301,651.39 |
| 2 | 16,056.22 | 301,651.39 |
| 3 | 24,643.98 | 301,651.39 |
| 4 | 33,567.75 | 301,651.39 |
| 5 | 34,376.05 | 301,651.39 |
| 6 | 35,188.25 | 301,651.39 |
| 7 | 36,002.00 | 301,651.39 |
| 8 | 36,812.13 | 301,651.39 |
| 9 | 37,616.04 | 301,651.39 |
| 10 | 38,405.65 | 301,651.39 |
| 11 | 39,180.63 | 301,651.39 |
| 12 | 39,932.63 | 301,651.39 |
| 13 | 40,660.98 | 301,651.39 |
| 14 | 41,354.33 | 301,651.39 |
| 15 | 42,006.22 | 301,651.39 |
| 16 | 42,609.89 | 301,651.39 |
| 17 | 43,158.29 | 301,651.39 |
| 18 | 43,638.78 | 301,651.39 |
| 19 | 44,043.40 | 301,651.39 |
| 20 | 44,350.61 | 301,651.39 |
| 21 | 44,537.86 | 301,651.39 |
| 22 | 44,584.05 | 301,651.39 |
| 23 | 44,458.98 | 301,651.39 |
| 24 | 44,135.92 | 301,651.39 |
| 25 | 43,583.75 | 301,651.39 |
| 26 | 42,777.07 | 301,651.39 |
| 27 | 41,683.13 | 301,651.39 |
| 28 | 40,253.14 | 301,651.39 |
| 29 | 38,434.24 | 301,651.39 |
| 30 | 36,166.05 | 301,651.39 |
| 31 | 33,368.57 | 301,651.39 |
| 32 | 29,945.20 | 301,651.39 |
| 33 | 25,785.64 | 301,651.39 |
| 34 | 20,771.88 | 301,651.39 |
| 35 | 14,781.87 | 301,651.39 |
| 36 | 7,667.19 | 301,651.39 |

The data shown is based on both assumptions furnished by the client for whom it is developed and the current assumptions of the insurance plan chosen. These assumptions are shown on pages 1 and 2 of this illustration.

This illustration is based on these assumptions and is only valid with all pages attached.

Fig. 27E

| THE RYAN EVALULIFE ILLUSTRATION SYSTEM |
|---|
| ILLUSTRATION FOR THE PRODUCT OF: |
| ABC Insurance Company |

| LIFE INSURANCE COST INDICES |
|---|

An explanation of the intended use of these indices is provided in The Life Insurance Buyer's Guide. These indices are useful only for the comparison of relative costs of two or more similar policies.

The cost indices do not reflect any optional benefits.

|  | BASED ON GUARANTEED FACTORS | |
|---|---|---|
|  | 10 Year | 20 Year |
| SURRENDER COST INDEX @ 5% | 3.81 | 4.10 |
| NET PAYMENT COST INDEX @ 5% | 13.45 | 8.33 |

|  | BASED ON CURRENT FACTORS | |
|---|---|---|
|  | 10 Year | 20 Year |
| SURRENDER COST INDEX @ 5% | (3.20) | (6.66) |
| NET PAYMENT COST INDEX @ 5% | 13.45 | 8.33 |

The data shown is based on both assumptions furnished by the client for whom it is developed and the current assumptions of the insurance plan chosen. These assumptions are shown on pages 1 and 2 of this illustration.

This illustration is based on these assumptions and is only valid with all pages attached.

Fig. 28

EVALULIFE INSURANCE ILLUSTRATION SYSTEM

COMPARISON OF CASH VALUES FROM INSURANCE CARRIERS

| Name: | Stella Amorey | | | Initial face: | $262,000 |
|---|---|---|---|---|---|
| Sex: | F | | | Premium: | $6,313 |
| Birthdate: | February 14, 1959 | | | # of years: | 10 |
| Smoker: | N | | | | |

| Credit rate: | 6.50% | 7.25% | 7.00% | 7.50% | 8.00% | 7.75% | 7.30% |
|---|---|---|---|---|---|---|---|
| | Beneficial | GA Mutual | | | | | |
| Year | Mutual | Life | Providential | Metro | Voyage | Gibralter | ANGIC |
| 1 | 5,837 | 5,836 | 5,779 | 5,828 | 5,704 | 5,815 | 5,753 |
| 2 | 12,150 | 12,219 | 12,113 | 12,234 | 12,093 | 12,211 | 12,108 |
| 3 | 18,859 | 19,051 | 18,877 | 19,107 | 18,979 | 19,089 | 18,915 |
| 4 | 25,991 | 26,365 | 26,101 | 26,481 | 26,402 | 26,486 | 26,204 |
| 5 | 33,570 | 34,192 | 33,813 | 34,391 | 34,402 | 34,439 | 34,008 |
| 6 | 41,623 | 42,569 | 42,048 | 42,878 | 43,024 | 42,992 | 42,365 |
| 7 | 50,182 | 51,536 | 50,842 | 51,984 | 52,319 | 52,190 | 51,314 |
| 8 | 59,278 | 61,133 | 60,231 | 61,752 | 62,338 | 62,081 | 60,897 |
| 9 | 68,942 | 71,404 | 70,255 | 72,232 | 73,137 | 72,717 | 71,157 |
| 10 | 79,209 | 82,396 | 80,956 | 83,473 | 84,777 | 84,153 | 82,142 |
| 11 | 83,908 | 87,905 | 86,142 | 89,264 | 91,025 | 90,168 | 87,647 |
| 12 | 88,872 | 93,775 | 91,651 | 95,451 | 97,735 | 96,611 | 93,514 |
| 13 | 94,114 | 100,027 | 97,502 | 102,060 | 104,940 | 103,511 | 99,767 |
| 14 | 99,651 | 106,689 | 103,718 | 109,121 | 112,680 | 110,903 | 106,432 |
| 15 | 105,499 | 113,787 | 110,321 | 116,666 | 120,994 | 118,823 | 113,538 |
| 16 | 111,679 | 121,355 | 117,341 | 124,733 | 129,932 | 127,315 | 121,117 |
| 17 | 118,214 | 129,428 | 124,808 | 133,363 | 139,545 | 136,423 | 129,206 |
| 18 | 125,125 | 138,043 | 132,751 | 142,598 | 149,887 | 146,196 | 137,842 |
| 19 | 132,435 | 147,237 | 141,202 | 152,482 | 161,017 | 156,685 | 147,062 |
| 20 | 140,162 | 157,047 | 150,193 | 163,060 | 172,994 | 167,941 | 156,906 |
| 21 | 148,328 | 167,513 | 159,753 | 174,379 | 185,882 | 180,020 | 167,413 |
| 22 | 156,952 | 178,676 | 169,918 | 186,490 | 199,751 | 192,981 | 178,626 |
| 23 | 166,057 | 190,583 | 180,722 | 199,448 | 214,678 | 206,891 | 190,591 |
| 24 | 175,668 | 203,284 | 192,206 | 213,315 | 230,748 | 221,821 | 203,360 |
| 25 | 185,812 | 216,836 | 204,416 | 228,161 | 248,056 | 237,853 | 216,993 |
| 26 | 196,521 | 231,303 | 217,402 | 244,061 | 266,710 | 255,079 | 231,553 |
| 27 | 207,830 | 246,754 | 231,221 | 261,103 | 286,827 | 273,600 | 247,113 |
| 28 | 219,778 | 263,270 | 245,935 | 279,382 | 308,541 | 293,528 | 263,753 |
| 29 | 232,405 | 280,935 | 261,611 | 299,004 | 331,999 | 314,990 | 281,561 |
| 30 | 245,760 | 299,848 | 278,328 | 320,086 | 357,367 | 338,126 | 300,637 |

Note: These values are based on current credited rates. Carrier current credited rates will change annually, but will never fall below the guaranteed rates under the policy. Ask for an illustration of current and guaranteed performance before buying any policy.

Fig. 29A

Metro Life Insurance Corporation Application For
Anytown, USA                            Life Insurance  Part 1   F000-0  N° 000000

All information requested below pertains to the proposed insured unless stated otherwise.

1. a) Name <u>Bozeman Amorey Stella</u>  b) Sex ■ M ☐ F  c) SS# <u>123-45-6798</u>
   d) Use unisex rates? ☐ Yes ■ No   e) Married? ☐ Yes ■ No
   f) U.S. citizen? ■ Yes ☐ No  g) Place of Birth _____ _____  h) Date of Birth  <u>12/05/59</u>
                                                    (City)   (State)                    Month Day Year
2. a) Residence <u>666 Greenwich St. Apt. 933  N.Y.</u>  <u>Manhattan</u>   <u>NY</u>   <u>10014</u>
              (No. and Street)              (City)     (County)     (State)   (Zip Code)
   b) Business <u>3000 Ocean St.  Millvale</u>    <u>Fairfield</u>   <u>CT</u>   <u>01234</u>
              (No. and Street)        (City)        (County)      (State)   (Zip Code)
3. Policy a) Plan <u>Whole Life</u>   b) Face/Specified Amt. $ <u>262,000</u>
4. Employer Sponsored Plan? a) ☐ Yes ■ No  b) Normal Retirement Age ___  c) Policy Year Date ___
5. Extra Benefit Riders (check if desired):
   ☐ Total Disability Benefit            ☐ Additional Purchase Protection $ ___
   ☐ Accidental Death Benefit $ ___      ☐ Other ___
6. Premium/Billing                                              (mark only one)
   a) Notice to insured at 2a? ■ Yes ☐ No (Enter Below)  b) Bill Type & Frequency  ■ Direct-A-/ S / Q
      Name: ___                                                 ☐ List  A / S / Q / M
      Address: ___                                              ☐ AMP Monthly Only
              (Street and No.)
      _____ _____ _____
        (City)      (State)    (Zip Code)
7. Automatic Loans? ■ Yes ☐ No
8. Dividend Plan: ☐ Addition  ☐ Cash  ☐ Premium reduction  ☐ Other: ___
9. Beneficiary
   a) At death of the proposed insured (give relationship for (2) below):
      ☐ 1) the owner  ■ 2) <u>Frank Stella - brother</u>
      _____
   b) At the maturity date: the owner
10. a) Owner: ■ 1) the insured   ☐ 2) ___
    b) Owner Social Security/Tax ID # <u>123-45-6798</u>
11. a) Present occupation & duties: <u>Insurance broker</u>
    b) In the last 90 days were you absent from your place of employment or not performing the customary
       duties of your occupation for at least 35 hours a week due to illness, injury, treatment, surgery, or
       observation? ☐ Yes ■ No  (If "Yes," explain in #21)
12. Present life insurance amount $ <u>100,000</u>       ADB $ <u>100,000</u>

|  | YES | NO | Remarks & details of "YES" answers |
|---|---|---|---|
| 13. If this policy is issued, will any existing insurance or annuity be replaced, changed, or borrowed against? (Indicate Company and amount) | ☐ | ■ | |
| 14. Has any application for insurance on your life been declined, or has any policy been issued other than as applied for? | ☐ | ■ | |
| 15. Do you plan to travel or live outside the U.S.A. within the next 12 months? | ☐ | ■ | |
| 16. Have you, within the past 3 years: | | | |
| a) flown as a pilot or crew member in any type of aircraft? | ·☐ | ■ | |
| b) engaged in parachuting, racing, scuba diving or hang gliding? | ■ | ☐ | scuba diving |
| c) been charged with any motor vehicle moving violation? | ☐ | ■ | |

F000-0                                                   (Continued on another page)

Fig. 29B (Continuation of Application)

|  | YES | NO | Remarks & details of "YES" |
|---|---|---|---|
| 17. Have you used any tobacco products: | | | |
| a) in the past 12 months? | ■ | ☐ | 1/2 pack a day |
| b) in the past 24 months? | ■ | ☐ | 1/2 pack a day |
| (If "Yes," indicate type & amounts) | | | |

18. a) Height  5'11"        b) Weight  185 lbs.
19. Name and address of personal physician(s)  Dr. Frank N. Stein
    Millvale, CT
    (Please indicate date, reason last consulted, diagnosis and treatment in #21)

20. Have you:                                                                                       YES    NO
    a) Ever had any signs of or been treated for high blood pressure, chest pain, diabetes,
       tumor, cancer or other disorder of the heart, digestive system, lungs, kidneys, or liver?    ☐      ■
    b) Received treatment for, or been advised to reduce the use of alcohol or drugs, or ever
       used drugs other than prescribed by a doctor? .................................                ☐      ■
    c) Within the past 5 years, consulted a physician for any other physical or emotional
       disorder or illness, had any surgery, or been a patient in a hospital? ...........            ☐      ■
    (If "Yes," give details in #21)

21. Remarks, details and special requests:

_____
_____
_____
_____
_____
_____
_____
_____
_____
_____

I have received a Notice of Insurance Information Practices.

Each of the undersigned represents that all of the statements above are true and complete to the best of his/her knowledge and belief. It is agreed that: a) this and any amendments or supplements to it is the application and is the basis of the policy; b) if there is no prepayment, the policy will take effect only if, at the time the first premium is paid, the insured is alive, and all the statements above which are material to the risk are still true and complete to the best of the undersigneds' knowledge and belief; and c) only an officer of the Company can legally bind the company or waive any of its rights or requirements.

Payment to any trustee designated herein will discharge the company from all liability. The Company will not be responsible for the proper discharge of the trust or any of its terms.

Witness  Horace L. Dagent                              Proposed
         (Licensed Resident Agent where required)      Insured  _Bozeman Amorey Stella_
                                                                (Sign)

Applicant/
Dated  January 15, 1992                                Owner _____
                                                              (If other than Proposed Insured)

At  ___Millvale___   ___CT___                          By: _____
        (City)         (State)                                (Title)

F000-0

COMPUTER SYSTEM FOR AUTOMATED COMPARING OF UNIVERSAL LIFE INSURANCE POLICIES BASED ON SELECTABLE CRITERIA

This is a continuation in part of U.S. patent application Ser. No. 07/912,978 having a filing date of Aug. 17, 1992.

BACKGROUND OF THE INVENTION

A. Technical Field of the Invention

This invention generally relates to a computerized system for preparing and processing multiple universal life insurance quotes and for preparing and processing universal life insurance applications, based upon those quotes. More particularly, the present invention relates to a machine, manufacture, process, and improvement thereof.

More particularly, this invention relates to a computer system for preparing, processing and transmitting life insurance premium quotes as part of a mortgage calculation in support of a new financial product. In the new financial product, life insurance is used as collateral and a means for repayment of a mortgage, and facilitates the purchase of real estate without (or with a greatly reduced) down payment. The invention includes automated aspects of the use of premiums paid on life insurance as a substitute for the initial down payment on a mortgage, the use of life insurance policy death benefits to retire the mortgage upon the death of the borrower, the use of accumulated cash values to retire the outstanding principal on a mortgage in the event of the borrower's survival, and the services of storage and transmission of data for all of the foregoing.

B. Background of the Invention

Prior to the present invention, insurance quotes for term life insurance, health insurance, and dental insurance were available from a single computer, but universal life insurance quotes were not known to be available.

Using such single-computer based systems, insurance sellers of annuities, health policies, and term life insurance could request quotes from a large data base of insurance carriers' products. The computer computes the price of a particular financial product offered by a particular carrier for a given customer of a given age, sex, and health, or insured population profile. Then the computer repeats this operation for a large number of different insurance companies. Comparing the values so calculated for a larger number of different carriers' insurance products has permitted the computer to automatically identify that product which provides the best value for the consumer. This also permitted the seller to provide the insurance purchaser with the least expensive quote with a minimum of effort.

Companies which have developed and used technology of this kind include Quotesmith, in Palatine, Ill., Group Benefit Shoppers in Boulder, Colo., Dinan in San Jose, Calif., Select Quote in San Francisco, Calif., and Insurance Information Inc. in Lowell, Mass. Quotesmith, Group Benefit Shoppers and Dinan operate primarily in the group medical field, identifying the best policy for brokers and agents seeking to offer competitive quotes. Quotesmith also uses its technology to provide a similar service to brokers wishing to identify the best term life insurance, single premium deferred annuity, individual medical insurance, and group dental insurance policies. Select Quote offers to find the lowest cost quote for a term life insurance policy, selling insurance to the general public on a discount basis. Insurance Information Inc. offers to find the best term life insurance policy for a fee. See "New Firms Offer Computer Listings Of Insurance Prices: Both Have National Ambitions; Both Are Interested in Affiliations with Banks," *American Banker*, Oct. 3, 1985, Pg. 1; "Here's how to find cheaper and better health insurance," *Medical Economics*, Mar. 19, 1990, Pg. 109; and "Health quoters target agents," *National Underwriter Property & Casualty Risk-Benefits Management*, Aug. 28, 1989, Pg. 9.

While companies have discussed a desire to have the ability to quote homeowners' insurance, a form of universal life insurance, as early as 1985, as of September 1993, no company or individual has been known to find a way to provide multiple universal life insurance quotes to the public in the United States from a single computer, let alone use that ability to identify the best product.

Instead, insurance agents, insurance brokers, and others representing individuals wishing to purchase universal life insurance policies have been forced to go to many different insurance companies to request quotes. Once received, these universal life insurance quotes have been difficult to compare. Differences in the way these carriers calculate the universal life insurance values have made product comparisons difficult. As a result, insurance sellers have been forced to conduct lengthy and time-consuming analyses to establish which was the best product for the customer. But in view of the aforementioned technological limitations and a fragmented life insurance industry with more than 5,000 carriers, brokers and agents work with only a few carriers. They have not had the ability to search out the best product for their customers. This has become increasingly problematic as product complexity has grown in the universal life insurance industry. Indeed, in some cases unscrupulous agents have taken advantage of increasing complexity in products to further their own unethical ends. In "Investigating Agents," *Best's Review*, September, 1993, pp. 29–30, the authors, Stefan E. Keller and Tony D'Orazio, pointed out, "The intricacies of these [life insurance] products require that agents and brokers be more educated than ever to be able to adequately represent the products to consumers. At the same time, the growing complexity increases the probability that products will be represented in an unethical fashion." In the absence of a systematic means for computing universal life insurance values and comparing products, a consumer purchasing a universal life insurance policy has little to assure himself or herself that he or she has purchased the best policy.

Once a seller has identified the appropriate product for an individual from one of the thousands of policies available, the process of completing the life insurance carrier's application forms and obtaining underwriting approval for the product can take weeks or months. Because carriers have different insurance forms, and no system has been designed to accommodate the different policies and their associated forms, even if a consumer, agent, or broker identifies the best policy, he or she might not have the appropriate policy forms on hand to initiate an application. He or she and would have to request these forms by mail and, having received them, complete them manually. Because many different carriers have different ways of assessing their underwriting risks, if the prospective insured is of less than perfect health, the agent or broker may have to request additional illustrations. (An illustration is a projection of estimated policy values over a defined period beginning in the present.) For example, a single "No" response to an underwriting question may trigger a rated policy with higher premiums. Such a policy rating would necessitate a new round of illustrations, starting the whole cycle of illustrations over again.

Given that a system for preparing and processing multiple universal life insurance quotes and for preparing and processing universal life insurance applications would be highly desirable, it would seem obvious that such a system should exist. However, there are several reasons that the aforementioned invention seems to have been elusive heretofore.

The first reason that multiple universal life insurance quotations have not been available from a single computer in the past has to do with, among other things, the mathematics of universal life insurance. Universal life insurance generally involve iteration computations, unlike health insurance, dental insurance, or term life insurance, where a strict linear relationship exists between a given set of insurance parameters (e.g., age, health characteristics, etc.) and the benefit cost. Therefore, product illustrations or projected values for those products require simply looking up the appropriate value in a data base structure based on a given set of product parameters. The best product, given the selection criteria presented, is always the cheapest product. However complicated, complexity of the design for such a system is limited to the requirements of table manipulation. In addition, the universal life insurance policy accumulates cash value. Universal life insurance is therefore a savings vehicle, and any system which produces universal life insurance illustrations must take into account the time value of money. The time value of money is an exponential, non-linear function. The relationships between the cash value accumulated by the policy, its death benefit, and the amount of premium needed to generate them, are also non-linear. They take into account the time value of money and other factors, such as Internal Revenue Service guidelines for the definition of insurance. Therefore, unlike term life insurance, health insurance and annuity products, such a system for illustrating universal life insurance cannot depend on tables of values which can be selected from using a simple set of selection parameters. Heretofore no system has been able to iterate sufficiently efficiently to find the lowest premium from among a large number of different universal life policies using a single, affordable computer.

A second reason that universal life quotes from multiple carriers have not been available from a single computer has to do with how universal life insurance calculations must be manipulated to solve for non-linear values. The best policy in a universal life insurance policy comparison can be determined in several ways other than by calculating the lowest premium. The best policy could also be a policy which remains in force for the longest period of time, given specific assumptions regarding interest rates and the insured person's longevity. On the other hand, the best policy could be the policy which provides the highest death benefit or cash value accumulation, given an assumed number of level premium payments over a stipulated period. Finally, the best policy could be the policy which provides the highest guaranteed rate of interest in times of low interest rates or the highest policy crediting rates during times of higher interest rates. The complexity of solving for these variables in a non-linear set of equations is an additional impediment to the development of such a system.

A third reason that universal life insurance quotes from multiple carriers have not been available from a single computer has to do with the way in which different life insurance carriers compute universal life insurance policy values. While most universal life policy illustration systems are structurally similar, many different carriers have different ways of computing the various elements of a life insurance policy. These different methods have evolved from actuarial conventions designed to reduce the complexity of computations prior to the age of computing, and, of course, through the process of product differentiation. For example, the way in which annual mortality rates are converted into monthly cost of insurance charges may be computed using a variety of different actuarial assumptions regarding the rate of deaths during the year. Some carriers assume deaths are evenly distributed across all twelve months. Other carriers assume more deaths at the end of the year. Other carriers assume the converse. Similarly, different carriers have different methods for calculating policy administrative expense charges and interest credited.

A fourth reason that universal life insurance quotes from multiple carriers have not been available from a single computer has to do with the way in which insurance is regulated. Each state has legal authority to regulate the way insurance is sold and the kind of insurance that is sold within its boundaries. Therefore, each product sold must be filed with the state insurance commissioner's office. Each state may require that universal life insurance policies have values that are calculated in different ways. For example, some states may require the use of unisex tables in computing mortality costs even though traditional actuarial principles might dictate otherwise. Other states might require different minimum guarantees in terms of the maximum insurance costs that a carrier may charge. Because in the United States an insurance quote system must be able to provide insurance quotes in more than one state in order to justify the cost of development, such state by state differences (added to the aforementioned product by product differences) increase the difficulty of developing a system for finding the best universal life insurance quote from a single computer.

OBJECTS OF THE INVENTION

Therefore, it is an object of the present invention to provide a machine, manufacture, process, and improvement thereof in which an electrical signal processing system processes and modifies electrical signals representing data so as to overcome the aforementioned disadvantages of prior art systems and construct and manipulate multiple universal life insurance quotes by electrical engineering means.

Another object of this invention is to provide a machine, manufacture, process, and improvement thereof in which a computerized system is capable of using iteration to efficiently arrive at the correct amount of a universal life insurance policy premium and, indeed, amounts for other universal life insurance policies as well.

Yet another object of the invention is to provide a machine, manufacture, process, and improvement thereof in which a computerized system is capable of comparing multiple universal fife insurance quotes in order to identify the policy which best fits a given consumer's needs as defined, for example, by the lowest premium, highest cash value, highest policy death benefit, or longest in-force policy life.

Yet another object of the invention is to provide a machine, manufacture, process, and improvement thereof in which a computerized system is capable of taking into account a large number of different actuarial methods for computing universal life insurance policy values.

Yet another object of the invention is to provide a machine, manufacture, process, and improvement thereof in which a computerized system is capable of accommodating different universal life insurance values from different states.

Yet another object of the invention is to provide a machine, manufacture, process, and improvement thereof in which a computerized system is adapted for preparing and processing universal life insurance quotes from many policies based on underwriting information obtained in a single set of questions common to all carriers.

Yet another object of the invention is to provide a machine, manufacture, process, and improvement thereof in which a computerized system in which different carriers' universal life insurance application forms are available electronically, and may be completed electronically for the purpose of producing both paper and electronic applications to be sent to a carrier.

Various other objects, advantages and features of the present invention will become readily apparent from the ensuing detailed description, and the novel features will be particularly pointed out in the appended claims.

SUMMARY OF THE INVENTION

In accordance with the broad, general objects of this invention, a digital signal processing system processes and modifies electrical signals representing data to construct multiple universal life insurance quotes. Accordingly, the present invention involves processing information in a standardized manner, preferably to offer an individually selected universal life insurance product, the product being selected from a group of such products made available by different suppliers.

The system can, for example, be owned and operated by a suitably licensed national intermediary, for example, a broker or data processing company. The intermediary would work in conjunction with life insurance companies (and their agents and representatives) to design, develop, and distribute universal life insurance policies. The intermediary, operating nationally in cooperation with life insurance companies and utilizing the system provided by this invention, can facilitate the sale of the universal life insurance by agents accessing the system of this invention via remote terminals.

A user of the system can be an employee of the aforementioned intermediary providing illustrations requested by individuals outside of that firm. Alternatively, a user of the system can be an individual who has received special approval from the intermediary to use the system. (In a simplified version of the product, it is anticipated that an authorized user might even include a member of the general public, in states where the direct sale of insurance via computer is permitted.)

A central processing unit in an electrical digital computer is at the heart of the system. The central processing unit can access a database into which data is written and from which data is read. That data includes information regarding life insurance, actuarial information, insurance premium information, and predetermined text data for incorporation into the insurance illustrations. The computer system further includes information corresponding to requirements of laws and regulations governing insurance.

At least one, preferably multiple terminals are provided for communicating with the central processing unit, each terminal having input means, such as a keyboard, and a display, such as a cathode ray tube (CRT) or a video display terminal (VDT). Each terminal is operable by a user to produce requests and to enter information and/or retrieve information for writing into and/or reading from the database via the central processing unit. The central processing unit provides a means for enabling access to the database in response to predetermined information entered at the terminal by the user and is suitably programmed to recognize particular authorized users.

In accordance with one desirable aspect of the invention, information regarding a life to be insured and other data needed to provide an illustration of a universal life insurance policy for that individual is keyed into the computer system user using a keyboard at a video display terminal. To assist the user in entering the appropriate data, a series of data comprising a "form" is displayed on the user's terminal by the central processing unit, and the user will normally proceed to enter pertinent information in the blanks provided. This information constitutes such things as the potential insured's name and address, the amount of the mortgage requested, the amount of life insurance coverage required, the individual's age, sex, and health status, and any other information necessary in providing an illustration of a universal life insurance policy. This information is correlated via the central processing unit, resulting in the signal processing generation of premium quotation. This information is then displayed at the user's terminal and can be printed out on the user's printer. Thus, a prospective applicant is quickly apprised of information pertinent to the policy such as (but not limited to) what the premium payment would be.

Once data called for by the "form" is entered into the computer system at the user's keyboard, a client information file or database record (hereinafter "client file") is established which will be variously updated as the user conducts sensitivity analyses of the impact of different insurance-related assumptions on the ultimate amount of the premium payment. Once the prospective applicant decides to apply for a life insurance policy, a final version of the illustration is saved by the user in a master database file for later retrieval and processing.

After input data has been compiled in a client file, errors or omissions in that data (e.g., the amount of requested insurance may be too high, etc.) are detected. If these errors cannot be corrected immediately (for example, by supplying information from another file or record), further processing of the illustration request is suspended and the need for additional information is reported.

In the event that the prospective applicant wishes to proceed immediately to obtain the application for the insurance, the system is capable of taking the information stored in a final illustration database file, requesting a minimum of information otherwise not required in the illustration process (such as additional health information not taken in the initial illustration process) and merging it with prepared textual information about the insurance policy to generate printed application documents in a form acceptable to, and previously approved by, the insurance company. The system also permits the user to separately fill the forms out electronically. The application forms still can require signature by the prospective applicant, however. When signed, these forms are sent, for example, by mail or courier, to the system owner/operator (or carrier) for further processing. Should the prospective applicant wish to have this process expedited, the user may send the information on the signed forms electronically to a computer at the carrier, facilitating processing in advance of the receipt of the signed paper copies.

An alternative method for entering client data into the system, rather than by entering this data directly at a user's terminal, is to have the prospective applicant manually complete insurance illustration request forms which may or may not have been generated at the user's terminal. The request form can be sent by mail or courier to the system operator and entered by the user into the computer system.

By means of the aforementioned computer system, this invention makes it possible for the first time to offer the American consumer a universal life insurance policy which is verifiably the best policy to suit his or her needs. The need for such a capability is well documented: "There can hardly be a banker left in the United States who doesn't know that the insurance distribution system is costly, inefficient, and vulnerable to attack. There are more than 5,000 insurance companies in the United States, their products are sold one-on-one, and—although most of these products are commodities—their prices vary by hundreds of dollars," *American Banker*, Oct. 3, 1985, Pg. 1. While many have discussed creating such a system, it was left to the present inventor to conceive of a way to make the present invention.

BRIEF DESCRIPTION OF DRAWINGS, SCREENS, VARIABLES, AND SPECIMENS

The following description, given by way of example and not intended to limit the present invention solely to the described embodiments, will be best understood in conjunction with the accompanying drawings, computer or "user" screens, variables, and specimens incorporated herein.

Figures

FIG. 3B-1 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-2 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-3 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-4 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-5 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-6 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-7 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-8 is a portion of FIG. 3 that provides a flow chart of logic used in calculating and printing an individualized or "new" prospective applicant illustration tailored to the individual, and in creating a corresponding new prospective applicant data file, in accordance with the present invention.

FIG. 3B-9 is a portion of FIG. 3 that provides a flow chart of logic used in calculating and printing an individualized or "new" prospective applicant illustration tailored to the individual, and in creating a corresponding new prospective applicant data file, in accordance with the present invention.

Figure 1:
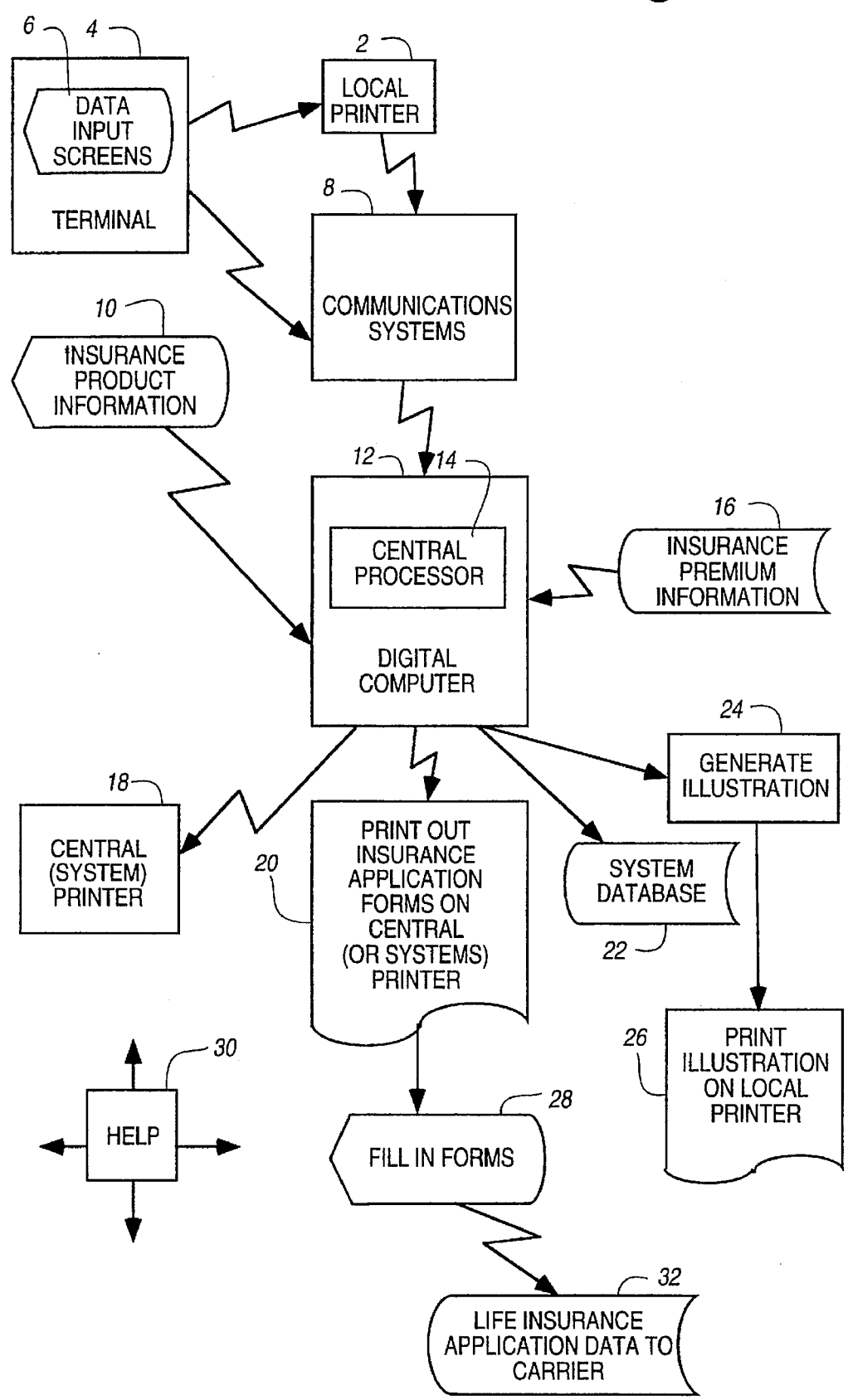
FIG. 1 is a schematic representation of the computerized insurance illustration system of the present invention.
Figure 3A:
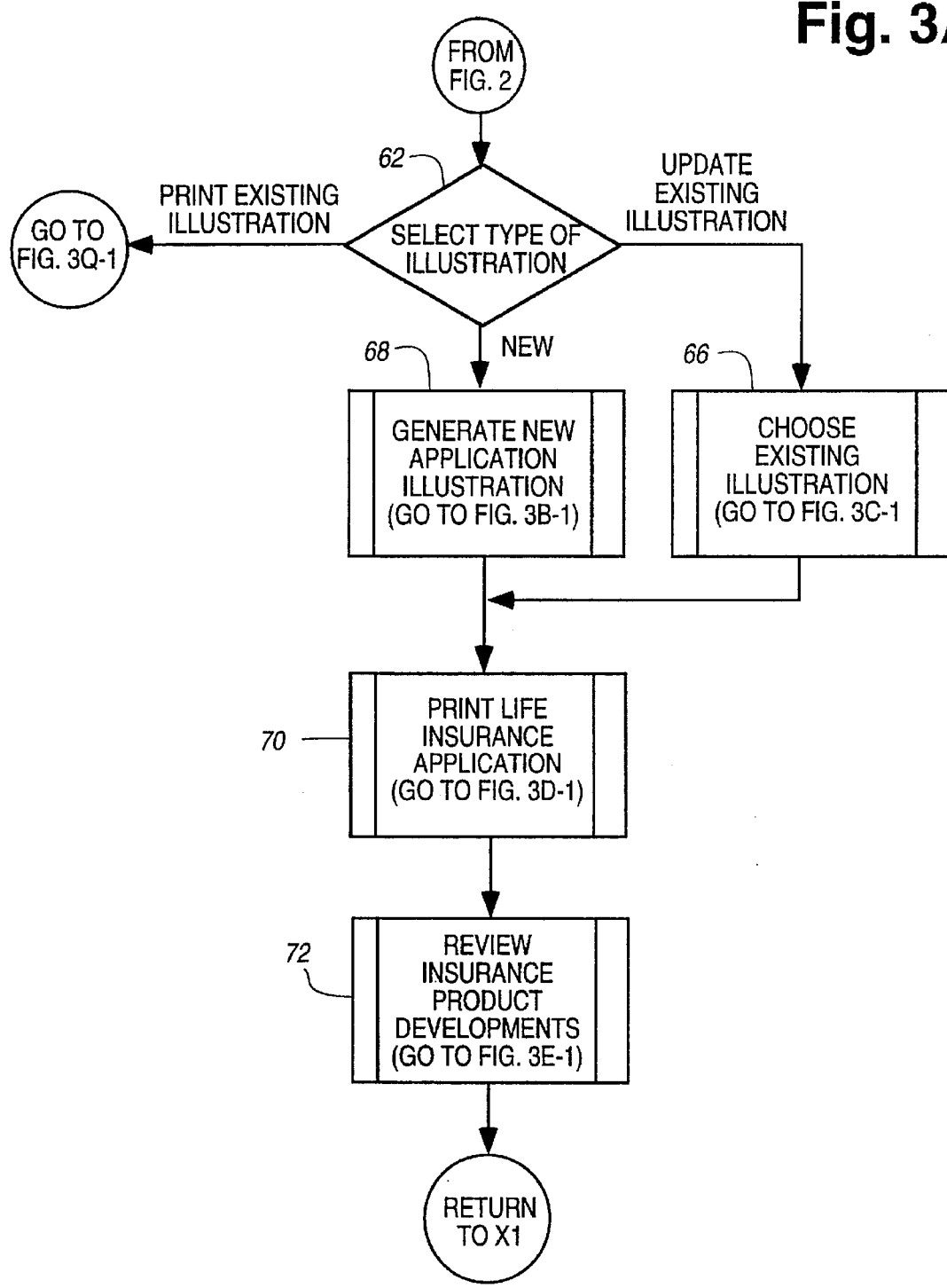
FIG. 3A depicts logic behind an illustration function of the present invention, as continued in FIGS. 3B-1-3F-1.
Figures 1, 3B:
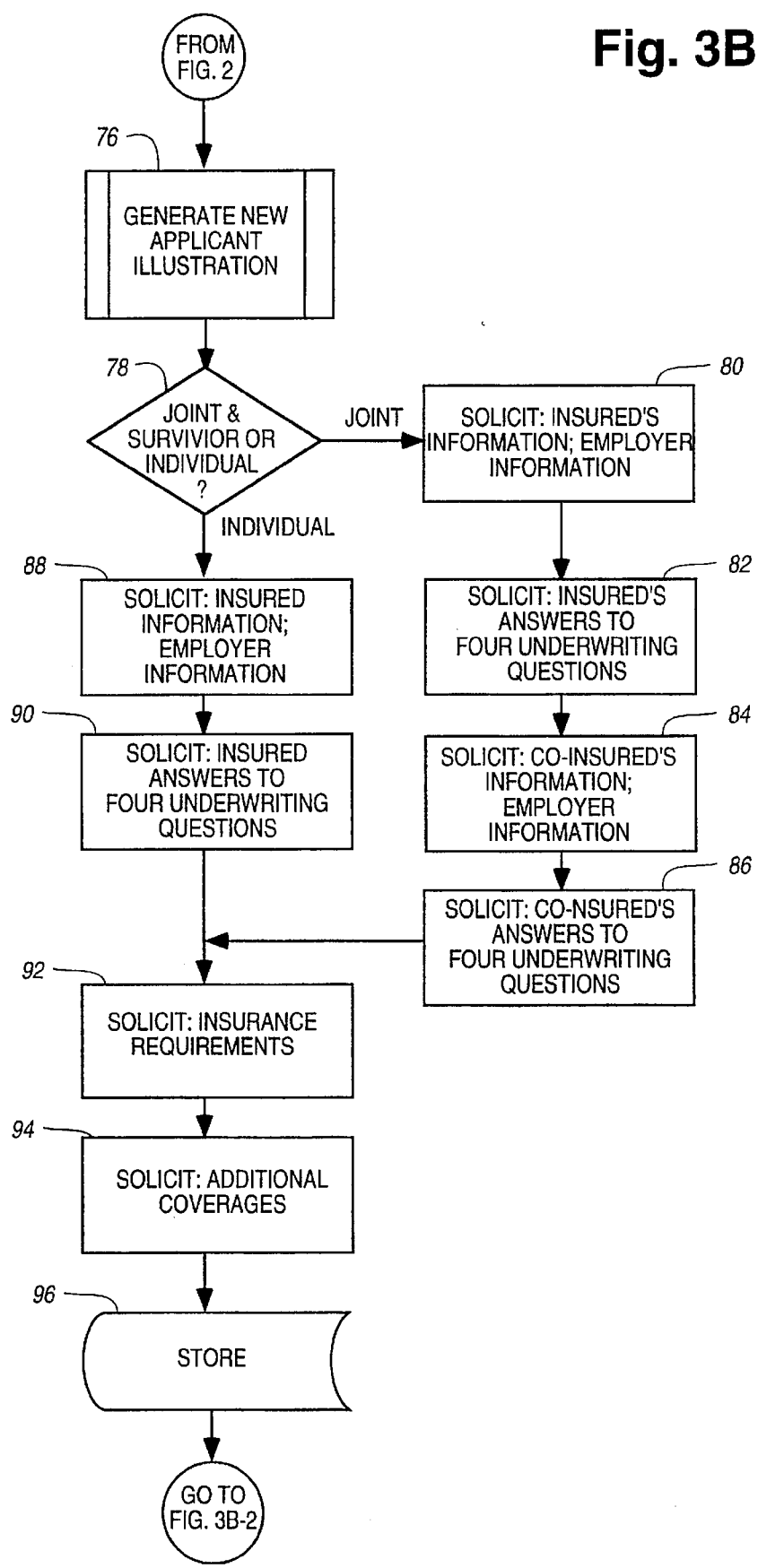
Figures 3, 3B:
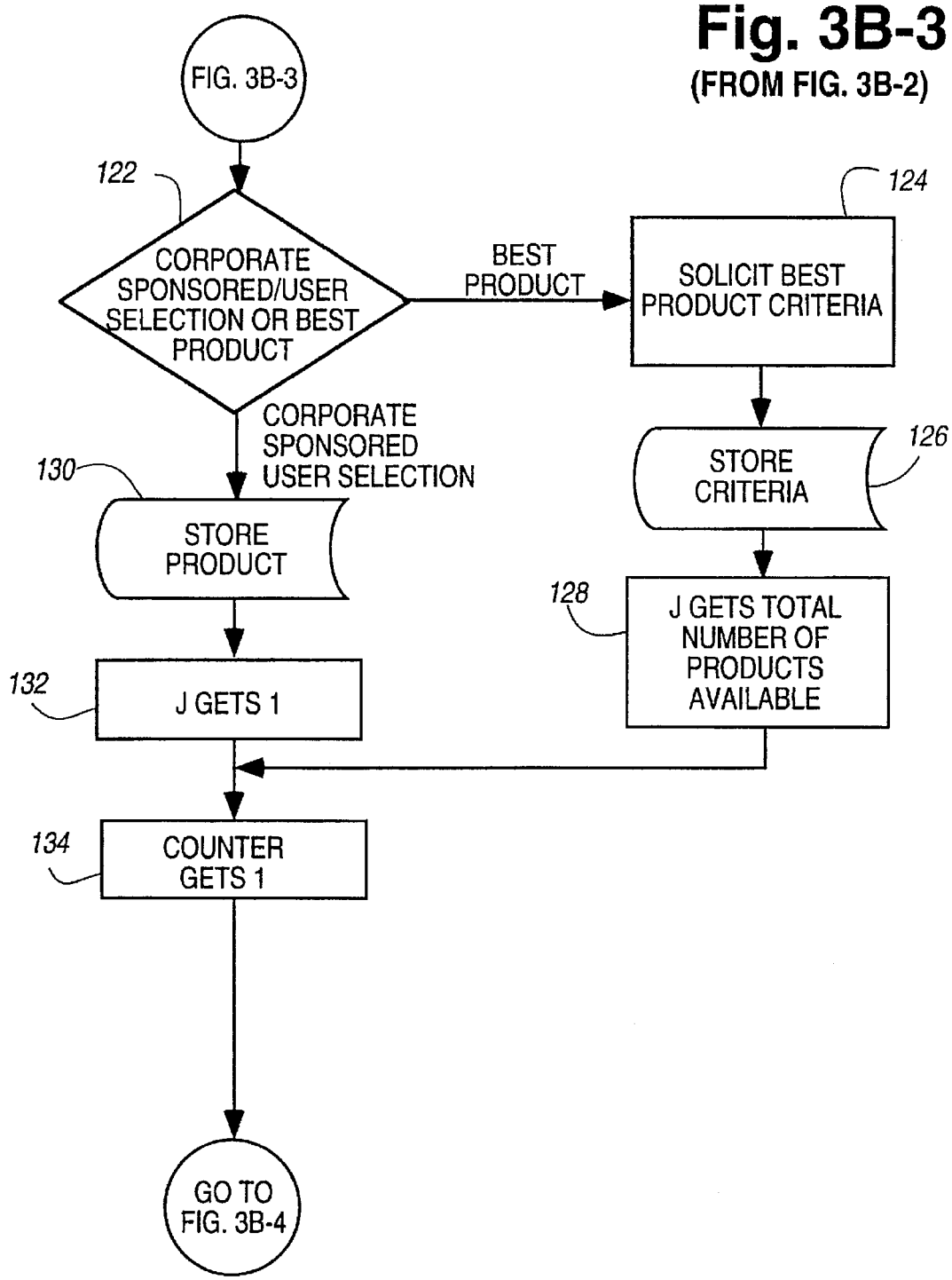
Figures 3, 3B, 4:
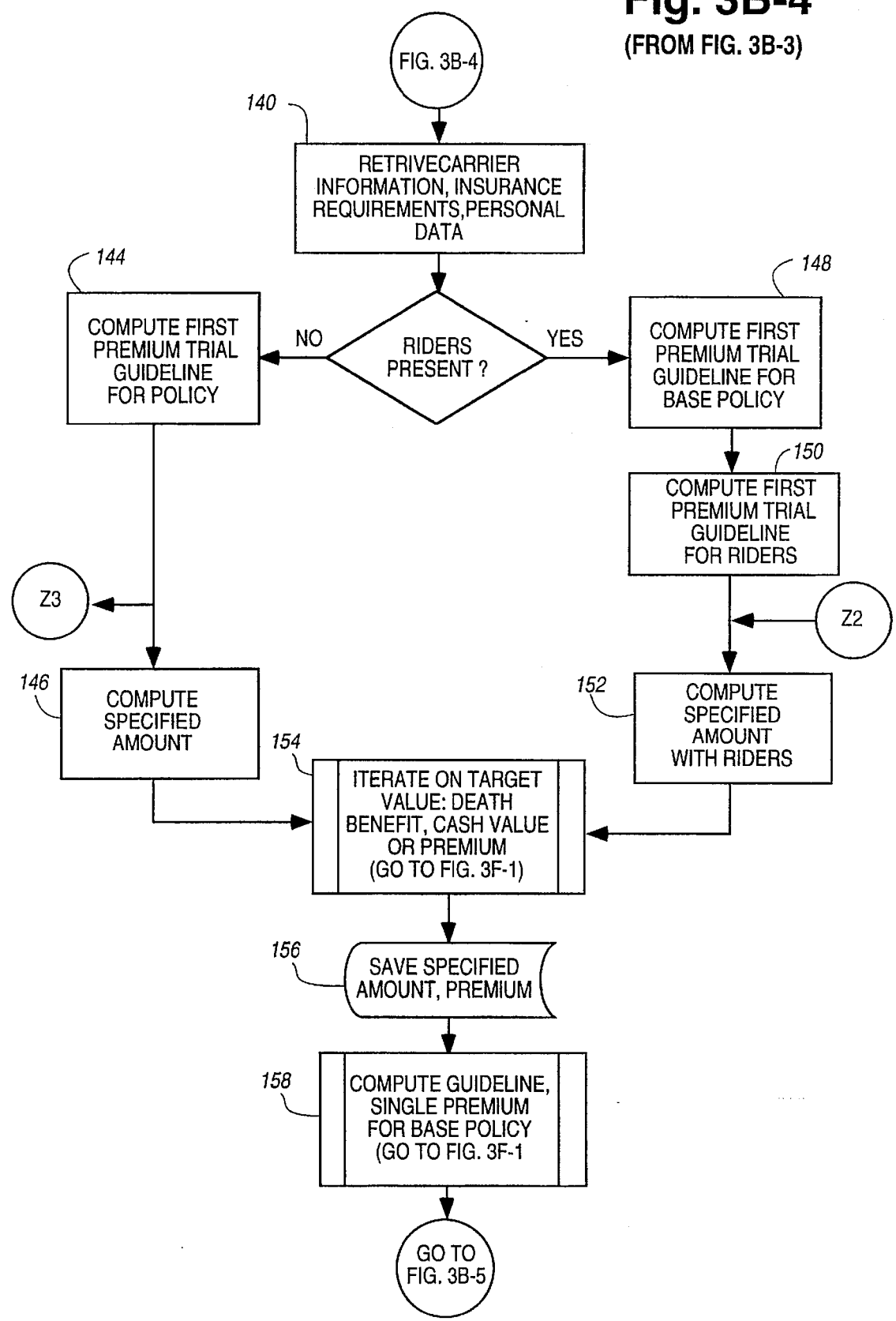
Figures 3, 3B, 4, 5:
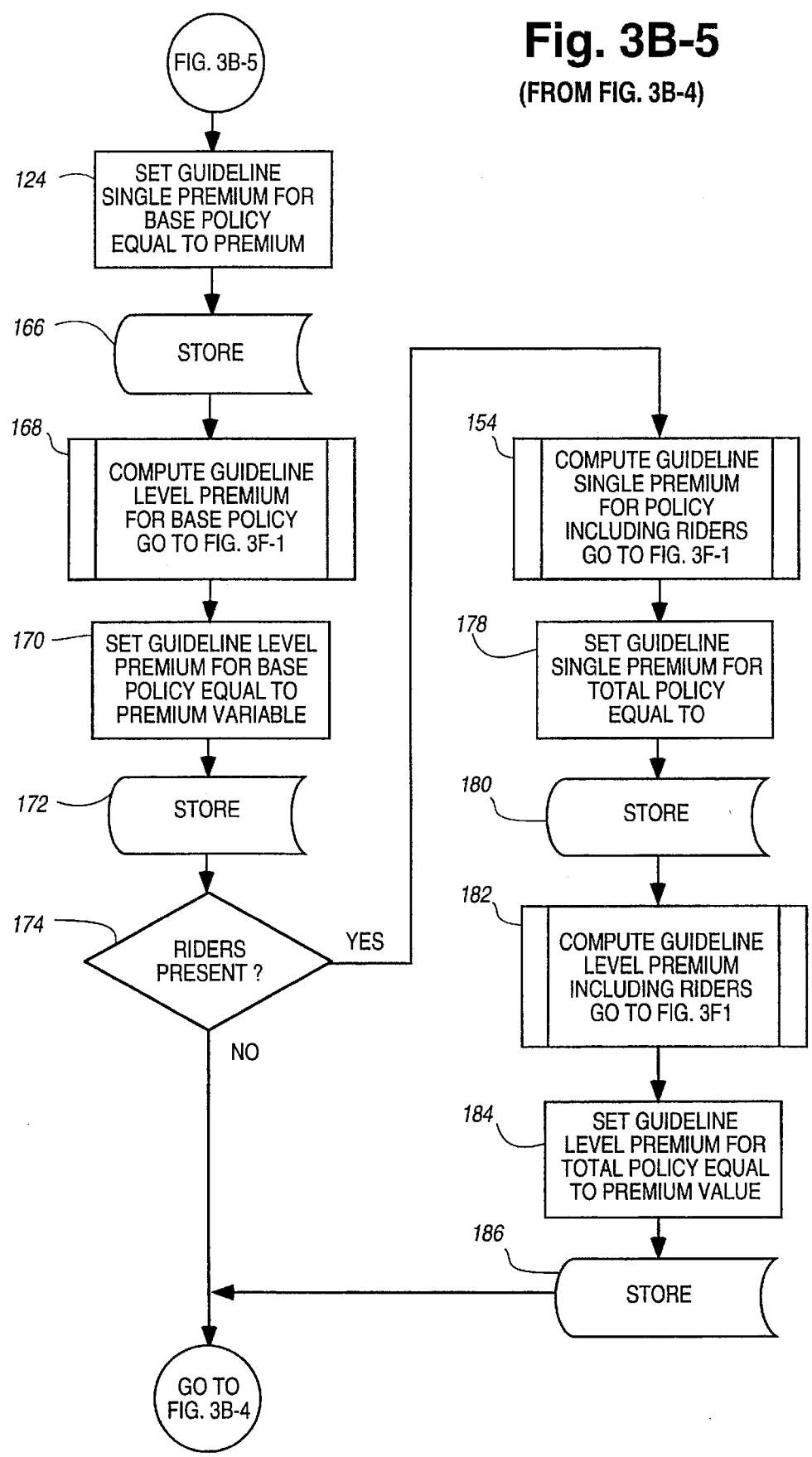
Figures 3, 3B, 4, 5, 6:
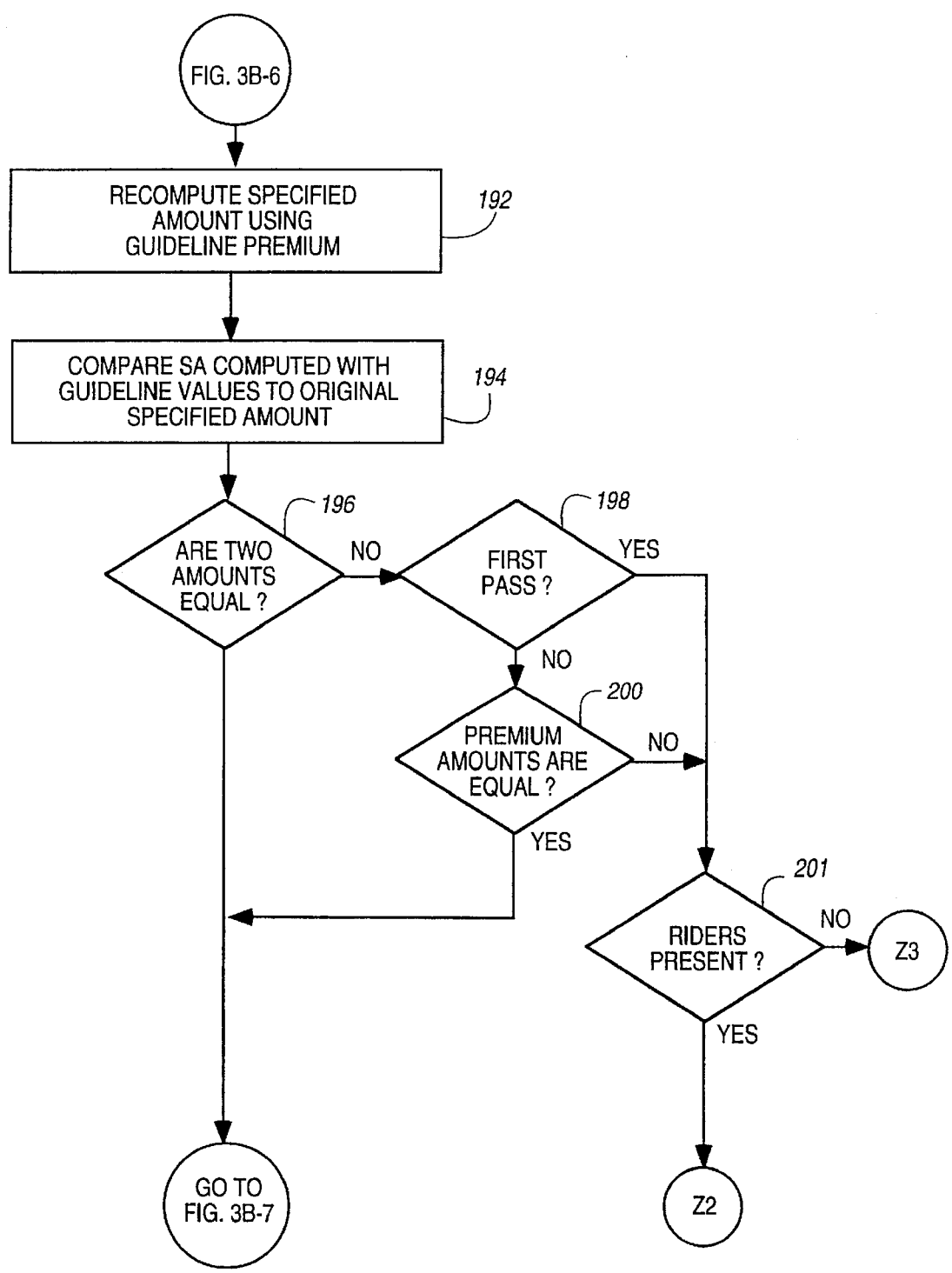
Figures 3, 3B, 4, 5, 6, 7:
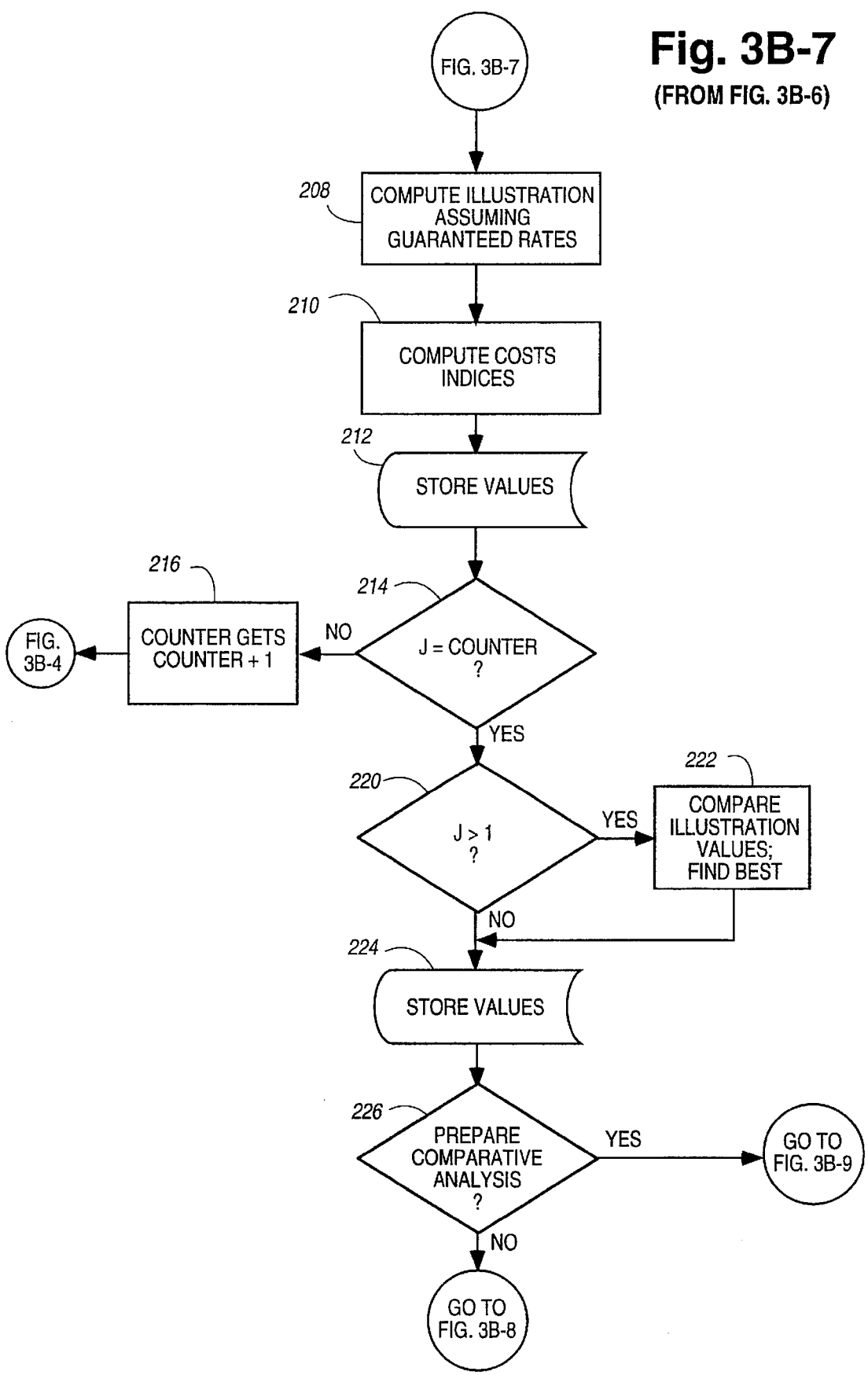
Figures 3, 3B, 4, 5, 6, 7, 8:
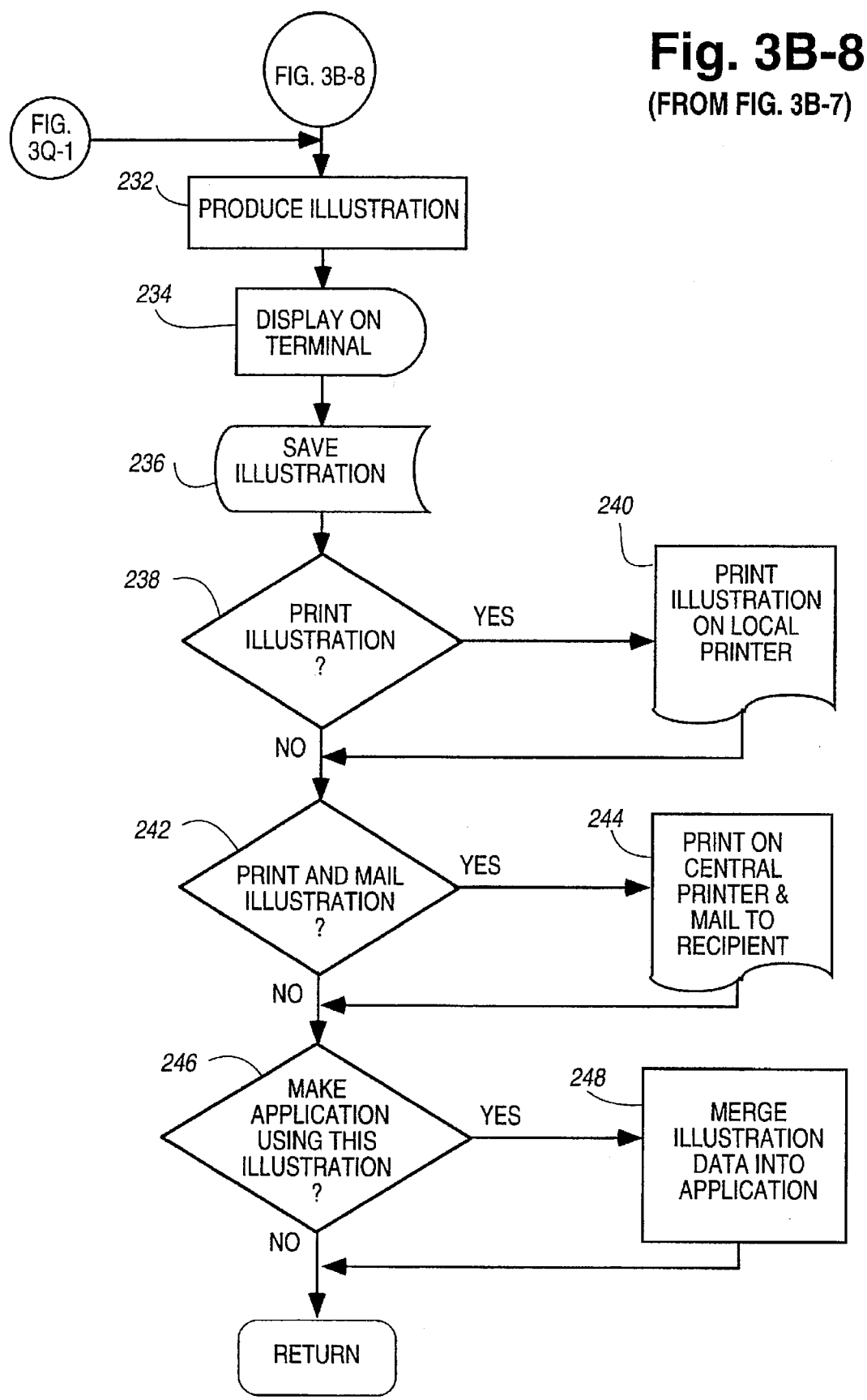
Figures 3, 3B, 4, 5, 6, 7, 8, 9:
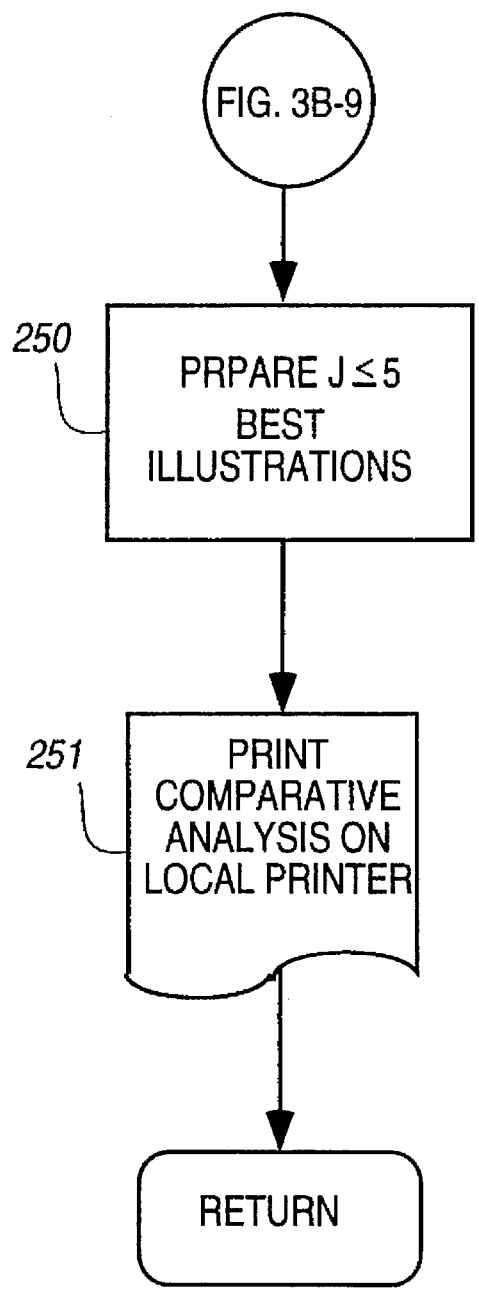
Figures 1, 3C:
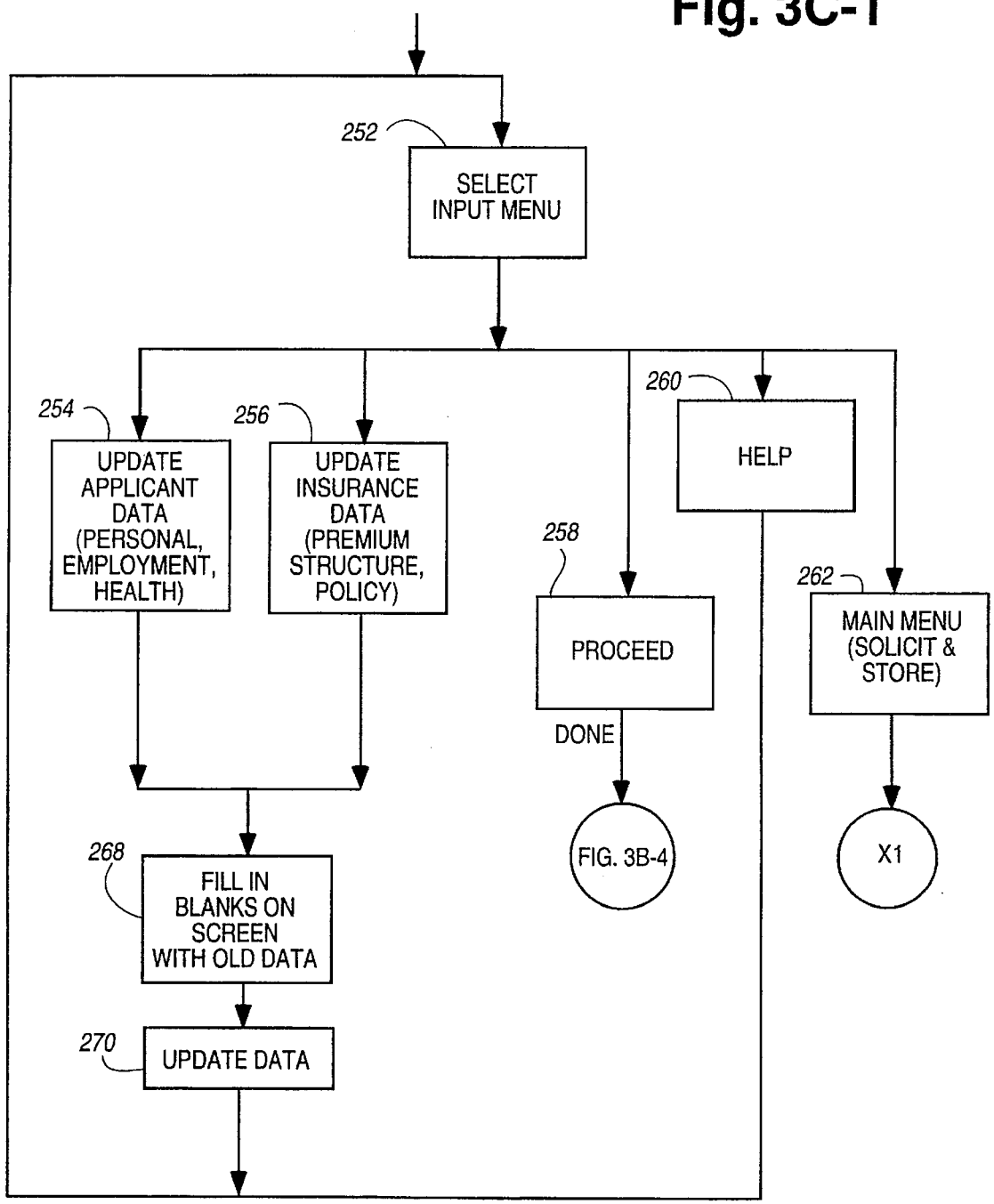

FIG. 3C-1 provides a flow chart of logic used in changing or updating an existing client data file for the purpose of providing the prospective applicant new illustrations based on assumptions which differ from those originally illustrated, in accordance with the present invention.

Figures 1, 3D:
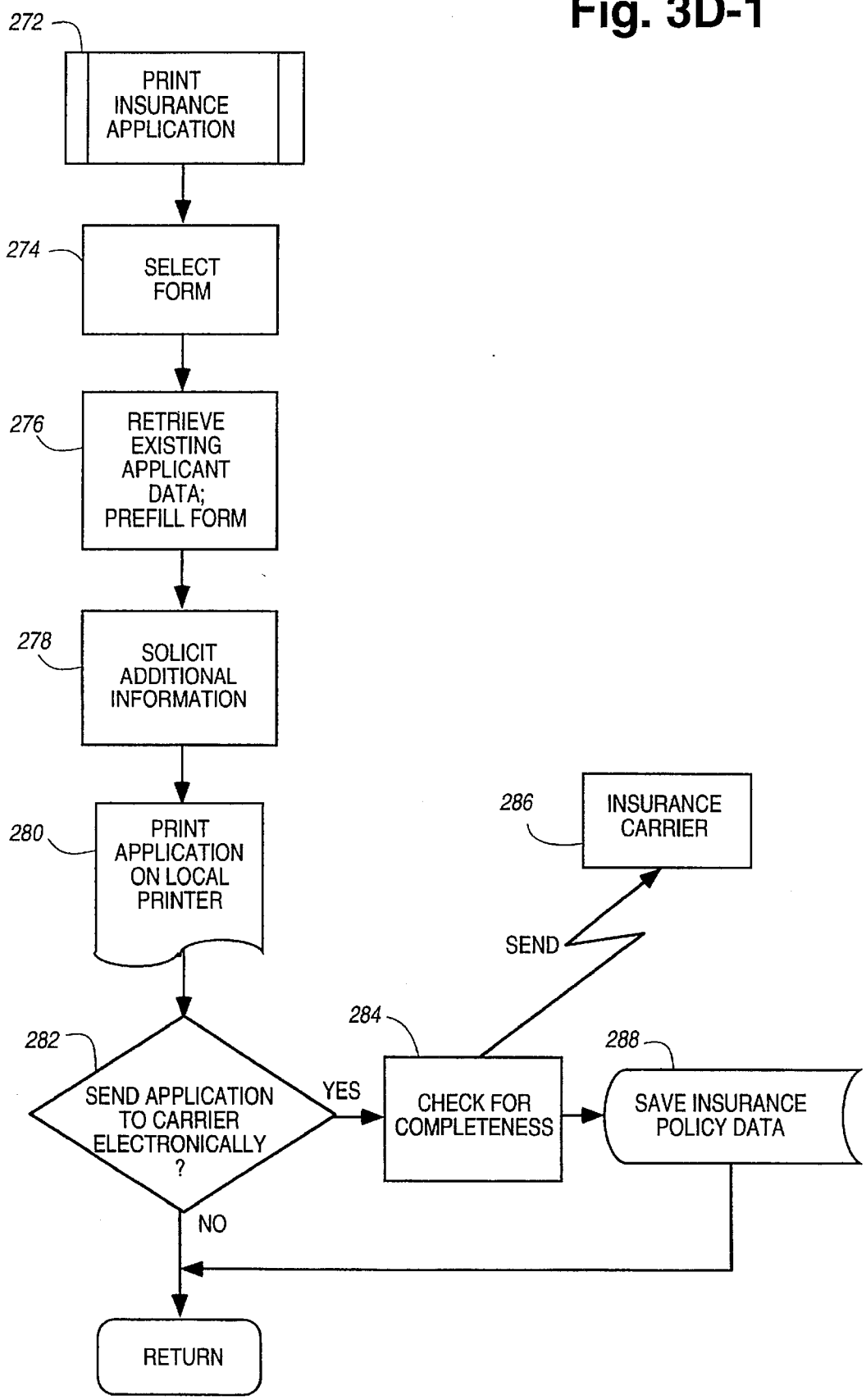

FIG. 3D-1 represents a flow chart of logic used in electronically completing and/or printing a life insurance application form and storing the information contained on the insurance application form in a database of the host computer for later retrieval, in accordance with the present invention.

Figures 1, 3E:
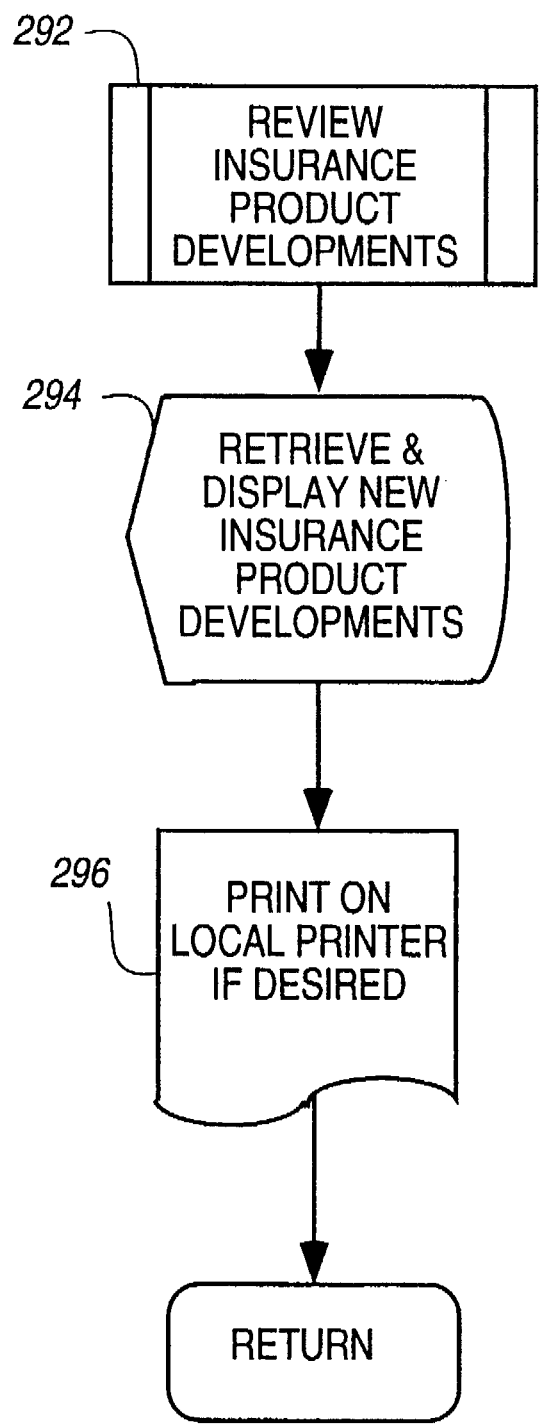

FIG. 3E-1 represents a flow chart of logic used to access the host computer for, and/or print out information regarding, new insurance product developments.

Figures 1, 3F:
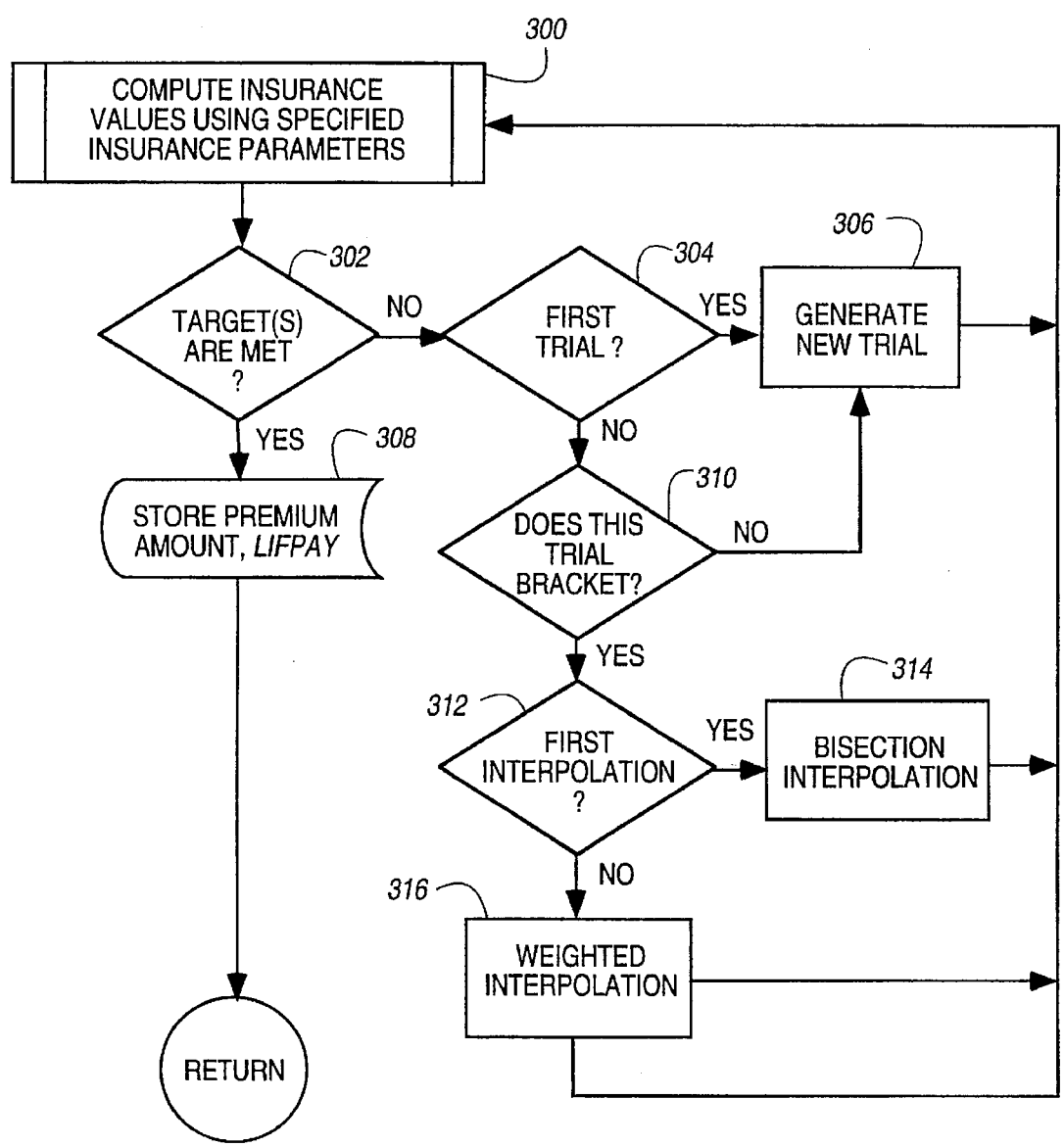

FIG. 3F-1 represents a flow chart of logic used in interpolating to find target universal life insurance illustration values.

Figure 4A:
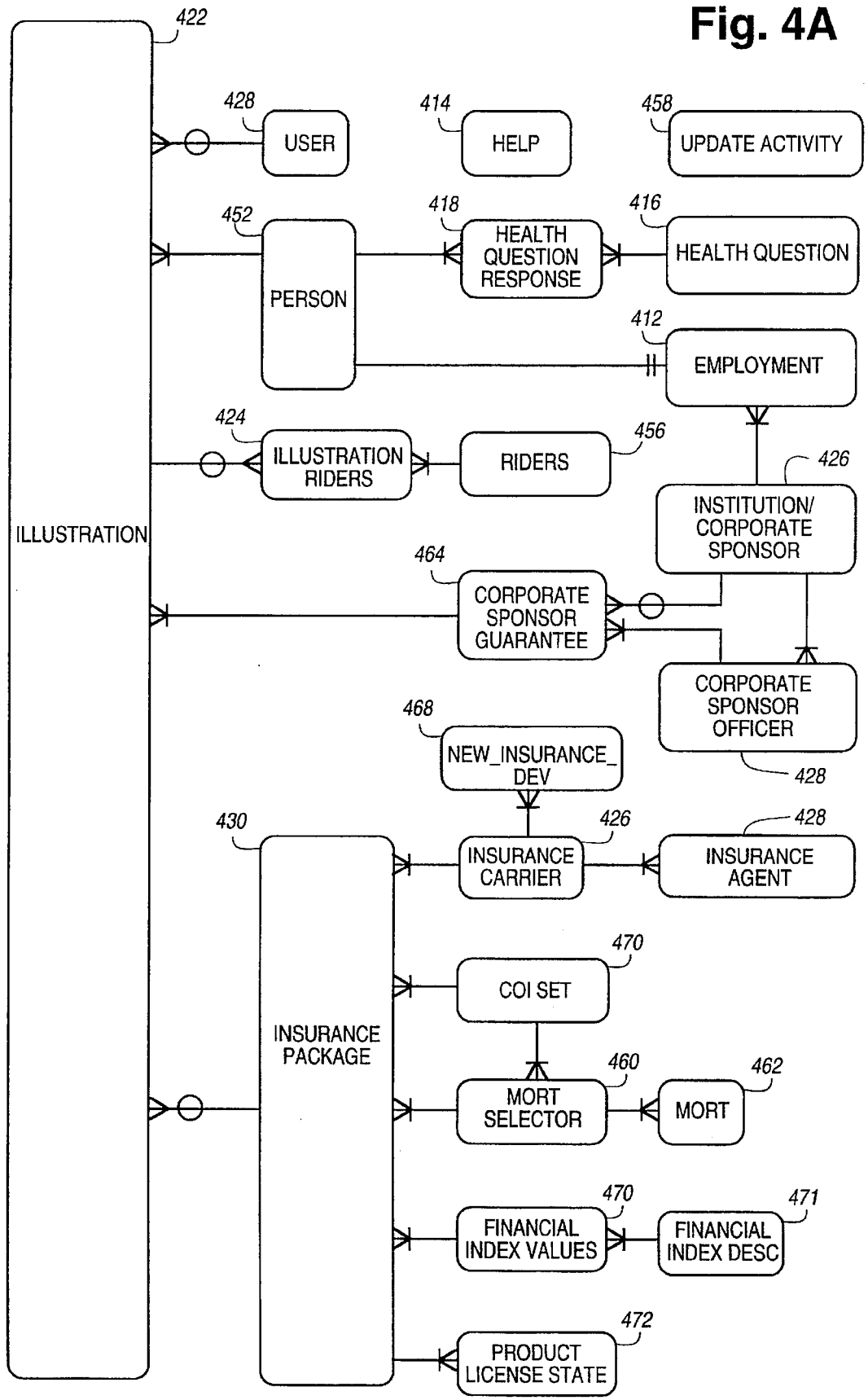
Figure 4B:
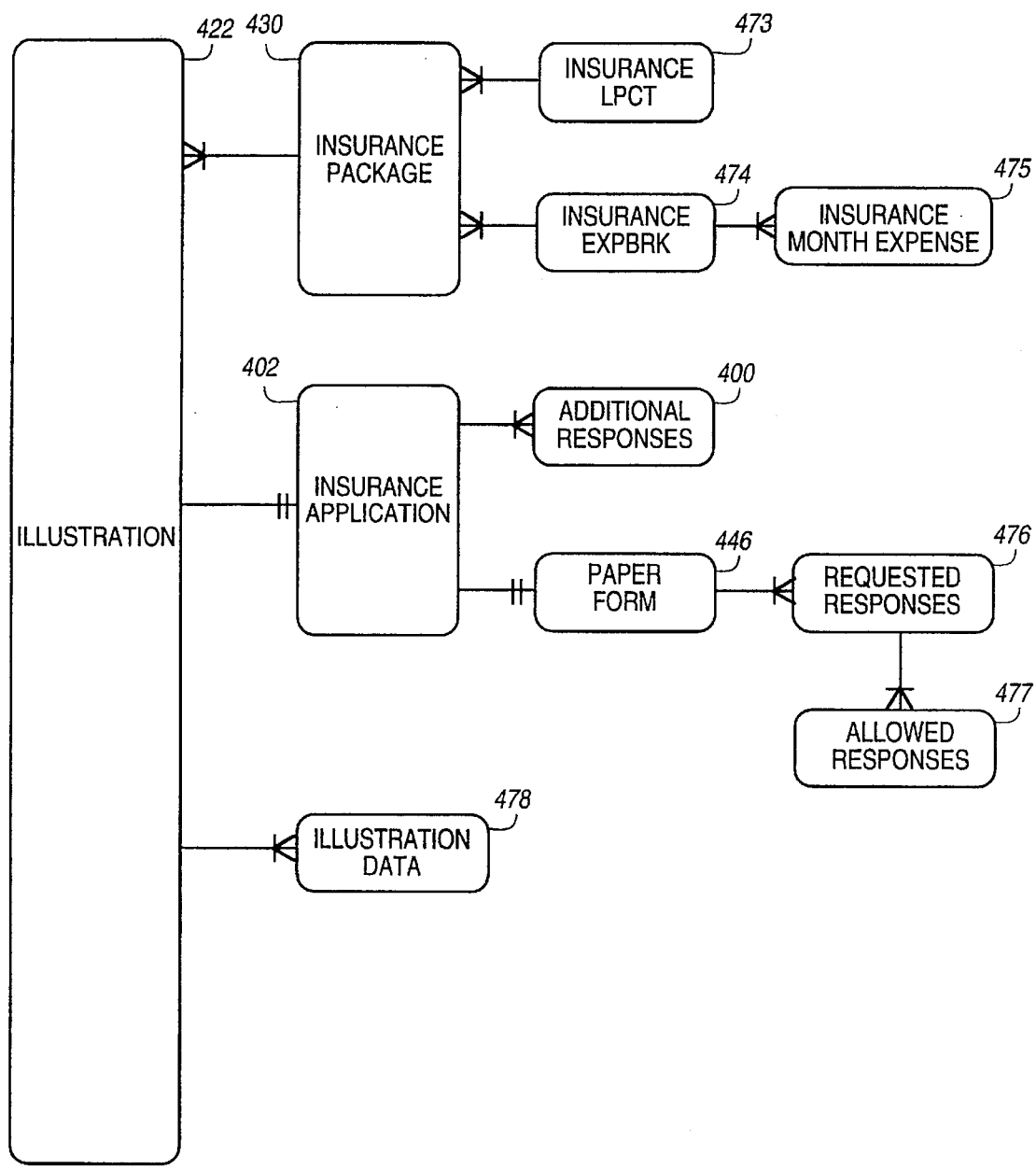
Figure 5:
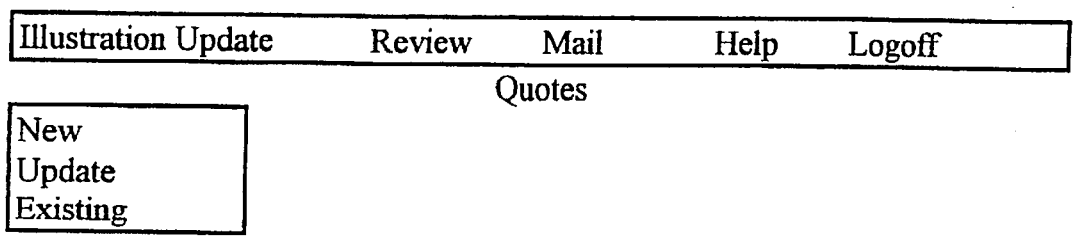

FIG. 4A, which is continued to FIG. 4B, is a schematic representation of relationships between various data entities (database tables) within the database system of the present invention.

FIG. 4B is a continuation from FIG. 4A of the schematic representation of relationships between various data entities (database tables) within the database system of the present invention.

FIG. 5 represents a User Screen shown on a monitor or other output device and produced by means of the computer system of the present invention, to be seen by the system users as they prepare or update illustrations.

FIG. 6 represents a User Screen shown on a monitor or other output device and produced by means of the computer system of the present invention, to be seen by the system users as they prepare or update illustrations.

FIG. 7 represents a User Screen shown on a monitor or other output device and produced by means of the computer system of the present invention, to be seen by the system users as they prepare or update illustrations.

FIG. 8 represents a User Screen shown on a monitor or other output device and produced by means of the computer system of the present invention, to be seen by the system users as they prepare or update illustrations.

FIG. 9 represents a User Screen shown on a monitor or other output device and produced by means of the computer system of the present invention, to be seen by the system users as they prepare or update illustrations.

FIG. 10 represents a User Screen shown on a monitor or other output device and produced by means of the computer system of the present invention, to be seen by the system users as they prepare or update illustrations.

FIG. 11 represents a User Screen shown on a monitor or other output device and produced by means of the computer system of the present invention, to be seen by the system users as they prepare or update illustrations.

FIG. 12 represents a User Screen shown on a monitor or other output device and produced by means of the computer system of the present invention, to be seen by the system users as they prepare or update illustrations.

FIG. 13 represents a User Screen shown on a monitor or other output device and produced by means of the computer system of the present invention, to be seen by the system users as they prepare or update illustrations.

FIG. 14 represents a User Screen shown on a monitor or other output device and produced by means of the computer system of the present invention, to be seen by the system users as they prepare or update illustrations.

Figure 15:
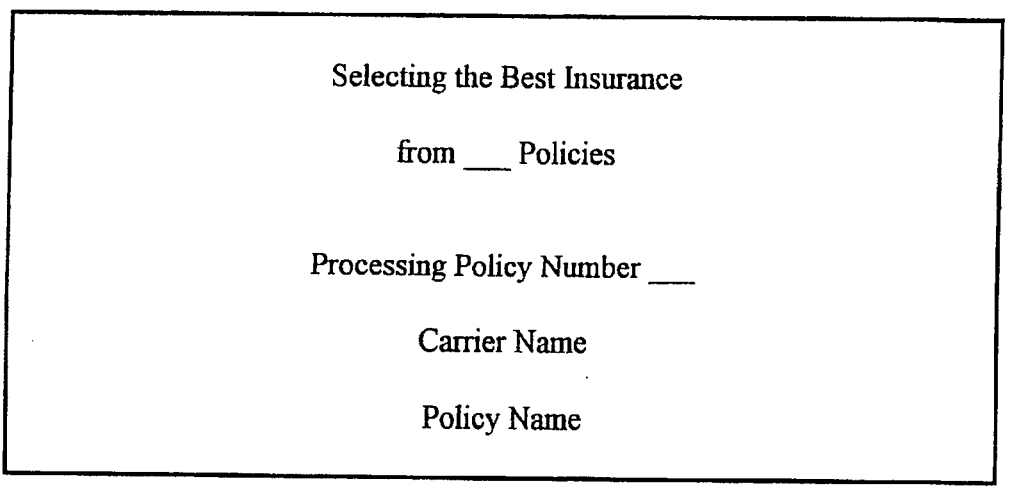

FIG. 15 represents a User Screen shown on a monitor or other output device and produced by means of the computer system of the present invention, to be seen by the system users as they prepare or update illustrations.

FIG. 16 represents a User Screen shown on a monitor or other output device and produced by means of the computer system of the present invention, to be seen by the system users as they prepare or update illustrations.

FIG. 17 represents a User Screen shown on a monitor or other output device and produced by means of the computer system of the present invention, to be seen by the system users as they prepare or update illustrations.

FIG. 18 represents a User Screen shown on a monitor or other output device and produced by means of the computer system of the present invention, to be seen by the system users as they prepare or update illustrations.

Figure 19:
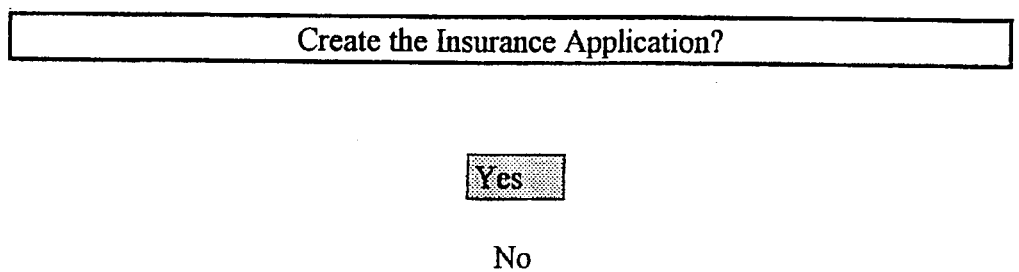

FIG. 19 represents a User Screen shown on a monitor or other output device and produced by means of the computer system of the present invention, to be seen by the system users as they prepare or update illustrations.

FIG. 20 represents a User Screen shown on a monitor or other output device and produced by means of the computer system of the present invention, to be seen by the system users as they prepare or update illustrations.

Figure 21:
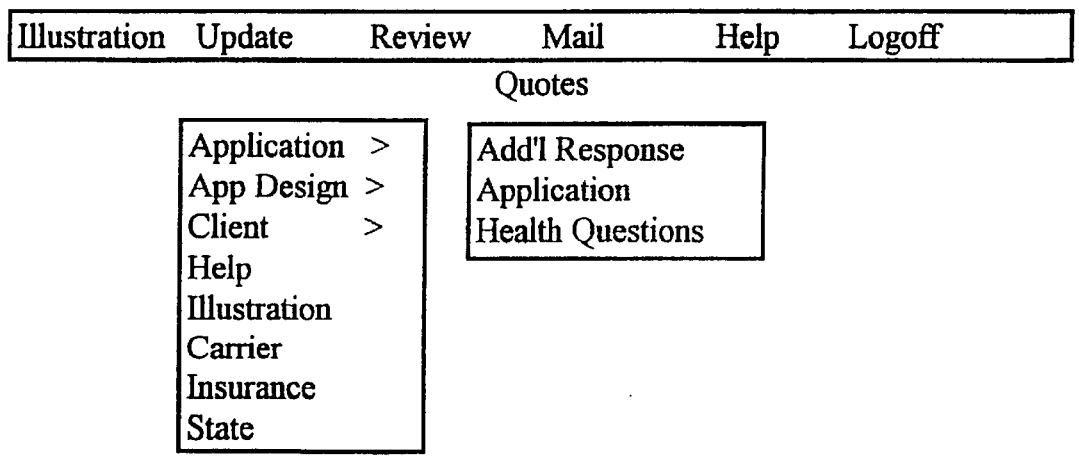

FIG. 21 represents a User Screen shown on a monitor or other output device and produced by means of the computer system of the present invention, to be seen by the system users as they prepare or update illustrations.

Figure 22:
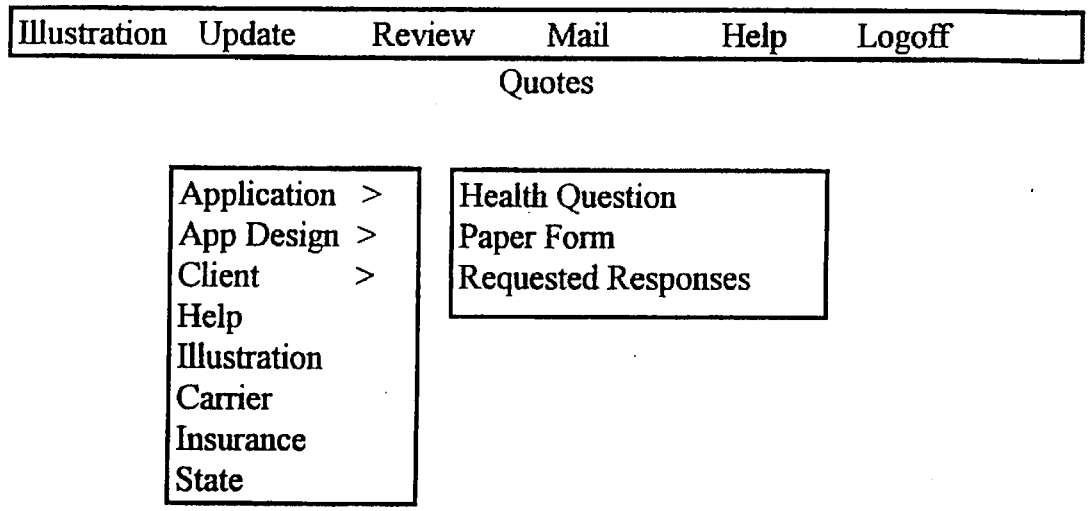

FIG. 22 represents a User Screen shown on a monitor or other output device and produced by means of the computer system of the present invention, to be seen by the system users as they prepare or update illustrations.

Figure 23:
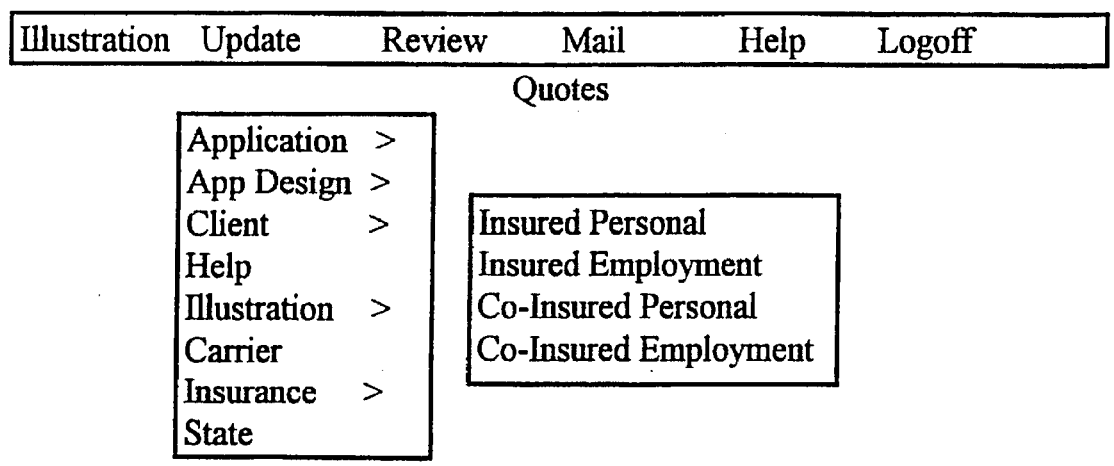

FIG. 23 represents a User Screen shown on a monitor or other output device and produced by means of the computer system of the present invention, to be seen by the system users as they prepare or update illustrations.

Figure 24:
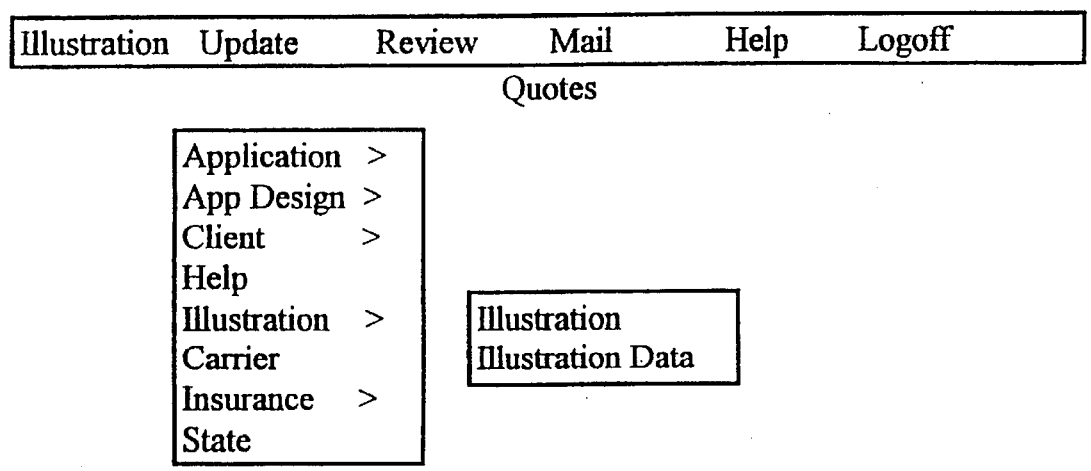

FIG. 24 represents a User Screen shown on a monitor or other output device and produced by means of the computer system of the present invention, to be seen by the system users as they prepare or update illustrations.

Figure 25:
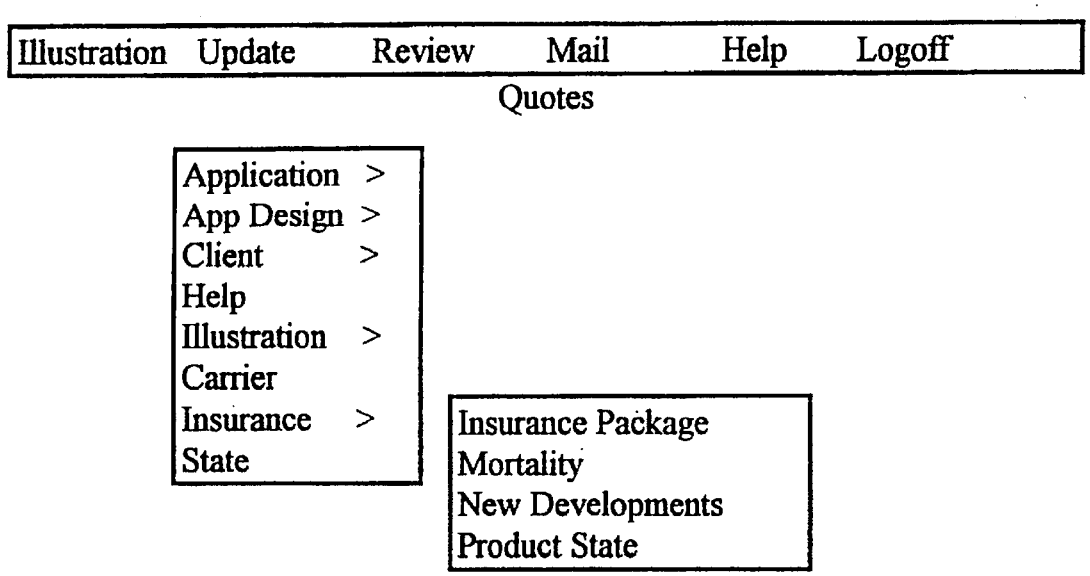

FIG. 25 represents a User Screen shown on a monitor or other output device and produced by means of the computer system of the present invention, to be seen by the system users as they prepare or update illustrations.

FIG. 26 represents a User Screen shown on a monitor or other output device and produced by means of the computer system of the present invention, to be seen by the system users as they prepare or update illustrations.

FIG. 27A, which continues through FIG. 27E, represents a portion of an example of a printed product illustration prepared in accordance with the present invention.

FIG. 27B, represents a portion of an example of a printed product illustration prepared in accordance with the present invention.

FIG. 27C, represents a portion of an example of a printed product illustration prepared in accordance with the present invention.

FIG. 27D, represents a portion of an example of a printed product illustration prepared in accordance with the present invention.

FIG. 27E, represents a portion of an example of a printed product illustration prepared in accordance with the present invention.

FIG. 28, represents an example of a printed product illustration prepared in accordance with the present invention.

FIG. 29A, which continues through FIG. 29B, represents an example of a printed life insurance application form prepared in accordance with the present invention.

FIG. 29B, which continues FIG. 29A, represents an example of a printed life insurance application form prepared in accordance with the present invention.

VARIABLES, IDENTITIES, AND FORMULAS

Variables, identities, and formulas which can be used throughout the illustration system are provided subsequently herein.

It should be kept in mind that such variables, identities, and formulas are not the present invention—rather, they are convenient ways of characterizing the electrical signal modification being accomplished by the digital electrical signal processing system of the present invention, as defined in the claims herein.

DETAILED DESCRIPTION OF A PREFERRED EMBODIMENT AND BEST MODE

Discussion of Figures (FIGS.) and User Screens

The following includes a description of the manner in which the computerized insurance system of the present invention can be made and used. Some of the unique insurance functions that are carried out by this system are described in detail. Other transactions are described more generally. In the interest of brevity, a highly detailed description of each and every one of the data transactions that could be performed by the computerized system of the present invention is not provided. But based upon the detailed description of certain examples, and the knowledge of those familiar with the life insurance industry, how to make and use the present invention should be readily apparent from the information provided herein.

Generally, the system includes a digital computer for receiving input data and for storing insured information and life insurance information. The digital computer is programmed with means, responsive to the data, the insured information, and to the insurance information, for computing an amount of universal life insurance premium sufficient to provide needed coverage and for generating an illustration of said life insurance as a means for understanding that coverage.

More particularly, the computer system requests that a user input data specifying the kind of insurance coverage (e.g., amount and duration of coverage) to be illustrated. This information is stored in the computer's database system. Also, the computer is programmed to make calculations of universal life insurance policy riders and other data needed for the illustration. When all the values have been computed and written to the database, the computer will then combine them with text data to provide an illustration that can be printed out. This information will also be stored in a database and may be updated as needed.

Once the user, in consultation with a prospective insured, has designated the illustration as complete, data in the database can be merged with stored text data and other input data in order to produce insurance application forms. These forms can be printed out on the user's printer for signature by the prospective applicant and for subsequent processing by the system operator and the life insurance carrier.

Because the present invention is directed at modifying electrical signals in a computer system having a processor, such as a microprocessor, to understand how the signals are modified, a basic understanding of microprocessors is useful.

A microprocessor is, of course, the central component in any digital computer system—it controls the functions performed by the other system devices and provides the system's arithmetic and logic capability. The microprocessor fetches instructions from memory and decodes and executes them. It references memory and I/O devices for data and responds to control signals from external devices.

The most fundamental purpose of a microprocessor system is to process digital data that is input from the outside world and to provide as outputs digital data that is a desired function of the input data (i.e., to modify electrical signals). Every processor is equipped with a repertoire of operations which it has the capacity to execute. The operation it selects for execution is based on its interpretation of a command code, called an "instruction." This instruction is part of a sequence of instructions, call a "program," which is stored in a memory to which the processor has access. The processor executes the program, one instruction at a time, by reading the current instruction, interpreting it, executing it, and then proceeding to the next instruction. Because each instruction is available to the processor almost instantaneously, the execution time for an entire program may be very small.

A program uses a set of rules based on the instruction repertoire of a specific processor. This set of rules is known as a programming language. (An instruction in a programming language is also called a "statement.") A program written for one processor may be translated into an equivalent program for another processor, even though the two machines have entirely different instruction sets. For this reason, a programming language may be based on a hypothetical machine, which does not physically exist because it is too difficult or too expensive to build. It is defined strictly because its language is easier to use—more convenient in which to express programs. It is called a "virtual" machine because it is the one that is "visible" to the programmer. Consequently, the program that a processor executes may have been planned directly for it or may be a translation of a program written for some other (possibly virtual) machine.

The memory containing the program may be a Read Only Memory (ROM), in which case the program was built into it at the time it was fabricated. Alternatively, the memory may be a volatile Random Access Memory (RAM), in which case the program must first be made resident, using a sequence of memory writes called a program "load," before its execution may commence. In subsequent discussions, unless specified otherwise, assume the program already resides in the memory to which the processor has access.

To understand microprocessor signal processing systems, it is advantageous to view the entire system—microprocessor, ROM, RAM, and I/O ports—as a collection of addressable registers. Those registers that reside within the microprocessor are internal registers, and those that exist in the ROM, RAM, and I/O ports are external registers.

The collection of registers that constitutes a particular system and the data transfers that are possible among them make up the system architecture. The types of registers in the microprocessor and the possible data transfers among them determine the microprocessor's architecture.

A microprocessor system implements its functions by transferring and transforming data in registers of the system. Typically, transformations on data occur in internal registers, many of which are operational registers. Operational registers differ from storage registers in that they and their associated circuitry implement arithmetic or logic operations on the data contained in the register, thus transforming the data.

The microprocessor controls and synchronizes the data transfers and transformations according to instructions read into it from the application program in the system's ROM.

A microprocessor's architecture has two major functional units: the control unit and the arithmetic/logic unit, ALU. In addition to these units, the microprocessor contains a number of registers—instruction register, program counters, stack pointers, general purpose registers, and temporary registers.

The microprocessor's control unit controls and synchronizes all data transfers and transformations in the microprocessor system and is the key sequential subsystem in the microprocessor itself. All actions attributable to the microprocessor are actions implemented by the control unit.

The basic operation of a microprocessor is regulated by the control unit, is cyclical, and consists of the sequential fetching and execution of instructions. Each instruction execution cycle has two primary states: the fetch state and the execute state. The fetch state transfers an instruction from memory into the microprocessor, and the execute state executes the instruction. The microprocessor normally cycles between the fetch and execute states unless and until it executes a halt instruction, in which case it enters a halt state and stops.

To keep track of which instruction is to be executed next, the control unit maintains a special purpose or dedicated register, the program counter. The program counter is an operational register that always holds the address of either the next instruction to be executed or the address of the next word of a multiword instruction that has not been completely fetched. In either case, at the completion of the execution of any instruction, the program counter contains the address of the first word of the next instruction to be executed. The operational nature of the program counter allows its contents to be incremented by the control unit.

One of the control inputs to the microprocessor's control unit is the reset input. When the microprocessor is reset, the control unit resets the program counter to zero. This initial value establishes the memory address from which the first instruction is to be obtained.

To actually obtain the first word of the instruction, the address contained in the program counter is placed on the address bus. To do this, the control unit transfers the contents of the program counter to the address register. The program counter is then incremented to point to the next memory location. The outputs of the address register are the address pins of the microprocessor. The control unit then generates a memory read strobe that transfers the data from the addressed memory location to the microprocessor. The data is transferred into the micro processor through the data bus buffer/latch and then into the instruction register ("IR"). Registers within the microprocessor are interconnected by an internal data bus.

The first word of an instruction is the operation code for that instruction. Operation code indicates to the control unit those operations required to execute the instruction. The output of the IR is decoded and used by the control unit to develop a sequence of operations and register transfers that execute the instruction.

The operation code in the IR addresses a starting location in a control ROM or Programmable Logic Device within the microprocessor where a sequence of very elementary instructions—microinstructions—is located. Each instruction in the fixed instruction set of a microprocessor is implemented by the control unit sequencing through the set of microoperations associated with a particular instruction. For single-chip microprocessors, the microinstructions, and thus the microprocessor's instruction set, are fixed at manufacture.

Arithmetic or logic operations on one or two operands constitute the basic data transformations implemented in a microprocessor. The microprocessor contains an arithmetic and logic unit, ALU, for this purpose. One of the two ALU registers, the accumulator, holds one operand; the other, a temporary register, holds the second. The result of an arithmetic or logic operation is placed in the accumulator at the completion of the operation, replacing one of the original operands.

Various subsystems of the microprocessor system are externally interconnected by the system bus, which includes the address bus, data bus, and control bus which operates according to a set of system bus signals for conveying bits of data.

Each of the subsystems connected to the system bus can be viewed as consisting of a bus interface and primary function. For example, the primary function for a memory subsystem is implemented by memory devices. These memory devices provide the addressable registers considered when viewing the subsystem as a collection of registers.

External or peripheral devices that generate data for input to a microprocessor system are called input devices. Input devices include a large variety of electronic and electromechanical devices. These devices range in complexity from simple switches to other microprocessor systems that preprocess data before transferring it to the main microprocessor. Data generated by an input device is stored temporarily in a register until it can be read by the microprocessor. The loading of the input register with data is done by the input device. Once loaded with data, the input register can later be read by the microprocessor.

Ouput devices, of which there are a large variety, accept data from the microprocessor system. The data to be output from the system is placed in a register connected to the data bus. This register is called an output port and is clocked by an output device select pulse.

Input ports and output ports have a bus interface consisting of address decoding logic. For an input port, the primary function consists of a register and three-state buffer. For an output port, the primary function is simply a register. When viewed as a collection of addressable registers, each port consists of a single register.

Where data in analog form is to be processed or generated by the microprocessor system, suitable analog to digital and digital to analog conversion subsystems are employed to convert analog input data to the required digital form, and vice versa.

It is to be explicitly understood that other implementations of the present invention, say, those using a different kind of digital computer, analogous hardware, multiple computer systems, comparable input and output, a computer program or computer programs written in a different language, a chip or chips, or a full or partially hardwired system replacing (and in accordance with) the logic of the computer program, are entirely acceptable and equivalent to the embodiment of the invention discussed herein. Also the invention can be implemented by hardwired logic in a handheld calculator. When software is loaded into, and running, a programmable computer, the software sets what in effect are many, many "switches," and the result can be considered a new computer machine, with logic formed from the set switches. Instead of setting the switches, a circuit equivalent would be to hardwire the same or equivalent logic. Therefore, whether a configurable device is configured to the requirements of the present invention, or a device is constructed from scratch solely for meeting the requirements of the present invention, the result is effectively the same from an electrical signal processing standpoint. All these embodiments are different species of the present invention that are within the contemplated scope of the present invention.

Turning now to FIG. 1, an overview of a data processing system for producing a universal life insurance policy illustration system according to the present invention is shown. The Data Input Screen 6, discussed more fully hereinafter, can be produced on Terminal 4, for example an IBM compatible PC running Smarterm 340 (available from Persoft Corp.), with a Local Printer 2, e.g., a laser printer. Terminal 4 is linkable to Communications System 8. The Communication System 8 can be a modem and appropriate telephone lines. Communications System 8 is thus linkable to a Digital Computer 12, for example, a Digital Equipment Corporation VAX with a VMS operating system, ORACLE, and WordPerfect (e.g., 5.1) from WordPerfect Corporation. Digital Computer 12 is operably connected to Central Printer 18. The Digital Computer 12 contains a Central Processor 14 that is operable to obtain Insurance Product Information 10 (digital electric signals), and Insurance Premium Information 16. The respective information of Blocks 10 and 16 can optionally be accessible on line to other computers or stored as data in a System Database 22 of the Digital Computer 12.

Help 30 is a computerized system, preferably a context sensitive, hypertext-linked help system. Help 30 is available throughout the program.

Central Processor 14 is also operable to activate a function Print Out Insurance Application Forms on Central Printer 20, which points to the function Fill In Forms 28 to selectively transmit Life Insurance Application Data To Carrier 32.

Further, Central Processor 14 can generate an illustration via a function Generate Illustration 24, which leads to Print Illustration On Local Printer 26. The generated illustration can be saved in the Database 22.

When the system is accessed, the user must choose the transaction desired, and the selection will vary by the type of user. A management level user with a higher level of authority can update the data used in the illustration process. This data includes, but is not limited to: (1) insurance underwriting related values, including data regarding age, sex, and health characteristics, premium amounts to be applied, cash value accumulation factors, annual death benefit amounts, and typical policy interest crediting rates and insurance charges; (2) all of the illustrations saved in the Database 22, which may be used for manipulation and analysis in both the marketing and underwriting functions carried out by an insurance agent and carrier; and (3) administrative messages from other users. Otherwise, a non-management user of the system has access to only a portion of the system.

Prior to engaging the computerized aspects of the present invention, the user should consult with the prospective applicant to obtain such information as the prospective insured's age and sex, the amount of life insurance coverage desired, whether or not the individual has certain health problems which may require specialized insurance underwriting, whether or not the individual's employer is currently involved in a program that will sponsor reduced cost policy premiums, etc. After this information-gathering step has been completed, the user "logs on" at Terminal 4 by entering an assigned authorization password.

Figure 2:
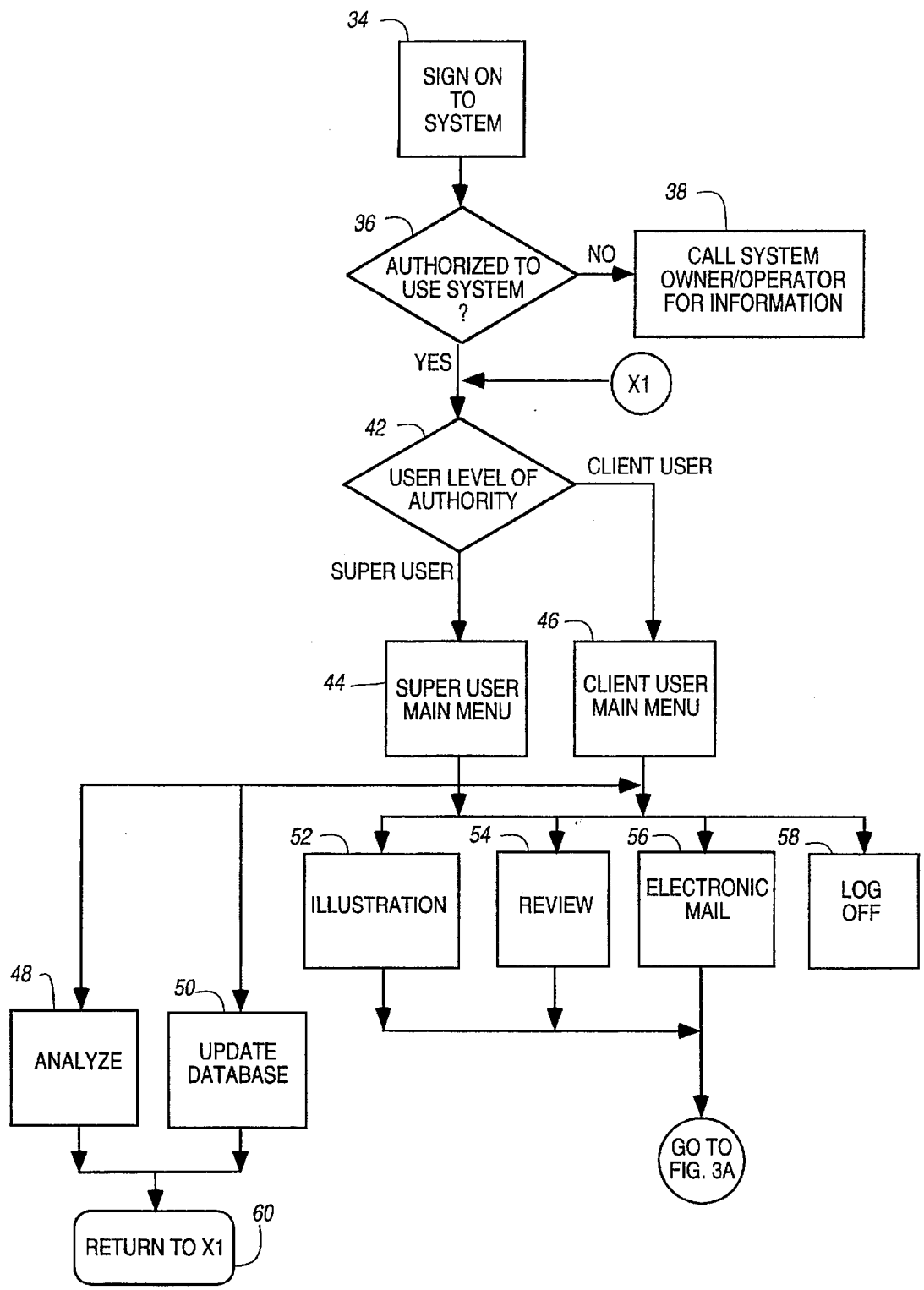
FIG. 2 represents a schematic flow chart of logic behind a "main menu" (or user screen with a list of the functional choices that the computerized system provides to users) of the present invention.

Turning now to FIG. 2, the user engages the system at Sign On To System 34. Branch 36, Authorized To Use System?, checks the password against stored passwords to determine whether the user is authorized to use the system. If the user is not authorized, Block 38 displays a message on the Terminal 4 indicating that the user should telephone the system owner/operator for further information. If the user is authorized, meaning that the password is recognized by the Digital Computer 12, the logic continues to Branch 42. However, prior to Branch 42, there is a logic entry point X1, which is described more fully below, but which generally is a connection from another part of the logic.

In any case, Branch 42 assesses the level of authority of the user from the password. In the present embodiment of the invention, there are two alternatives. First, as previously suggested, the user could be a "Client User," in which case the logic connects to Client User Menu 46 as is subsequently discussed. Second, the user could be a "Super User," having access to Super User Main Menu 44.

The Client User/Super User authorization system is included in a preferred embodiment of this invention to avoid security problems which would otherwise be created by different kinds of system users. Different degrees of authorization also provide for confidentiality of database information and, in the case of communications between the system owner/operator and users, allows each user to view only the information relating to the applicants for whom the user is providing illustrations.

From the Super User Main Menu 44, if the user does not yet wish to log off at Block 58, there are a number of choices shown in User Screen 1.

The Super User Main Menu 44 permits access to Illustration 52 used to create an illustration. The user can also select Update Database 50, which is described with particularity hereinafter, but which generally is a list of tables that can be updated.

The user can select Analyze 48 to access various reports and statistics on illustrations. Electronic Mail 56 permits electronic communication between system users (see FIG. 1). Mail messages may be printed out via the Printers 20 and 26.

Returning to FIG. 2, the Electronic Mail 56 function utilizes the VMS operating system mail feature. The system has the ability to alert the user that a message is present in his or her electronic "mail box." The system is capable of reading these messages from that file onto the user's screen, again allowing the user to move from screen-to-screen at his or her own speed. Once the user has completed a review of the data, one or all of the textual screens or "pages" may be printed at the Local Printer 26. The user may also write electronic messages to other users' mail boxes to be used in a similar manner.

At the completion of each subordinate function 48, 50, 52, 54, and 56, control is returned to the Super User Main Menu 44 via the Return To Main Menu Block 60.

Turning now to FIG. 3 where the logic proceeds from Illustration 52 of FIG. 2, the user is presented with a Select Type Of Illustration 62 submenu, shown as a portion of User Screen 1. Each of the functions of the submenu of Branch 68 will be presented in summary form here and described subsequently in detail. One function is Generate New Application Illustration 68, which is elaborated by FIG. 3B-1. This Function 68 permits the user to provide a detailed presentation, tailored to the prospective applicant's own factual situation, of how universal life insurance might perform for the prospective applicant. This Function 68 also allows the user to save the illustration for later updates and to send the illustration to the Local Printer 26 for review by the prospective applicant.

A second function of Submenu 62 is Choose Existing Illustration 66, which goes to FIG. 3C-1. This Function 66 permits the user to update a previously saved prospective applicant illustration using different assumptions. This Function 66 also allows the user to quickly create an illustration which is different from one already saved by allowing the user to change only those few items that the prospective applicant may select, thereby avoiding the laborious process of entering all of the information required to create a new prospective applicant illustration. This Function 66 likewise allows the user to save a new illustration for later updates and to send the illustration to the Local Printer 26 to permit review by the prospective applicant.

A third function of Submenu 62 is the Print Existing Illustration Function which goes to Q1 in FIG. 3B-6. This allows the user to print the illustration on which he or she is currently working at any time, without having to move through other menus.

Returning to FIG. 3, once the illustration has been compiled, the system presents a sequence of further options. Print Life Insurance Application 70, goes to FIG. 3D-1. This Function 70 allows the user to: (1) take the information generated and saved in the aforementioned illustration process, add to it, and merge it with life insurance application form text data to construct a customized, printed life insurance application form for signature; (2) electronically save in a file the customized life insurance application form; or (3) print out a partially completed or blank life insurance application form for later manual completion by the prospective applicant.

Review Insurance Product Developments 72 goes to FIG. 3E-1. This Function 72 allows the user to be quickly apprised of new developments in the insurance products used in forming the illustrations including, but not limited to, changes in interest rates credited by carriers on cash value reserves in the life insurance policies, new underwriting rules, new products provided by different carriers, etc. This information is available inside the Generate New Applicant Illustration 72 and Choose Existing Applicant Illustration 66 functions. Information may be read from the screen or printed out.

Proceeding to FIG. 3B-1 Generate New Applicant Insurance Illustration 76, the system offers maximum flexibility so that it may accommodate virtually any life insurance policy. In a preferred embodiment of the invention, the system also provides many tables for product-specific data such as mortality tables, expense charges, interest rates, and other insurance-related data. These tables can be used to store the different components of the carriers' products. Product specific "flags" or identifiers in the insurance computation formulas can be used to provide maximum flexibility in the way the system makes insurance computations. This allows the system to offer a method of customizing computations that are common to all life insurance products.

This feature also makes it possible for a single computer to efficiently provide multiple life insurance product illustrations for multiple life insurance carriers. (In another embodiment of the invention, the system can use front-end network gateways to connect multiple carriers' computers to the Digital Computer 12.)

The system maintains security by affording limited access to carrier-specific databases. The system provides carriers exclusive access to their own databases, for example, via modem, by requiting a password. Only individuals authorized by the carrier can access or see the carrier's databases.

Block 76 leads to Block 78, which solicits the type of policy the user would have selected as displayed on the User Screen 2. The user may select to illustrate either a joint and survivor life insurance policy or an individual life insurance policy. If it is a joint and survivor policy, the system will require policy information for each of two insureds. This is because a joint and survivor policy pays a benefit only upon the death of both insureds. Such policies are often used in estate planning for the payment of estate taxes upon the death of, for example, a married couple or a father and a daughter. Such policies are often used to assure that an estate has sufficient liquid assets to pay estate taxes. In Block 80, Solicit: Insureds Information; Employer Information, and as shown in Screens 3 and 4, the system solicits the Prospective Insured's information including, but not limited to the Insured's home address and telephone number, age, sex, and date of birth, and place of work. In Block 82, and as depicted by Screen 5, the system goes on to solicit information regarding the prospective Insured's Health. These general questions regarding the prospective insured's health permit carriers to segment prospective policy applicants into preferred and non-preferred risks and thereby provide a more accurate projection of policy charges. Preferred risks are individuals who exhibit desirable underwriting characteristics, as exemplified by good health, for whom carriers may lay away smaller amounts in reserve against the future possibility of death. Non-preferred risks include individuals who have physical conditions which tend to place them at greater risk of early mortality. Such characteristics might include, for example, being a smoker or having been diagnosed as having had a Heart Attack, Cancer, AIDS or some other life-threatening condition. In Blocks 84 through 86, the same questions are repeated for the prospective co-Insured in the Joint and Survivor branch of the logic.

If the response to the question posed in User Screen 2 is "Individual" then the system goes instead to Block 88, Solicit Insured Information; Employer Information and Block 90, Solicit Insured Answers to Four Underwriting Questions. This information will be used likewise by the system to determine whether the applicant(s) is (are) a preferred or non-preferred risk, through comparison with specific desired responses, stored by product in System Data Base 22.

Once this information has been obtained, the system goes on to solicit what kind of illustration the user would like in Block 92, Solicit Insurance Requirements. An example of the Screen that appears in front of the user appears in Screen 6 Insurance Requirements—Insured. The system requires the user to designate two out of three key variables needed in the illustration of a life insurance policy. The user must enter onto the screen some combination of the Minimum Death Benefit, Cash Value (and year the Cash Value should be attained), and premium amount. For example, if given Death Benefit and Cash Value amounts, the system finds for any product stored in the system that amount of Premium (and the Number of Years it would be payable) needed for the system to achieve that goal. Similarly, if given the annual Premium, the Number of Years for which it would be paid and the Death Benefit desired, the system projects the Cash Value that would be associated with such a transaction.

In Block 94, Solicit Additional Coverages, the system solicits any additional coverages desired by the client. These coverages, made available in the form of riders to the base policy, will permit the user to augment his/her coverage under the terms of the policy in exchange for an additional premium payment. Screen 7, for example, shows several riders potentially made available by the system. A waiver of annual premium benefit provides that premiums will be automatically waived in the event of policyholder disability. The Accidental Death Benefit Rider allows for the payment of an additional death benefit in the event the insured dies in an accident. The Additional Death Benefit Rider allows the policyholder to obtain additional coverage during the early years of the policy. A Spousal Death Benefit allows the user to obtain coverage for his or her spouse in addition to his or her own coverage. This screen has an electronically highlighted area, a "form" or blank, appearing next to the description of each additional benefit. This "form" is filled in by the user with a dollar amount. The system interprets any blanks as zeros with the exception of Waiver of Premium, which requires a "Yes" or "No" response from the user before allowing the user to move onto the next screen. Screen 8 solicits information as to where the policy will be issued.

In Block 96, Store, all the information regarding the prospective Insured and, if one exists, the co-Insured, is stored in System Data Base 22 for later use by the system.

Moving now to FIG. 3B-2; the part of the system logic dedicated to identifying and verifying the existence a Corporate Sponsor is shown. In Block 102, Identify and Mark Corporate Sponsor, information regarding the employer of the prospective applicant is used by the system for the selection of a policy. For example, there exist policies that life insurance carriers sell in large volumes through sponsored corporate purchases. Often such policies are paid for via a monthly payroll deduction. Because such automatic payments reduce the costs of distribution to the carrier, such policies are often offered on a discount basis to any employee purchasing the policy.

Also, in the event that corporations are willing to offer corporate sponsored purchase of life insurance, life insurance carriers may be willing to relax their underwriting requirements. Relaxed underwriting requirements usually take one of two forms, simplified issue or guaranteed issue. In simplified issue underwriting, only a few simple questions (typically three or four) are asked of the prospective insured. In guaranteed issue underwriting, no questions apart from the age and sex of the prospective insured are asked.

The availability of this kind of underwriting may be beneficial to both the insurance carrier, which may profit from increased insurance sales by providing insurance policies with reduced underwriting in a high volume sale, and to the employer, which as a consequence may offer an enhanced product to its employees. In addition, this kind of underwriting creates another use for the prospective applicant's employment information. The employment information may be compared to a database of all those companies which offer corporate sponsorship of insurance purchases for their employees. If there is a match between the data provided concerning a prospective applicant's employer and information in the database, a corporate sponsor number will be used to identify a product which may be offered to the employee at reduced cost or with less stringent underwriting requirements.

A preferred embodiment of the invention involves a system of corporate sponsorship recognition involving the identification of companies providing both the aforementioned guarantee of premium payments and the creation of a defined group for the provision of specialized underwriting. Block 102 is dedicated to this task.

In Block 104, the system checks System DataBase 22 to see whether or not the Prospect Applicant Works with a company which provides corporate sponsored polices. If the Answer is "Yes," then the system moves to Block 110, Select Corporate Sponsored Policy, and the system selects the appropriate corporate sponsored policy for that particular employer and writes the information to System DataBase 22. If the user and/or client is unsure, the system provides a list of Corporate Sponsors for him or her to consult in Block 106, Check List of Corporate Sponsors. In Block 108, Sponsor Selected?, the system checks to see if a Sponsor has been selected from the list of sponsored policies. If the answer is "Yes," the system moves to Block 110, Select Corporate Sponsored Policy. If the answer is "No," the system moves to Block 112, User Selects Policy or Best, as shown by Screen 9. If the response is "Best," the system logic moves to 114, Select Best Product—whereupon the system solves for the policy that provides the best solution to the mathematical problem identified in Block 92, Solicit Insurance Requirements, given the underwriting information provided in Blocks 80, 82, 84, and 86 for joint and survivor policies and Blocks 88 and 90 for individual life insurance policies. "Best" is defined as the Minimum Premium mount if the dollar cost of the annual premium is the solved for amount. Otherwise, if the missing variables are cash value or death benefit, then the "Best" will be defined in terms of highest Death Benefit or Cash Value. Screen 10 provides a sample of a screen which is provided to the user to summarize all the information in the system prior to computing to find the "Best" policy. Because finding the best policy from many different policies can be a time-consuming process, this screen helps to avoid finding the "Best" policy using the wrong information. Screen 11 provides a representative example of a screen that appears before the user while the system is searching out the "Best" policy while Screen 12 shows the listing of the "Best" policies identified on the screen by the system based on a single premium payment.

If, on the other hand, the user wishes to select the policy from a number of different policies available in the system, then the system moves to Block 112, User Selects Policy. Screen 11 shows an example of a screen listing of available policies on the system. Policies are listed alphabetically, but the system provides an electronic policy search capability, allowing the user to search out all policies that match a given criterion such as carrier name, policy name, current life insurance policy interest credited rate, or guaranteed rate of interest in the life insurance policy.

Moving now to FIG. 3B-3, a schematic representation of the policy search function of the system is shown. Block 122, Corporate Sponsored/User Selection or Best Product, is the branch of the system logic that identifies whether the system is to illustrate one Corporate Sponsored/User Selected Product or whatever number of policies fit the "Best" criteria. Blocks 124, Solicit Best Product Criteria, and 126, Store Criteria, identify and store a count of products to be illustrated. Block 128, J Gets Total Number of Products Available, initializes a counter to keep track of the number of products meeting the desired criteria to be illustrated.

In FIG. 3B-4 a schematic representation of the insurance illustration function of the system is presented. First, in Block 140, the system retrieves all components needed for a projection of life insurance values: product-specific data from data tables, stored by product and carrier; information regarding the insured(s) and information regarding the prospective insured(s)' life insurance needs and other personal information as solicited and stored in FIG. 3B-1.

Moving now to Block 142, the system determines whether riders are present. If the answer is "No," then in Block 144, Compute 1st Premium, Trial Guideline for Policy, the system computes its first guess as to the premium amount, or uses the premium amount previously provided by the user. The system also computes a trial guideline amount, an initial estimate as to actuarial regulatory guideline values. Using trial amounts speeds the illustration process, by reducing the number of iterations needed. These trial amounts, used at the onset of the illustration process, assure that policy values computed during the illustration process will in most cases ultimately comply with regulatory definitions of insurance during the first round of computations.

In Block 146, Compute Specified Amount, the system uses the guideline values previously computed to calculate a Specified Amount. The Specified Amount is the amount that the insurance company will pay the beneficiary upon the death of the insured. In most states the Specified Amount must by law appear on page three of a life insurance policy. The Specified Amount is a common life insurance variable and is equal to the basic, stated policy death benefit (the face amount of the policy). The policy death benefit will remain equal to the Specified Amount until such time as changes in cash value cause it to change. Withdrawals of cash value or cash value growth may cause a decrease or increase in the death benefit. Returning now to another branch of the logic, if the answer to the question "Riders Present?" is "Yes," the system moves to 148 Compute 1st Premium Trial Guideline for Base Policy. With Riders present, the system calculates the Trial Guidelines and Premium amounts first for the base policy as previously described for a policy with no riders, then computes a Trial Guideline amount including the rider(s) in Block 150, then computes a Specified Amount including combined Rider and Base Policy values in Block 152, Compute Specified Amount w/Riders.

Then, in Block 154, Iterate on Target Value: Death Benefit, Cash Value or Premium, the system enters into an iterative illustration loop used to solve for the target value, refining its initial guesses as to Premium Guideline Amounts and Specified Amount, moving to FIG. 3F-1. In order to solve for these policy values the system computes additional guesses, and tests those guesses iteratively until it finds the appropriate target value. This kind of iteration is required because of the non-linear nature of universal life insurance policy values, as many of the policy values being solved for will have no closed form solution. Once the system has solved initial illustration and has a Premium and Specified Amount combination that corresponds to the target value, it saves it in Block 156, Save Specified Amount, Premium.

Next, in Block 158, Compute Guideline Single Premium for Base Policy, the system makes another illustration, this time calculating a Single Premium amount for the Base Policy assuming Guaranteed Carrier policy values, and corresponding to the Specified Amount previously computed in Block 156.

Moving now to FIG. 3B-5, in Block 164, Set Guideline Single Premium for Base Policy Equal to Premium variable, the system makes this equivalency, then in Block 166, Store, saves the information. Next in Block 170, Compute Guideline Level Premium for Policy, the system uses the aforementioned Specified Amount as the target value, and then finds the level annual premium amount, payable over the entire time of the illustration's duration and assuming guaranteed policy values, that would yield that Specified Amount. In Block 172, Store, the system saves this premium amount as well.

At Block 174, Riders Present, the system once again determines whether riders are present. If not, the system moves on to FIG. 3B-6. If so, the system moves on to Block 176, Compute Guideline Single Premium for Policy Including Riders. The calculation here is the same as that made in Block 158 except that this computation includes in the Specified Amount whatever additional coverage is provided for under the rider. In Block 178, Set Guideline Single Premium for Total Policy Equal to Premium Variable, the equivalency is made and the value is stored in Block 180. Similar steps are taken to compute values for the Guideline Level Premium including riders in Blocks 182 and 184. This value is stored in 186.

Moving on to FIG. 3B-6, Block 192, Recompute Specified Amount using Guideline Values, the system recomputes the Specified Amount, originally computed in Block 154, and saved in Block 156, this time using the Guideline Premium amounts computed in Blocks 158, 168, and 176, and 182 if riders are present. The Specified Amount so calculated in Block 192 is then compared in Block 194 to the previously calculated Specified Amount. In Block 196, Are Two Amounts Equal?, the system tests for equivalency. If the answer is "Yes," then the Specified Amount lies within actuarially defined regulatory guidelines for life insurance, and the system moves on to FIG. 3B-7. If the two values are not equal, the system in Block 198, First Pass, determines whether or not this is the first attempt at an illustration. If the answer is "No," the system determines whether the Premium Values are equal in Block 200. If the answer is "No," once again the system returns to either Z2 or Z3 depending on whether or not Riders are found to be present in Block 201. Both Z2 and Z3 are entry points for the illustration system in FIG. 3B-4.

If the two Specified Amounts are not equal in Block 196 and if this is not the first pass for the system in Block 198, the system returns to Z2 in the event that riders are present, and Z3 in the event that they are not, in Block 201.

Once the system has solved for the correct premium/cash value combination and has tested this value against regulatory requirements, the system carries out four other operations in FIG. 3B-7. First, it prepares a further illustration in Block 208. This illustration assumes that the policyholder pays the previously determined premium amount and maintains the desired death benefit. However, the illustration further assumes that the carrier pays only the minimum guaranteed interest crediting rate on policy cash value, and charges the maximum mortality charges possible under the terms of the insurance contract. Samples of these Guaranteed Values appear in FIG. 27D.

Next, the system in Block 210 computes two policy cost indices designed to provide the prospective applicant with a bench mark for measuring product performance. The first index is the Surrender Cost Index which is 1000 times the present value of premiums paid discounted at five percent minus the present value of the end-of-period cash value divided by the present value of the death benefits. The second index, known as the Net Payment Cost Index, is equal to 1000 times the ratio of the present value of the premiums discounted at five percent to the present value of the death benefits over the period discounted at five percent. The system calculates these two indices through Years 10 and 20 of the policy illustrated, assuming current interest and mortality charges apply, and assuming guaranteed interest and mortality charges apply. Sample calculations of these cost indices appears in FIG. 27E.

After the aforementioned analyses have been completed, the system saves the results in Block 212 for later printing. This completes the illustration for a particular financial product. Next, the system checks to see if it needs to make a similar computation for other products. If in Branch 156 it finds that not all desired products have been illustrated by comparing a target number of products to be illustrated with a counter, the system increments the counter in Block 214 and returns to FIG. 3B-4 to initiate another illustration.

Otherwise, the system tests whether more than one product has been illustrated (J>1), and if so, proceeds to Block 222 to find the best product based on the criteria entered in Block 92. In either case, the logic goes to Block 224 to store the insurance product specific data for an illustration.

Next in Block 226, Comparative Analysis, the system asks the user if he or she would like to see a comparison of the best policies. If the answer is "Yes," the system moves to FIG. 3B-9 and otherwise, the system goes to FIG. 3B-8.

Turning to FIG. 3B-8 at Block 166, the values relevant to the computation of an illustration are generated, then displayed at the user's terminal in Block 168, and stored in the Database 26. The user can select a number of options: Print Illustration? 172, which will print the information on the Local Printer 30 via Block 174; Print and Mail Illustration? 176, which will print the illustration on the Central Printer 20 for mailing to a requested address via Block 178; and Make Application Using This Illustration? 180, which merges illustration data with stored text to make an application form, in Block 182. Block 170 also will save the illustration results for further analysis or review. The logic returns to the submenu provided by Block 60 in FIG. 3. This return is helpful for changing the illustration assumptions in order to see a different version of the illustration.

Turning to FIG. 3B-9, a schematic representation of the comparative analysis function is shown. In Block 250, prepare J≦5 Best Illustrations, the system creates the illustration from the values stored in Block 224. Then, in Block 251, those values are printed side by side for comparison by the user. The system returns to the subroutine that called it.

Returning to FIG. 3, the Update Existing Illustration 66 function goes to FIG. 3C-1, which commences with Select Input Menu 252. This selection is depicted in User Screen 12, which is also known as the Update Existing Illustration Supermenu.

The logic then goes to the following boxes: Block 254 to update the prospective applicant data, including personal, employment, and health data; and Block 256 to update the insurance dam, including the premium structure, as well as the policy selection. These Blocks 254–256 permit the user to revise selected data in Database 26. Once the menu item has been selected and the update screen has been visited, Block 268 is used to facilitate going to the appropriate screen. The screens are filled in with the old data, and in Block 270 the user is allowed to change, add to, or delete from any of the existing data. Block 270 then returns to Block 252. When the user has gone through this loop as many times as necessary to update whatever screens need updating, from Block 252, the choice of Proceed, Block 258 can be made. The illustration process then proceeds to FIG. 3B-4, which then completes the illustration.

Additionally, the user may select Help, Block 260, which has been previously mentioned as being available from any screen in the system from the Update Existing Illustration Supermenu. A representative context-sensitive hypertext Help screen is shown in User Screen 13.

Lastly, Block 262 may be selected to quickly terminate the current illustration session and return to the Main Menu, 42, via Entry Point X1. The user is given an opportunity at this time to save what data has been entered thus far.

With further reference to FIG. 3, the Print Life Insurance Application 70 selection goes to FIG. 3D-1. Block 274 selects one form from a variety of insurance forms that could be printed, depending on the carrier. The logic proceeds to Block 276, which retrieves the existing prospective applicant data from Database 22, which was solicited in the process of creating the illustration, and prefills the insurance application form. If necessary, Block 278 allows the user to fill in any additional data. Then Block 280 prints the application at Local Printer 26. The logic proceeds to Block 282 which requests whether or not to send the application to the carrier electronically. If that answer, in fact, is "No," the logic goes to Return. If the answer is "Yes," Block 284 checks for completeness and permits sending the application to the Carrier via Block 286. Block 288 saves the insurance policy data and then returns to Block 70 in FIG. 3.

Review Insurance Product Developments 72 in FIG. 3, permits the user to read through prepared textual data by allowing the user to move from screen-to-screen. Once the user has completed a review of the data from Database 22, one or all of the textual screens or "pages" can be printed at the Local Printer 26.

More particularly, for Review Insurance Product Developments 72 in FIG. 3, the logic goes to FIG. 3E-1. In Block 292, new insurance product developments are retrieved and displayed for the user. Block 294 allows the new insurance product developments to be printed on the Local Printer 26, if desired, and then the logic returns to Block 72 on FIG. 3.

FIG. 3F-1 provides a schematic representation of the system's life insurance values computation and testing activities. In Block 300, Compute Insurance Values Using Specified Insurance Parameters, the system takes those values for Specified Amount, Premium, and targets from the subroutine that called it, and produces an illustration. Then, in Block 302, Target(s) Are Met, the system tests the value against the requested target, for example, death benefit or cash value. If the answer is "Yes" in Block 308, Store Premium Amount, LIFPAY, the system stores the Premium Amount associated with this illustration and returns to the subroutine that called it.

If, on the other hand, the answer to the above question is "No," the system goes on to determine in Block 304, First Trial, whether this is the first attempt at the computation. If the answer is "Yes," then the system generates a guess value in Block 306, Generate New Trial, and returns to Block 300 to make an additional computation. If, on the other hand, the answer to the question in Block 304 is "No," then the system moves to Block 310, Does this Trial Bracket?, where the system tests to see whether two values have been identified that lie above and below (i.e., bracket) the target value. If the answer is again "No," then the system moves to Block 306, Generate New Trial, thereby returning to Block 300 to generate an additional value.

If the answer to the question asked in Block 310 is "Yes," and the system has found two values above and below the Target value, the system next checks to see if the system has attempted an interpolation using three values, in Block 312, First Interpolation?. If the answer is "Yes," then the system uses Bisection to Interpolate the values in Block 314, Bisection Interpolation. Otherwise, in Block 316 the system uses Weighted Interpolation to arrive at an additional value.

In this manner, by iteratively interpolating between guess values and throwing out old guesses, the system converges rapidly on the desired value, and, having found it, returns the desired value to the subroutine that called it.

Discussion of Database Structures

FIG. 4A and FIG. 4B provide a depiction of a relational Database 22 for the present invention. The description of the relational Database 22 includes numbered entity (database table) definitions and detailed descriptions of the columns (fields) present and their characteristics. NOT NULL specifies that a column is required to be filled, and TYPE designates the type of data that this column contains. The following table definitions parallel the above entity definitions and detail the columns (fields) present and their characteristics.

ADDITIONAL_RESPONSES 400 has records of additional responses made by the prospective applicant to questions that appear on an insurance application form that were not solicited during the illustration process.

| Name | Null? | Type |
|---|---|---|
| APPLICATION_ID | NOT NULL | NUMBER |
| REQUEST_ID | NOT NULL | NUMBER |
| R_ORDER | NOT NULL | NUMBER |
| RESPONSE | | CHAR (255) |
| WP_FLDNUM | | NUMBER |

ALLOWED_RESPONSES 477 is a database entity holding information of permitted responses in the health questionnaire. Answers are used in identifying preferred risk applicants.

| Name | Null? | Type |
|---|---|---|
| REQUEST_ID | NOT NULL | NUMBER (8) |
| R_ORDER | NOT NULL | NUMBER (8) |
| VALUE | | CHAR (20) |
| REC_ORDER | NOT NULL | NUMBER (3) |
| NEXT_REQUEST | | NUMBER (8) |

APPLICATION 402 is a super entity which holds the various insurance applications 402A (each specific type of application is a view or instance of this table). These application records are built on information contained in the illustration, as well as supplemental information supplied by the prospective applicant (e.g., provided in ADDITIONAL_RESPONSES 400). There is one APPLICATION 402 record for every application created for a prospective applicant.

| Name | Null? | Type |
|---|---|---|
| APPLICATION_ID | NOT NULL | NUMBER |
| APPLICATION_TYPE | | CHAR (10) |
| THEPI_APPLICATION | | NUMBER |
| ILLUSTRATION_ID | | NUMBER |
| PAPER_FORM_ID | | NUMBER |
| STATUS | | CHAR (9) |

COI SET 470 is a data entity used to store information regarding special mortality data that an employer may have negotiated with a carrier as part of a corporate-sponsored program.

| Name | Null? | Type |
|---|---|---|
| COL_SET_ID | NOT NULL | NUMBER (8) |
| SPONSOR_ID | | NUMBER (8) |
| MORT_SET_NAME | NOT NULL | CHAR (30) |
| MORT_SET_TYPE | NOT NULL | CHAR (1) |
| MORT_CONVERSION_METHOD | | CHAR(1) |

CORPORATE SPONSOR GUARANTEE 464 is a data entity used to store information regarding the Corporate sponsor including information regarding eligibility requirements and contact information.

| Name | Null? | Type |
|---|---|---|
| CS_ID | | NOT NULL |
| NUMBER (8) | | |
| INSTITUTION_ID | NOT NULL | NUMBER (8) |
| INSURANCE_PACKAGE_ID | NOT NULL | NUMBER (8) |
| CONTACT_ID | NOT NULL | NUMBER |
| CODE | NOT NULL | CHAR (8) |
| ELIG_REQ | | CHAR (255) |

CORPORATE SPONSOR OFFICER 428 is used to store information needed to identify those individuals permitted to use the system to offer corporate sponsored quotes.

| Name | Null? | Type |
|---|---|---|
| INSTITUTION_OFFICER_ID | NOT NULL | NUMBER |
| INSTITUTION_OFFICER_TYPE | | CHAR (30) |
| LAST_NAME | | CHAR (50) |
| FIRST_NAME | | CHAR (30) |
| INSTITUTION_ID | | NUMBER |
| PHONE | | NUMBER (10) |
| PHONE_EXTENSTION | | NUMBER |
| STATUS | | CHAR (10) |
| ACCOUNT_NAME | | CHAR (30) |
| PRIVS | | CHAR (10) |
| PRINTER_DRIVER | | CHAR (20) |
| GENERIC | | CHAR (1) |

The EMPLOYMENT 412 entity contains the employment data for the prospective applicant requesting an illustration, such as place of employment, salary, etc.

| Name | Null? | Type |
|---|---|---|
| EMPLOYMENT_ID | NOT NULL | NUMBER |
| EMPLOYER_ID | | NUMBER |
| PERSON_ID | | NUMBER |
| OCCUPATION | | CHAR (30) |
| TITLE | | CHAR (30) |
| PHONE | | NUMBER (10) |
| PHONE_EXTENSION | | NUMBER |
| SALARY | | NUMBER |
| GENERIC | | CHAR (1) |

FINANCIAL_INDEX_DESC 471 is a database entity used to track special indexes used by the system illustrating insurance products. Some policies use a particular financial index, the average rate for T-Bills or Moody's Baa Bond rate for example, as a means of calculating the policy crediting rate. This database structure stores the index name and code.

| Name | Null? | Type |
|---|---|---|
| INDEX_CODE | NOT NULL | CHAR (3) |
| INDEX_NAME | | CHAR (50) |

FINANCIAL_INDEX_VALUES 470 is a database entity employed by the system to store the index values for the Financial Index described in FINANCIAL_INDEX_DESCRIPTION 471.

| Name | Null? | Type0 |
|---|---|---|
| INDEX_CODE | NOT NULL | CHAR (3) |
| VALUE | | NUMBER (7,4) |
| BEGIN_DATE | NOT NULL | DATE |
| END_DATE | | DATE |

The FMA_HELP 414 entity contains all context sensitive, hypertext linked help records for Help 18. It contains context keywords, and hyperlink keywords in addition to the help text that enables these features.

| Name | Null? | Type |
|---|---|---|
| FACILITY | NOT NULL | NUMBER (4) |
| TOPIC | NOT NULL | CHAR (30) |
| LINE | NOT NULL | NUMBER (5) |
| TEXT | | CHAR (80) |

The HEALTH_QUESTION 416 entity contains the individual questions that comprise a specific health questionnaire. Depending on the question and questionnaire, a specific question may appear in multiple health questionnaires.

| Name | Null? | Type |
|---|---|---|
| HEALTH_QUESTION_ID | NOT NULL | NUMBER |
| HEALTH_QUESTION_TYPE | | CHAR (30) |
| SEQUENCE_NUMBER | | NUMBER |
| QUESTION_LINE1 | | CHAR (70) |
| QUESTION_LINE2 | | CHAR (70) |
| QUESTION_LINE3 | | CHAR (70) |

The HEALTH_QUESTION_RESPONSE 418 entity contains the responses to the health questions by the prospective applicant. It contains responses to all of the health questions, be they simplified or medical underwriting types.

| Name | Null? | Type |
|---|---|---|
| HEALTH_QUESTION_RESPONSE_ID | NOT NULL | NUMBER |
| PERSON_ID | | NUMBER |
| HEALTH_QUESTION_ID | | NUMBER |
| RESPONSE | | CHAR (1) |
| REMARK | | CHAR (255) |
| CREATE_DATE | | DATE |
| CHANGE_DATE | | DATE |

An ILLUSTRATION 422 is a document (both hard copy and database record) that is produced for a PERSON 452 (prospective applicant). Multiple illustrations may be produced for a single prospective applicant illustrating various insurance selections, but each illustration pertains to a single prospective applicant (or joint applicants). Any illustration may result in an insurance and loan application. The ILLUS- TRATION 422 entity contains both data and pointers to data for all aspects of an illustration.

| Name | Null? | Type |
|---|---|---|
| ILLUSTRATION_ID | NOT NULL | NUMBER (8) |
| ILLUSTRATION_TYPE | | CHAR (10) |
| ILLUSTRATION_DATE | | DATE |
| STATUS | | CHAR (10) |
| PERSON_ID | | NUMBER (8) |
| PERSON_DOB | | DATE |
| PERSON_SALARY | | NUMBER (10,2) |
| PERSON_INTEREST_DIVIDENDS | | NUMBER (10,2) |
| PERSON_OTHER_INCOME | | NUMBER (10,2) |
| COPERSON_ID | | NUMBER (8) |
| COPERSON_DOB | | DATE |
| COPERSON_SALARY | | NUMBER (10,2) |
| COPERSON_INTEREST_DIVIDENDS | | NUMBER (10,2) |
| COPERSON_OTHER_INCOME | | NUMBER (10,2) |
| TAX_RATE | | NUMBER (4,2) |
| PRIN | | NUMBER (10,2) |
| INSURANCE_PACKAGE_ID | | NUMBER (8) |
| INSURANCE_CARRIER_ID | | NUMBER (8) |
| INSURANCE_AGENT_ID | | NUMBER (8) |
| UNDERWRITING_TYPE | | CHAR (30) |
| HEALTH_ANY_YESES | | CHAR (1) |
| INSURANCE_RATE | | NUMBER (7,4) |
| CS_ID | | NUMBER (8) |
| LOC_ID | | NUMBER (8) |
| LOC_CONTACT_ID | | NUMBER (8) |
| DEATH_BENEFIT | | NUMBER (10,2) |
| CLOSING DATE | | DATE |
| LIFPAY | | NUMBER (8,2) |
| LNUM | | NUMBER (2) |
| SA | | NUMBER (10,2) |
| CV_10 | | NUMBER (10,2) |
| CV_20 | | NUMBER (10,2) |
| THEPL_USER_ID | | NUMBER (8) |
| MORT_GROUP_NAME | | CHAR (30) |
| QF | | NUMBER (6,3) |
| IANC10_GUAR | | NUMBER (7,2) |
| IANC20_GUAR | | NUMBER (7,2) |
| NPI10_GUAR | | NUMBER (7,2) |
| NPI20_GUAR | | NUMBER (7,2) |
| IANC10_CURR | | NUMBER (7,2) |
| IANC20_CURR | | NUMBER (7,2) |
| NPI10_CURR | | NUMBER (7,2) |
| NPI20_CURR | | NUMBER (7,2) |
| SELECTED_INSURANCE_STATE | | CHAR (2) |
| PERSON_SMOKER_FLAG | | CHAR (1) |
| PERSON_RISK_FLAG | | CHAR (1) |
| COPERSON_SMOKER_FLAG | | CHAR (1) |
| COPERSON_RISK_FLAG | | CHAR (1) |
| MAX RATE | | NUMBER (7,4) |

ILLUSTRATION DATA 478 is an entity used to store information from past illustrations. This permits the system to pick up where it left off in allowing the user to improve upon illustrations for PERSON 452.

| Name | Null? | Type |
|---|---|---|
| ILLUSTRATION_ID | NOT NULL | NUMBER (8) |
| YEAR | NOT NULL | NUMBER (2) |
| CV | | NUMBER (12,2) |
| MINS | | NUMBER (12,2) |
| CVMAX | | NUMBER (12,2) |
| CVGIP | | NUMBER (12,2) |
| MINSGIP | | NUMBER (12,2) |
| LPAY | | NUMBER (8,2) |

The ILLUSTRATION_RIDERS 424 table, also an intersection table, contains a list of all of the rider clauses required for a particular illustration.

| Name | Null? | Type |
|---|---|---|
| ILLUSTRATION_ID | NOT NULL | NUMBER (8) |
| RIDER_ID | NOT NULL | NUMBER (8) |
| BENEFIT_AMT | | NUMBER (9) |
| BENEFIT_YRS | | NUMBER (2) |

The INSTITUTION 426 entity is a super entity (like APPLICATION 402) which holds the various institution types. Each specific type of institution (e.g., INSURANCE_CARRIER) is a view of this table. There is an INSTITUTION 426 record for every institution participating in the illustration process. The INSTITUTION 426 entity is not shown on the Entity Relationship Diagram (ERD) of FIG. 4A and FIG. 4B. Rather, the specific views are represented. These are:
INSURANCE_AGENT
AGENCY (not shown)
EMPLOYER/CORPORATE_SPONSOR
INSURANCE_CARRIER The INSTITUTION_OFFICER 428 entity is a super entity (like APPLICATION 402) which holds the various institution officer types. Each specific type of institution officer (e.g., INSURANCE_AGENT) is a view of this table. There is an INSTITUTION_OFFICER record for every institution officer participating in the illustration process. The INSTITUTION_OFFICER entity is not shown on the ERD of FIG. 4A and FIG. 4B. Rather, the specific views are represented. These are:
CORPORATE_SPONSOR_OFFICER
INSURANCE_AGENT
USER

| Name | Null? | Type |
|---|---|---|
| INSTITUTION_OFFICER_ID | NOT NULL | NUMBER |
| INSTITUTION_OFFICER_TYPE | | CHAR (30) |
| LAST_NAME | | CHAR (50) |
| FIRST_NAME | | CHAR (30) |
| INSTITUTION_ID | | NUMBER |
| PHONE | | NUMBER (10) |
| PHONE_EXTENSION | | NUMBER |
| STATUS | | CHAR (10) |
| ACCOUNT_NAME | | CHAR (30) |
| PRIVS | | CHAR (10) |
| PRINTER_DRIVER | | CHAR (20) |

INSURANCE CARRIER 426 is a database entity used to store information regarding each of the carriers whose products are illustrated by the system. It stores information regarding each carrier's name and address, contact, and ratings which are used in the illustration process.

| Name | Null? | Type |
|---|---|---|
| INSTITUTION_ID | NOT NULL | NUMBER (8) |
| INSTITUTION_TYPE | | CHAR (30) |
| INSTITUTION_NAME | | CHAR (50) |
| DIVISION | | CHAR (30) |
| ADDRESS_LINE1 | | CHAR (50) |
| ADDRESS_LINE2 | | CHAR (50) |
| CITY | | CHAR (30) |
| COUNTY | | CHAR (30) |
| STATE | | CHAR (2) |
| ZIP | | NUMBER (5) |
| PHONE | | NUMBER (10) |
| CONTACT_PERSON_ID | | NUMBER (8) |
| CORPORATE_SPONSOR_ID | | NUMBER (8) |
| FINANCIAL_SPONSOR_ID | | NUMBER (8) |
| MOODYS_RATING | | NUMBER (7,2) |
| GENERIC | | CHAR (1) |

INSURANCE_EXPBRK 474 is a database entity used to store information regarding life insurance cash value breakpoints. Breakpoints are levels of cash value which trigger changes in policy charges.

| Name | Null? | Type |
|---|---|---|
| EXPBRK_ID | NOT NULL | NUMBER (8) |
| LEXP_ID | NOT NULL | NUMBER (8) |
| LEXPBRK | NOT NULL | NUMBER (8,2) |

INSURANCE_LPCT 473 is a database entity used to store information regarding the percentage of premium charges applied by the carrier for a given product.

| Name | Null? | Type |
|---|---|---|
| LPCT_ID | NOT NULL | NUMBER (8) |
| BEGIN_AGE | | NUMBER (2) |
| END_AGE | | NUMBER (2) |
| SEX | | CHAR (1) |
| SMOKING_FLAG | | CHAR (1) |
| RISK_FLAG | | CHAR (1) |
| LPCT1AF | | NUMBER (5,2) |
| LPCT1AV | | NUMBER (5,2) |
| LPCT1AC | | NUMBER (5,2) |
| LPCT1BF | | NUMBER (5,2) |
| LPCT1BV | | NUMBER (5,2) |
| LPCT1BC | | NUMBER (5,2) |
| LPCT2AF | | NUMBER (5,2) |
| LPCT2AV | | NUMBER (5,2) |
| LPCT2AC | | NUMBER (5,2) |
| LPCT2BF | | NUMBER (5,2) |
| LPCT2BV | | NUMBER (5,2) |
| LPCT2BC | | NUMBER (5,2) |
| LPCTY | | NUMBER (5,2) |
| LPCTSA | | NUMBER (5,2) |

INSURANCE MONTH EXPENSE 475 stores information regarding policy fixed charges like administration or selling charges levied by the carrier. Because system policy values are calculated in a monthly basis, this information is stores by policy month.

| Name | Null? | Type |
|---|---|---|
| LEXP_ID | NOT NULL | NUMBER (8) |
| MONTH | | NUMBER (3) |
| LEXPF | | NUMBER (7,2) |
| LEXPV | | NUMBER (7,2) |

The INSURANCE_PACKAGE 430 entity details the insurance packages available to be chosen for an illustration—the rates, duration, etc. This list can be viewed during the illustration process.

| Name | Null? | Type |
|---|---|---|
| INSURANCE_PACKAGE_ID | NOT NULL | NUMBER (8) |
| BEGIN_DATE | | DATE |
| END_DATE | | DATE |
| POLICY_NAME | | CHAR (50) |
| INSURANCE_CARRIER_ID | | NUMBER (8) |
| PREMIUM_PAYMENT_STURCTURE | | (CHAR) (50) |
| POLICY_TYPE | | CHAR (50) |
| POLICY_TERM | | NUMBER (3) |
| INLP | | NUMBER (7,4) |
| INSP | | NUMBER (7,4) |
| IC1 | | NUMBER (7,4) |
| IC2 | | NUMBER (7,4) |
| ICBREAK | | NUMBER (7,4) |
| ID_GUIDE_GUARANTEE | | CHAR (1) |
| IC_MIN_INT_GUARANTEE | | CHAR (1) |
| QX_GUIDE_GUARANTEE | | CHAR (1) |
| QX_MIN_INT_GUARANTEE | | CHAR (1) |
| ICL | | NUMBER (7,4) |
| IL | | NUMBER (7,4) |
| CURRENT RATE | | NUMBER (7,4) |
| GUARANTEED_RATE | | NUMBER (7,4) |
| MAX_CHANGE_RATE | | NUMBER (7,4) |
| UNDERWRITING_TYPE | | CHAR (30) |
| CSO_TABLE_NAME | | CHAR (30) |
| CSO_DEFAULT_BLEND | | NUMBER (5,2) |
| CSO_SMOKE_AGGR_FLAG | | CHAR (1) |
| PAPER_FORM_ID | | NUMBER (4) |
| GENERIC | | CHAR (1) |
| CV_RATIO | | NUMBER (7,4) |
| COMMIT_DAYS | | NUMBER (3) |
| INDEX_CHANGE_TOL | | NUMBER (7,4) |
| INDEX_FROM_MONTH | | NUMBER (2) |
| INDEX_TO_MONTH | | NUMBER (2) |
| INDEX_CODE | | CHAR (3) |
| TRATE | | NUMBER (7,4) |
| TEXP | | NUMBER (7,4) |
| TLOAD | | NUMBER (5,2) |
| QXG_TABLE_NAME | | CHAR (30) |
| QXG_APPROX_FLAG | | CHAR (1) |
| IC1_INCR | | NUMBER (7,4) |
| IC2_INCR | | NUMBER (7,4) |
| LEXPSELL | | NUMBER (7,2) |
| ANNUITY_ID | | NUMBER (8) |
| EXPBRK_ID | | NUMBER (8) |
| GUARANTEE_MONTHS | | NUMBER (2) |
| CSO_BLEND_ID | | NUMBER (8) |

-continued

| Name | Null? | Type |
|---|---|---|
| LPCT_ID | | NUMBER (8) |
| LPCT_ACE_FLAG | | CHAR (1) |
| LPCT_SEX_FLAG | | CHAR (1) |
| LPCT_SMOKING_FLAG | | CHAR (1) |
| LPCT_RISK_FLAG | | CHAR (1) |
| QXG_TYPE | | CHAR (1) |
| QXG_MORT_CON-VERSION_METHOD | | CHAR (1) |
| COI_SET_ID | | NUMBER (8) |
| QXG_SMOKE_AGGR_FLAG | | CHAR (1) |
| CV_LOAN_INT_FLAG | | CHAR (1) |

MORT 462 tabulates mortality figures (either in strict deaths per thousand or cost of insurance). While the common mortality tables (CSO and the like) and the product specific Cost Of Insurance (COI) tables are essentially the same, there are some differences.

Both conceptual tables are housed inside one relational database table structure (MORT 462) to allow for ease of access. The relational table's structure for the MORT 462 table follows:

| Name | Null? | Type |
|---|---|---|
| GROUP_NUMBER | NOT NULL | NUMBER (8) |
| AGE_OF_ISSUE | | NUMBER (2) |
| YEAR_AGE | NOT NULL | NUMBER (3) |
| MONTH | | NUMBER (2) |
| MORTALITY | NOT NULL | NUMBER (9,5) |

The MORT 462 table is organized into groups of records, each group having the same GROUP_NUMBER. A group is a "Mortality Table." Each combination of the following attributes will reference a GROUP_NUMBER:

Male/Female

Smoking/Non-smoking/Aggregate

Age last/Age nearest

Insurance Product

CSO table/COI table

A GROUP_NUMBER may be used by any combination. Therefore, for a particular Group (mortality table), for example, the 1980 CSO table for Male/Non-smoking/Age last (no product designation in this case), there are records for ages 18 through 99 as shown below:

| GROUP_NUMBER | AGE_OF_ISSUE | YEAR | MORTALITY |
|---|---|---|---|
| 1 | NULL | 18 | 12.0 |
| 1 | NULL | 19 | 20.0 |
| . | . | . | . |
| . | . | . | . |
| . | . | . | . |
| 1 | NULL | 99 | 1000.0 |

Note that in the case of the CSO tables, there is nothing in the AGE_OF_ISSUE column (NULL). So, to reference the CSO Group that corresponds to Male/Non-smoking/Age last, the system retrieves all records for GROUP_NUMBER+1.

To satisfy all combinations of the above attributes for the CSO tables (Male/Female, Smoking/Non-smoking/Aggregate, Age last/Age nearest) there are as many as 12 groups, each group having entries for ages 18 through 99 years of age. Thus, there will be 82 (i.e., 99−18+1) rows (i.e., records) in each group, one for each year of age, times each of the 12 combinations, resulting in 984 records for the collection of all 12 CSO groups. Like the common mortality groups (mortality tables), the COI groups are organized by GROUP_NUMBER. The GROUP_NUMBER in this case segregates groups not only by sex, smoking, etc., but also by insurance product. But unlike the common mortality tables, there is a sub-group structure to the CSO table based on the prospective applicant's age at the time of policy issue. There is a special "sub-table," selected by the prospective applicant's age, as designated by the AGE_OF_ISSUE column, that is used for the first $Y_S$ years. The AGE_OF_ISSUE entry specifies the select versus ultimate portions of the mortality table. If the AGE_OF_ISSUE column is NULL, then that series of records correspond to the ultimate series within that particular insurance product group. The CSO mortality table, then, is a standard mortality table with $Y_S=0$ (i.e., no select entries).

One further difference is that the year/age column designates age of the insured for ultimate groups, but designates year of policy for select groups.

An applicant's cost of insurance will be determined by selecting the rows corresponding to a particular group number (which may be for a specific insurance product and a specific collection of attributes such as sex, smoker, etc.) for the applicant's AGE_OF_ISSUE. There will be typically 10 or less rows ($Y_S$) within a particular AGE_OF_ISSUE sub-group. For years beyond the $Y_S$ years, the ultimate group is used, which is retrieved by selecting the rows for this GROUP_NUMBER whose AGE_OF_ISSUE is NULL and whose "year/age" entries are AGE_OF_ISSUE+$Y_S$ and greater.

An example of a COI group is given below:

| GROUP_NUMBER | AGE_OF_ISSUE | YEAR | MORTALITY |
|---|---|---|---|
| 5 | 35 | 1 | 12.0 |
| 5 | 35 | 2 | 20.0 |
| . | . | . | . |
| . | . | . | . |
| 5 | 35 | 10 | 100.0 |
| . | . | . | . |
| . | . | . | . |
| 5 | 40 | 1 | 22.0 |
| 5 | 40 | 2 | 50.0 |
| . | . | . | . |
| . | . | . | . |
| 5 | 40 | 10 | 500.0 |
| . | . | . | . |
| 5 | NULL | 10 | 2.0 |
| 5 | NULL | 11 | 5.0 |
| . | . | . | . |
| 5 | NULL | 99 | 1000.0 |

The above shows two of the select sub-groups (for age of issue 35 and 40) for COI group 5, as well as the ultimate group (age of issue=NULL) for COI group 5. (Subgroups will be present for all possible AGE_OF_ISSUE values).

The COI group 5 may be used by any insurance product. This association of product to group (mortality table) is managed by the MORT_REGISTER 460 table.

THE MORT SELECTOR 460 entity documents the association of group numbers with various combinations of prospective applicant attributes and insurance products.

| Name | Null? | Type |
|---|---|---|
| MORT_SET_NAME | NOT NULL | CHAR (30) |
| STATE | | CHAR (2) |
| SEX | NOT NULL | CHAR (1) |
| SMOKING | NOT NULL | CHAR (1) |
| RISK | | CHAR (1) |
| GROUP_NUMBER | NOT NULL | NUMBER (8) |
| DESCRIPTION | | CHAR (255) |
| YS | | NUMBER (2) |
| AGE_TYPE | NOT NULL | CHAR (1) |
| MORT_TYPE | NOT NULL | CHAR (1) |
| BEGIN_DATE | NOT NULL | DATE |
| END_DATE | NOT NULL | DATE |

This table documents the association of group numbers with the various combinations of attributes possible:
Male/Female
Smoking/Non-smoking/Aggregate
Age last/Age nearest
Insurance Product
CSO table/COI table
For example:

| GROUP_NUMBER | YS | GROUP_NAME | DESCRIPTION |
|---|---|---|---|
| 1 | 0 | CSO-M-N-AL | CSO table Male/Non-smoking/Age last |
| 2 | 0 | CSO-F-N-AL | CSO table Female/Non-smoking/Age last |
| 3 | 0 | CSO-M-S-AL | CSO table Male/Smoking/Age last |
| . | . | . | . |
| . | . | . | . |
| . | . | . | . |
| 100 | 8 | METRO-117 | Metro 117 table; Male/Non-smoking/Age last, commonly used by sponsored policies |

The "description" data in MORT_REGISTER 460 is simply that. It describes the attributes of each table for use in managing the system. During the illustration process the system uses another database entity to select which of the MORT_REGISTER 460 tables are applicable to a particular product. The actual logical selection of which table is to be used for each combination is accomplished by entries in the INSURANCE_PACKAGE 430 table, which describes in detail each insurance product available to the system, and which, through its associated detail tables, points to the particular MORT_REGISTER 460 Groups to be used, for each sex/smoking/etc. combination, in illustrating that particular product, referring to each group by its GROUP_NAME.

NEW INSURANCE DEV 468 entity describes the information regarding new product developments that is broadcast to users through the system.

| Name | Null? | Type |
|---|---|---|
| INSURANCE_CARRIER_ID | NOT NULL | NUMBER (8) |
| INPUT_DATE | NOT NULL | DATE |
| DEV_TEXT | NOT NULL | LONG |

The PAPER_FORM 446 entity describes the individual paper form for the specific insurance application forms, illustration forms, and health questionnaires used by the system. It holds global information regarding the form (e.g., WordPerfect merge file name). It is pointed to by the individual PAPER_FORM_ITEM.

| Name | Null? | Type |
|---|---|---|
| PAPER_FORM_ID | NOT NULL | NUMBER |
| PRIMARY_MERGE_FILE | | CHAR (30) |
| STARTING REQUEST ID | | NUMBER |

A PERSON 452 (applicant) is defined as a person or husband/wife couple who collectively request an illustration. A PERSON 452 file may contain two insureds. Two insureds could have, for example, two separate policies with coverage proportional to their share of the combined household income. Two insureds may own a single policy. A single policy option for two insureds includes a joint and survivor policy wherein death benefits are paid upon the death of the second insured to die, and a policy with a spousal rider which pays a death benefit on the death of the first insured. Each PERSON 452 may have requested multiple illustrations.

| Name | Null? | Type |
|---|---|---|
| PERSON_ID | NOT NULL | NUMBER |
| PERSON_TYPE | | CHAR (10) |
| LAST_NAME | | CHAR (50) |
| FIRST_NAME | | CHAR (30) |
| MIDDLE_NAME | | CHAR (30) |
| ADDRESS_LINE1 | | CHAR (50) |
| ADDRESS_LINE2 | | CHAR (50) |
| CITY | | CHAR (30) |
| STATE | | CHAR (2) |
| ZIP | | NUMBER (5) |
| PHONE | | NUMBER (10) |
| DOB | | DATE |
| DATE_OF_DEATH | | DATE |
| SEX | | CHAR (1) |
| MARITAL_STATUS | | CHAR (10) |
| EMPLOYMENT_STATUS | | CHAR (10) |
| INTEREST_DIVIDENDS | | NUMBER |
| OTHER_INCOME | | NUMBER |
| INCOME_TAX_RETURN_TYPE | | CHAR (10) |
| THEPI_USER_ID | | NUMBER |
| STATE_OF_RESIDENCE | | CHAR (2) |
| STATE_OF_EMPLOYMENT | | CHAR (2) |
| SSN | | CHAR (2) |
| HEIGHT_FEET | | NUMBER |
| HEIGHT_INCHES | | NUMBER |
| US_CITIZEN | | CHAR (1) |
| WEIGHT | | NUMBER |
| COUNTY | | CHAR (30) |
| SMOKER_FLAG | | CHAR (1) |
| RISK_FLAG | | CHAR (1) |

PRODUCT LICENSE STATE 472 is the database entity for storing information as to whether or not a particular PRODUCT is licensed in a given state.

| Name | Null? | Type |
|---|---|---|
| PRODUCT_ID | NOT NULL | NUMBER (8) |
| STATE | NOT NULL | CHAR (2) |

REQUESTED RESPONSES 476 is the database entity for storing that information to which the Health Questionnaire answers are compared in evaluating the health of an initial applicant. The data is stored as a table.

| Name | Null? | Type |
|---|---|---|
| REQUEST_ID | NOT NULL | NUMBER (8) |
| R_ORDER | NOT NULL | NUMBER (3) |
| TABLE_NAME | | CHAR (30) |
| COLUMN_NAME | | CHAR (30) |
| PRE_CONDITION | | CHAR (30) |
| PROMPT1 | | CHAR (60) |
| PROMPT2 | | CHAR (60) |
| PROMPT3 | | CHAR (60) |
| PROMPT4 | | CHAR (60) |
| LABEL | | CHAR (10) |
| REQUIRED_FLAG | | CHAR (1) |
| WP_FLDNUM | | NUMBER |
| EDIT_ATTRIB | | CHAR (30) |

The RIDER 456 entity describes the insurance riders available for use in the illustration process. A policy rider is an amendment attached to a policy that modifies the conditions of the policy by expanding, or decreasing its benefits or excluding certain conditions from coverage. Typical examples of policy riders include disability income riders which pay a benefit equal to the mortgage cost in the event the insured(s) are disabled and waiver of premium riders (typically used in conjunction with disability riders to waive the cost of insurance charges in the policy in the event the insured is disabled).

| Name | Null? | Type |
|---|---|---|
| RIDER_ID | NOT NULL | NUMBER |
| RIDER_TYPE | | CHAR (10) |
| RIDER_TEXT | | CHAR (255) |
| COL_SET_ID | | NUMBER (8) |
| QXG_TABLE_NAME | | CHAR (30) |
| QXG_TYPE | | CHAR (1) |
| QXG_MORT_CONVERSION_METHOD | | CHAR (1) |
| QXG_SMOKE_AGGR_FLAG | | CHAR (1) |

The UPDATE_ACTIVITY 458 entity is an internal table that is used to keep track of the dates of supervisory update and modification operations made to the various reference tables (e.g., INSURANCE_PACKAGE 430 etc.).

| Name | Null? | Type |
|---|---|---|
| UPDATE_TYPE | | CHAR (30) |
| UPDATE_DATE | | DATE |
| VALID_THRU_DATE | | DATE |

Discussion of Variables

The following variables, identities, and formulas show how the insurance illustrations of the kind previously described are computed in a preferred embodiment of the invention. Because these variables are used throughout the illustration process, references to how and where they are used will include multiple Figures and Blocks. Every effort, however, has been made to illustrate the flow of system logic in the description of the variables and computations.

The following variables Bwsp, Badb, Bali, Bals represent the amount of additional insurance benefits that may be purchased through the endorsement of a life insurance policy rider.

Bwsp: This variable represents the waiver of stipulated premium benefit. It is input by the user. The waiver of premium is an annual benefit payable to the insured in the event of disability of the insured, for the period during which premiums are due. The benefit should pay those premiums. It is a stipulated amount and any excess is payable to the insured. Likewise, any insufficiency is still due from the insured. This coverage does not apply to the disability of the second insured. The actual amount is limited by the policy to the total guideline premium (defined below). If the guideline premium, when determined, is smaller than Bwsp, the system must reduce the amount of the waiver of premium benefit so that it is in line with the regulatory guideline.

Badb: This is the variable for the amount of accidental death benefit purchased through a policy rider, over and above the universal life insurance death benefit. An accidental death benefit is an additional amount of life insurance payable in the event the insured individual dies in an accident. This value is a system input.

Bali: This variable represents an additional death benefit, purchased through a policy rider, as a separate additional benefit. It is payable only upon the death of the insured. This value is a system input.

Bals: This is the variable for an additional amount of life insurance, purchased through a policy rider, as an additional life insurance benefit covering the spouse of the insured. This is a means of providing, through the system, joint coverage payable on the death of the first insured.

Nwsp(min): This is the minimum number of years for which a Bwsp benefit would be paid.

Joint policy flag: This flag is set if there is to be a second insured to be covered by the insurance policy. The flag indicates to the system that a benefit is payable only on the death of the last of two individuals. The flag is also set in the event there is an additional life insurance benefit, Bals, desired for the spouse. There are two different values for this flag. If selected, the underwriting information regarding the second person, including age, sex, smoking status and health are collected by the system as well.

inlp: This is the percentage discount rate for a Guideline Level Premium (GLP) value calculation which is computed in FIG. 3B-5, Block 146. The system stores this information by product. The variable, mlp=monthly multiplier=$(1+inlp)^{1/12}$, is computed upon use of inlp.

insp: This is the discount rate, expressed as a percentage, for the Guideline Single Premium (GSP) value calculation which is computed in FIG. 3B-5, Block 146. The system stores this information by product. The variable, msp= monthly multiplier=$(1+insp)^{1/12}$, is computed upon use of insp.

The mortality table data discussed below is stored as percentages. The system stores all percentages as such. All formulas assume the fractional equivalent which is the value divided by one hundred. The stored values, however, are not generally integers.

CSO(a): All values from the Commissioner's Standard Ordinary Table, a common mortality table published in 1980, are stored in deaths per 1000 at age a. These are real numbers. The system allows up to five place accuracy after the decimal point, i.e., xxx.xxxxx.

The table, as it is used by the system, is tabulated for ages eighteen through ninety-nine. This table is used for GSP and GLP calculations in FIG. 3B-5, Block 146 and is therefore a system parameter. The system contains several versions of the 1980 CSO tables. They include: Male/Female, Smoking/ Nonsmoking/Aggregate, and Age last/Age nearest. The system contains, therefore, a total of 2×3×2=12 tables. Table entries appear as a value per thousand and are used to obtain a fractional probability of death. Each product indicates whether to use the male/female tables in accordance with the sex of the insured, or whether to use a blend. If a blend is indicated, the product data table indicates the percentage male. The remainder is female. An exception table exists, by state, for each product. Multiple products may be present in the system for a single carrier and all use this same exception table. However, this is not a system rule. There is not a unique exception table for every product, but a given exception table may apply to any number of products, including just one. If an entry is present, it mandates the blend percentage male to use for policies issued in that state for the product(s) referencing that table. That blend percentage will override any generic male/female or blend selection in the product. This feature is a system requirement because some states require the use of unisex tables weighted exactly in proportion with the carrier's male/female weighting of its existing insured population.

$A_{max}$: This is the variable for the assumed maximum survival age. This is a system parameter. Typically, it is age ninety-five or ninety-nine. For the sake of consistency, this document has assumed age ninety-nine throughout its discussion.

LEXP(n): This is the variable for per-policy expenses, in month n. The cost is independent of the premium size and the prospective applicant's characteristics. It is dependent, however, on month and Specified Amount, SA. A table exists for each product to store this information. Each table entry, for month n of the insurance period, contains two values: a fixed dollar amount, LEXPF(n), and a percentage amount expressed as cost per $1,000 of SA: LEXPV(n).

On use in FIG. 3B-4, Block 128, the system computes $$LEXP(n) = LEXPF(n) + \frac{LEXPV(n) \times SA}{1000}$$

In month one, the system adds LEXPSELL, a one time charge by product, to LEXP(n).

LPCT(n): This variable is the percent-of-premium expense charged by the carrier, in a given month n. For each product, the system develops a "table" of values, generated from parameters for that product. It likewise is used in FIG. 3B-4, Block 128.

For each combination of the criteria below which a product uses, the system contains six values. These values are reflected using flags for a particular product's criteria. LPCT1A and LPCT1B are the initial values, LPCT2A and LPCT2B are the continuing values, and LPCTY is the year number (of the policy) at the beginning of which the system switches between pairs 1 and 2.

$$LPCTx(n) = LCPT1x, \quad n \leq 12 \times (LPCTY - 1)$$
$$= LCPT2x, \quad n > 12 \times (LPCTY - 1)$$
$$\text{for } x = A \text{ and } B$$

LPCTSA: This variable is the break ratio, in dollars per thousand dollars of Specified Amount or basic death benefit, SA. (The formula for Specified Amount appears later in the formula description text.) This is used to compute a break-point value for LPCT(n).

$$LPCTBRK = LPCTSA \times SA$$

Then, when the equations call for applying LPCT(n) the system uses LPCTA(n) on the first LPCTBRK dollars, and LPCTB(n) on the remainder. If LPCTSA=0, there is no break and, for ease of computation, the system stores equal values for the A and B versions.

Rx(a) This variable represents the annual cost of insurance at attained age a. The data is contained in multiple tables. The data is stored by product. However, a single set of tables, with state exceptions (please see below), may service multiple products. The data is stored as real values, in terms of mortality per 1000. Wherever used in a formula in this patent application, it should be understood that the value used is the probability of dying at age $$a = \frac{Rx(a)}{1000}.$$

This variable is used in the computation of cash value and death benefit amounts in FIG. 3B-4, Block 128.

dx(a) This is a table for the monthly cost of insurance values. It is shown as a computed value in the formulas, as computed from Rx(a). The system allows for a product to point to tables, directly, in the same structure, for example Select/Ultimate, and with the same selection criteria, sex, smoking, etc., and sponsored/unsponsored flags as Rx(a).

The following statements apply to both Rx(a) and, if present, dx(a). Every Rx and dx table in the system is in two parts, Select and Ultimate, either of which may be empty. It is rare for part two, the Ultimate Table, to be empty. The Select Table is empty more frequently. The first part is the Select table. The select table is actually a table of tables. (See also the MORT and MORT_REGISTER table discussions for additional information on Select and Ultimate tables.)

The Ultimate table has entries for attained age from $Y_S$ to 100 (maximum), that apply for those attained ages, after the first $Y_S$ years have elapsed. For example, assume $Y_S=8$, for a policy issued at attained age of 35. The system uses the entries in the Select table, for the age at issue=35, for the first 8 years, then uses the Ultimate table thereafter. The system from there on will use the entry for attained-age=43 for year 9, 44 for year 10, etc. Therefore, an important parameter stored by the system by product is which table to use. A table is described by Select/Ultimate breakpoint (in years), and the two actual tables, the first of which has two dimensions, and the second of which is a vector.

In summary, a single set of mortality tables may apply to many products, or to just one. The system tracks the tables by carrier and product. These variables are used in the computation of death benefit and cash value amounts in Block 128 of FIG. 3B-4.

The number and application of tables in each set is specified for a given set of tables by the following product-specific flags:

Smoking/Nonsmoking tables, or just Aggregate Tables.
Preferred/Nonpreferred risk tables, or no selection on risk.
Male, Female, and Unisex tables, or just Unisex tables.

The Unisex table subset includes a table to be used in other than exception states, with auxiliary tables for specific states. A system list contains specific states for which Unisex rating is required and, if so, whether to use the standard Unisex table, or the name of a special table for that state. If normally the product selects between male/female tables, the system will instead use the Unisex table if mandated for that State by state regulatory guidelines. In addition, a separate product flag indicates if the Unisex table is to be used for any sponsored applicant (guaranteed premiums). Finally, in the sponsor table, a flag indicates whether that sponsor mandates the use of the Unisex table.

The system uses a group of default tables, characterized as 1983 GAM Mortality, which is a typical mortality assumption. However, other default tables may be used at the system operator's discretion. These tables are used for illustrations when no other mortality data is listed for a product. There are four 1983 GAM tables: Male/Female nearest age, or last age Male/Female. A flag in a product record will indicate whether or not to use these mortality tables and, if so, the default male percentage to use when blending for Unisex. The system default for the state exception table that mandates unisex rating also mandates the male percentage value.

The system also allows for the input of a rating factor for high risk, separately underwritten prospective applicants, qf. Its default value is 100%. The system formulas use qf×dx (or Rx) wherever the equations use dx (or Rx). This input will not be under the prospective applicant's control. Rather, it is provided by the system owner's operations staff or the carrier's staff. If rating is required, it triggers the generation of a new illustration, otherwise the same as the old illustration, except that the mortality charges will be based on a rating factor. The illustration is of a single product and will be printed by the system locally and mailed to the prospective applicant separately.

Set out below are a number of computational flags:

qx guideline guarantee flag: If set, qx is computed from Rx, or is tabular and is used for the first year instead of rxg in the guideline premium computations.

qx minimum guaranteed interest projection flag: If set, qx is computed from Rx, or is tabular and is used for the first year, instead of rxg, in the minimum guaranteed interest projection.

rxg(a): This is a special set of qx tables, the guaranteed monthly cost of insurance. Each is a simple table of values versus attained age. There is no Select table, just Ultimate. The system stores this information by product. A data set consists of a standard table product, plus special table(s) for specific states. For example, a product uses its standard rxg except for certain states. Each special state present points to a rxg table, but multiple special states may use the same special rxg table.

The table, standard or special, for each state, is actually several. Tables appear by sex, smoking/nonsmoking/aggregate, and age last/next, in parallel with the CSO tables. However, there is not a blend percentage for producing a unisex table for a state; rather, an explicit Unisex table is present, with the possibility of different tables for different states, and, again, a state flag that mandates the use of a Unisex table, overriding the product preference.

The formula below is used in refining the gLP and gSP.

A product flag, if set, indicates that the formula approximation is to be used. If so, the rxg(a) value is computed from the corresponding CSO(a) value as:

$$rxg(a) = \frac{\frac{CSO(a)}{12}}{\left[1 - \frac{11}{24} CSO(a)\right]}$$

Rwsp(a), rwsp(a), dwsp(a): These are the variables representing the current annual or monthly mortality, or monthly cost of insurance, for a waiver of stipulated premium benefit. These values selected from annual mortality (Rwsp(a)), monthly mortality(rwsp(a)), or monthly cost of insurance (dwsp(a)) are stored in tables by product. These values have the same structure as other mortality or cost of insurance tables. If a policy does not reference such a table, this benefit is not available for that particular policy.

Radb(a), radb(a), dadb(a): These are the variables representing the current annual or monthly mortality, or monthly cost of insurance, for accidental death benefit. These values selected from annual morality (Radb(a)), monthly mortality (radb(a)), or monthly cost of insurance (dadb(a)) are stored in tables by product. These values have the same structure as other mortality or cost of insurance tables. If a policy does not reference such a table, this benefit is not available.

Rai(a), rai(a), dai(a): These are the variables representing the current annual or monthly mortality, or monthly cost of insurance, for additional insurance coverage—the so-called term rider. These values selected from annual mortality (Rai(a)), monthly mortality (rai(a)), or monthly cost of insurance (dadb(a)) are stored in tables by product. These values have the same structure as other mortality or cost of insurance tables. If a policy does not reference such a table, this benefit is not available.

Ras(a), ras(a), das(a): These are the variables representing the current annual or monthly mortality, or monthly cost of insurance, for additional insurance coverage for the insured's spouse—the so-called joint term rider. These values selected from annual mortality (Rai(a)), monthly mortality (rai(a)), or monthly cost of insurance (dadb(a)) are stored in tables by product. These values have the same structure as other mortality or cost of insurance tables. If a policy does not reference such a table, this benefit is not available.

Rwspg(a), rwspg(a), dwspg(a), Radbg(a), radbg(a), dadbg(a), Raig(a), raig(a), daig(a), Rasg(a), rasg(a), dasg(a): These variables represent the guaranteed values for the correspondingly named current value riders listed above. This information is stored by product. The system allows for an arbitrary number of riders. For each illustration, a flag indicates whether a given rider applies (1) to the insured only, (2) to the spouse only, (3) to either (a) as individuals, and (b) if selected, on a joint payout basis.

CORR(a): The guideline premium corridor is the minimum insurance coverage or death benefit permissible under law. The death benefit computed in FIG. 3B-4, Block 128 is this factor times cash value. The values are expressed as a percent of cash value (e.g., 250 is 2.5 times cash value). The corridor data consists of a single table, by attained age. No male/female or other differentiation is made in the computation.

iC1, iC2, iCbreak: These flags identify current policy credited rates as a percentage policy of unloaned funds, and the breakpoint value on the dollar amount at which to switch from iC1 to iC2 by product. The system also allows for a no breakpoint case. The system computes, and then saves for use in formulas, the monthly rates:

$$iC1_m = (1+iC1)^{1/12} - 1$$

$$iC2_m = (1+iC2)^{1/12} - 1$$

iC guideline guarantee flag: If this flag is set, iC1 and iC2 are guaranteed for the first year, in guideline premium computations.

iC minimum interest guarantee flag: If this flag is set, iC1 and iC2 are guaranteed for the first year of the minimum guaranteed interest projection.

LPAY(n): This is the premium paid in month n. The system computes a first trial value as to the value for LPAY(1) in FIG. 3B-5, Block 108, then makes iterative trials as to the correct amount.

=LIFPAY, n=1, 13, 25, . . . , 12×LNUM−11

0, otherwise

The premium is paid annually, in the beginning of each year's first month.

LBASIS(n): This is the value for cumulative premiums paid to date, including the month n. It is computed as:

$$= \sum_{r=1}^{n} LPAY(r)$$

* $a_t$: This is the variable for the insured's age in year t of the policy.

$$= a_1 + (t-1)$$

This variable is used in equations which calculate annual amounts.

: Indicates a computation which is independent of life insurance policy size.

*: Indicates a computation which is product independent and is therefore standard for all products.

$â_n$: This variable tracks the insured's age in month n. It is used for age nearest/age last computations.

$$= a_{int[(n+11)/12]}, \text{ where int is the integer function.}$$

* Q(t): This is the variable for the probability of death, during year t, using the 1980 CSO table, a common mortality table used in the system's regulatory compliance computations in FIG. 3B-5, Block 146. Carriers commonly use this table in the calculation of guaranteed mortality. It is computed as:

$$= \frac{CSO(a_t)}{1000}$$

* P(t): This variable represents the probability of not dying in a given year. It is computed as:

$$= 1 - Q(t)$$

* tP(t): This variable represents the probability of surviving through year t. It is computed as:

$$= \prod_{s=1}^{t} P(s), \; t > 0$$

$$= 1, \; t = 0$$

tPc(t) is the variable representing the probability of two individuals surviving through a given year, t. For joint and survivor policies, the system combines the values for each of two individual insureds as follows:

Qa(t) and Qb(t) are the annual CSO mortality values for each of the two people, and Pa(t), Pb(t), and tPa(t), tPb(t) are the corresponding computed values, as shown in the formula for tP(t) above. Then, defining tPa(1)=tPb(1)=1, t=0 the system iteratively computes $Za(t) = tPa(t-1) \times [1 - tPb(t-1)] \times Qa(t)$ $Zb(t) = tPb(t-1) \times [1 - tPa(t-1)] \times Qb(t)$ $Zc(t) = tPa(t-1) \times tPb(t-1) \times Qa(t) \times Qb(t)$ $Qc(t) = [Za(t) + Zb(t) + Zc(t)]/tPc(t-1)$ $tPc(t) = tPc(t-1) \times [1 - Qc(t)]$ The iterations continue through to the max[$Na_{max}$,$Nb_{max}$]— i.e., until the youngest of the two reaches age $A_{max}$. For $t \geq t_{max}$—for values beyond the mortality table the system takes Qa(t) or Qb(t)=1. These are the same joint and survivor insurance equations that are described later in this document. The variables the tPa(t) and tPb(t) correspond to the npa and npb values discussed later.

* $N_{max}$: This variable represents the maximum number of policy years. It is computed in relation to the insured's ninety-fifth or ninety-ninth birthday, as:

$$= A_{max} - a_1 + 1$$

$N_{wsp}$: This is the variable representing the number of years that a waiver of premium benefit will be in effect. It is defined mathematically as:

$$= \min[A_{max} - a_1 + 1, \max(Nwsp(\min), LNUM)]$$

For the waiver of premium benefit, the system uses $N_{wsp}$ as the $N_{max}$. The system holds all other riders to $N_{max}$ for the insured that is covered. For all 7LP computations (see below), if the $N_{max}$ for that coverage is less than 7, the system uses the $N_{max}$ as the upper limit of the denominator's summation in the guideline premium calculations set out below.

Initially, the system uses the regulatory guideline formulas to develop an estimate of the appropriate insurance to cash value relationship. The system calculates estimates of the regulatory guideline premium amounts, and uses them as a basis for computing cash value and death benefit amounts in the system in FIG. 3B-4, Block 128. The initial estimates use approximations of the Guideline Single, Guideline Level, and Guideline Seven Pay Premium amounts. The variables for these approximations, and formulas for computing them, are set out below.

gSP: This is a variable for the estimated Guideline Single Premium (GSP). The variable is calculated as a fraction of coverage, expressed in dollars. It is first calculated as:

$$\# = \frac{\sum_{t=1}^{N_{max}} \frac{tP(t-1) \times Q(t)}{(1+insp)^t}}{1 - LPCTA(1)}$$

gLP: This is the variable for the estimated Guideline Level Premium (GLP). The variable is calculated as a fraction of coverage, expressed in dollars. It is calculated as:

$$\# = \frac{\sum_{t=1}^{N_{max}} \frac{tP(t-1) \times Q(t)}{(1+inlp)^t}}{\sum_{t=1}^{N_{max}} \frac{tP(t-1) \times [1 - LPCTA(12t-11)]}{(1+inlp)^{t-1}}}$$

7LP (or "SLP"): This is the variable for the estimated Guideline Seven Pay Premium. This variable is likewise calculated as a fraction of coverage, expressed in dollars. It is calculated as:

$$\# = \frac{\sum_{t=1}^{N_{max}} \frac{tP(t-1) \times Q(t)}{(1+inlp)^t}}{\sum_{t=1}^{7} \frac{tP(t-1)}{(1+inlp)^{t-1}}}$$

If riders are selected, the system makes a separate set of calculations to make sure that the riders that provide additional coverage for the insured likewise will meet the regulatory guidelines as to the definition of insurance. Here, the variable, $Q_{g(rider)}$ represents the guaranteed annual mortality values, Radbg(a), Raig(a) Rasg(a) for those riders offering additional term insurance benefits:

$$gSP(rider) = \left[ \sum_{t=1}^{Nmax} \frac{tP(t-1) Q_{g(rider)}(t)}{(1+insp)^t} \right] / [1 - LPCTA(1)]$$

$$gLP(rider) = \left[ \frac{\sum_{t=1}^{Nmax} \frac{tP(t-1) Q_{g(rider)}(t)}{(1+inlp)^t}}{\sum_{t=1}^{Nmax} \frac{tP(t-1)[1 - LPCTA(12t-11)]}{(1+inlp)^{t-1}}} \right]$$

Note: LPCTA(12t–11)=0 for t>LNUM $$7LP(rider) = \left[ \frac{\sum_{t=1}^{Nmax} \frac{tP(t-1) Q_{g(rider)}(t)}{(1+inlp)^t}}{\sum_{t=1}^{7} \frac{tP(t-1)}{(1+inlp)^{t-1}}} \right]$$

SA: This is the variable for the policy's Specified Amount. The Specified Amount, a common life insurance expression, is equal to the basic, stated policy death benefit (the face amount of the policy.) The policy death benefit will remain equal to the Specified Amount until such time as changes in cash value cause it to change. Withdrawals of cash value or cash value growth may cause a decrease or increase in the death benefit. The Specified Amount appears on page three of a life insurance policy. The Specified Amount formula uses boolean logic designed to assure compliance with the regulatory guidelines. It is computed as:

$$= \max \left\{ PRIN, \frac{LIFPAY}{SLP}, \min \left[ \frac{LIFPAY}{gLP}, \frac{LIFPAY}{\left(\frac{gSP}{LNUM}\right)} \right] \right\}$$

The system records which of the three cases determined SA.

If the computation includes riders, then the above formula will change in order to take into account riders:

$$\max \left\{ PRIN, \frac{(LIFPAY - \Sigma_{rider} (7LP(rider) \times Benefit(rider))}{SLP}, \right.$$

$$\min \left[ \frac{LIFPAY - \Sigma_{rider} gLP(rider) \times Benefit(rider)}{gLP}, \right.$$

$$\left. \left. \frac{LIFPAY - \Sigma_{rider} gSP(rider) \times Benefit(rider)}{LNUM} \right] \right\}$$
$$\left(\frac{gSP}{LNUM}\right)$$

\# cx(n): This variable computes the monthly cost of insurance.

$$= \frac{\frac{Rx(a_n)}{12}}{1 - \frac{Rx(a_n)}{12}}$$

The variable cx(n) is computed for a prospective applicant for a product, and saved by the system. The system also allows for cx(n) to be table-driven instead of being computed as above from Rx. In this case, tables dx, as follows, are present instead of Rx.

$dx(\hat{a}_n)$: This is the monthly cost of insurance for a person of attained age a. The system uses the same kind of multiple tables with selection factors, etc., that apply to Rx, including state-dependent unisex requirements and tables. This permits carriers which have non-standard actuarial approaches to the conversion of annual mortality figures into monthly figures to use the system. In this case:

$$rx(n)=dx(\hat{a}_n$$

The system computes mortality values differently for joint and survivor policies in Block 88. This is because such policies pay a benefit only on the last of two deaths. The system calculates the joint probabiility figures by first taking the existing cost of insurance values for each individual using the c(n) value defined above and converting it into a probability figures using the following formula:

$$q(n)=c(n)/[1+c(n)]$$

Next, the system creates a combined mortality computation for both individuals using three variables:

qa(n) is the variable for the likelihood of death, q, for the month, n, for the first insured, "a."

qb(n) is the variable for the likelihood of death, q, for the month, n, for the second insured, "b."

npa(n), npb(n), npc(n) are the variables for the probablity of survival through month n for person "a," person "b," and jointly, "c."

qc(n), the joint probability of deaths, is computed by the system as:

$$qc(n) = [npa(n-1)qa(n) + npb(n-1)qb(n) - npa(n-1)npb(n-1) [qa(n) + qb(n) - qa(n)qb(n)]]/npc(n-1)$$

In making this computation the system sets qa(n) and qb(n) equal to 1 for any n value greater than the maximimum age set by the system.

Finally, in calculating the cost of insurance, the system converts qc(n) back into cost of insurance according to the formulas set by the carrier.

The cash value computations in FIG. 3B-4, Block 128 are iterative. The system starts with CV(0)=0. The cash value at the start of the contract is always equal to zero.

CVI(n): This is an intermediate value, calculated for the beginning of month n:

$$=CV(n-1)+LPAY(n)-LEXP(n)-[LPCT(n) \times LPAY(n)]$$

AAR(n): This variable computes the amount by which the carrier is at risk in any month n. It is calculated as:

$$= \max \left\{ \frac{SA}{mlp} - CVI(n), \left[ \frac{CORR(\hat{a}_n)}{100} - 1 \right] \times CVI(n) \right\}$$

COI(n): This variable computes the cost of insurance charge for a given month n $$=cx(n) \times ARR(n)$$

if riders are present this expression is expanded to:

$$= \left[ cx(n) + \sum_{(rider)} cx_{(rider)}(n) \times ARR(n) \right]$$

The system sets the cost of the rider to zero when the rider expires.

The following variables are used for the computation of cash values and interest rate breakpoints. Breakpoint formulas include:

NCV(n): This is the net pre-interest cash value, end of month n. It is computed as:

$$=CVI(n)-COI(n)$$

NCV1(n): Part 1, up to the break:

$$=\min(NCV(n), iCbreak)$$

NCV2(n): Part 2, above the break:

$$=\max(0, NCV(n)-iCbreak)$$

INTC(n): This is the variable for interest credited in a given month n. It is computed as:

$$NCV1(n) \times iC1_m + NCV2(n) \times iC2_m$$

CV(n): This is the variable that computes the end of monthly life insurance cash value. It is equal to:

$$=CVI(n)-COI(n)+INTC(n)$$

MINS(n): This is the variable for the life insurance death benefit for month n. It is the larger of the estimated guideline amount calculated in SA, or the insurance corridor amount, multiplied by the Cash Value:

$$=\max\{SA, CORR(\hat{a}_n) \times CV(n)\}$$

The system's first trial as to the premium amount needed to fund the policy is calculated using the 7LP formula. The system replaces Q(t) with Qx($a_t$) for this computation; if only a value for qx($a_t$) is available, the system uses 12×qx ($a_t$). The system sets inlp equal to (iC1+iC2)/2, and sums to LNUM instead of using 7 in the denominator.

For any solved policy in FIG. 3B-5, Block 148, the system must check that it conforms with regulatory limits on the size of premium for the policy cash value. The original gSP and gLP rates were approximations. The estimated guideline amounts are rates, expressed as dollars of premium divided by dollars of insurance, where the estimated GLP=gLP×SA, and the estimated GSP=gSP×SA. The system next finds the actual GLP and GSP for this policy in FIG. 3B-5, Block 146, both to report to the carrier, and to check that the illustrated policy conforms to tax rules governing insurance in FIG. 3B-5, Block 148. To do this, the system reruns the insurance LIFPAY calculation, but with a change of certain parameters and tables, and with a new target. If riders are present, the system calculates the guidelines GLP and GSP for the base policy assuming no riders, then for the combined policy including riders. These data too are reported to the carrier.

In these re-illustrations:

The system saves the entire results of the preceding insurance computation in FIG. 3B-5, Block 154, since they may remain valid. In particular, the system lets $SA_r$=SA, $LIFPAY_r$=LIFPA, each from the previously solved insurance run.

The system then uses rxg($\hat{a}_n$) tables instead of the tabulated or computed rx(n) values. The systems checks, however, the qx guarantee flag for guideline premiums. If it is set, the system uses rx(n) instead of rxg($\hat{a}_n$) in the first year. For COI(n), n=1 to 12, the guaranteed rate is assumed to be equal to the current rate, for those carriers that guarantee the first year's mortality charges.

The system freezes SA in the GSP/GLP runs at $SA_r$. It does not use the formula previously shown for the computation of SA. Therefore, the system skips the computations for Q(t), P(t), tP(t), gSP, gLP, 7LP, and SA in this iteration.

The target in each iteration is to find the value for LIFPAY that achieves $CV(12N_{max})=SA_r$. The cash value at the end of the insurance policy must equal the Specified Amount the system just projected and saved. None of the standard insurance targets apply. However, the system checks and reports if the projected cash value drops below zero, CV(n)≦0, any n, throughout the projection.

For The Actual Regulatory GSP: The system first assumes:

LNUM=1, is a single premium, in the first month of the policy.

$$iC1=iC2=\max(insp, IRS\_insp)$$

where IRS_insp is a system parameter. This value can be 6 percent. The resulting LIFPAY computed by the system is the new Guideline Single Premium, $GSP_a$.

For The Actual Regulatory GLP: The system assumes:

$$LNUM=\min(N_{max}, 95-a_1+1)$$

$$iC1=iC2=\max(inlp, IRS\_inlp)$$

where IRS_inlp is a system parameter. This value is usually four percent for most carriers.

The resulting LIFPAY computed by the system is the new Guideline Level Premium, $GLP_a$.

With riders present, the system must determine the GLP/GSP with riders. The system saves those just found as the base policy riders, $GLP_{base}$ and $GSP_{base}$. Next, the system resets the target SA to the last saved total value, $SA_r$, restores the riders to the COI determination, and reruns the GLP and GSP determination process. These are the total guideline premiums. From these, the system determines the portion to be ascribed to all the riders as a unit, $$GLP(rider)=GLP_{total}-GLP_{base}$$

$$GSP(rider)=GSP_{total}-GSP_{base}$$

and, if a new iteration for the true insurance is required, these will be used in place of the equations therefore used in the first pass.

Both GSP and GLP (base and rider components, if riders are present) as finally computed will be reported to the carrier, as part of the insurance issuance process. First, they are used to confirm that the system has met the guidelines, and that the system is not buying excess insurance over the guidelines. To do this, it computes the new gLP and gSP for the base insurance as:

$$gSP=GSP_{base}/SA_b$$

$$gLP=GLP_{base}/SA_b$$

The system recomputes the Specified Amount using the SA equation and the new gSP and gLP values for the base insurance, modified if riders are present, with the new GLP(riders) and GSP(riders) just determined, and calls this new value $SA_a$; if $SA_a=SA_r$, the system has finished.

If not, and this is not the first pass through this determination, there will be a previous LIFPAY, called $LIFPAY_{prev}$; the system compares $LIFPAY_{prev}$ to the saved $LIFPAY_r$. If the difference is significant—greater than, say, $1.00—or if this is the first pass, the system saves $LIFPAY_r$ as $LIFPAY_{prev}$, then re-solves the "real insurance" problem using the new gSP and gLP and GSP(riders) and GLP(riders) if any—i.e., with $SA=SA_a$—then redetermines the GSP, GLP, and new $SA_a$, and repeats the test.

When it has completed the aforementioned regulatory guideline computations, the system computes a projection of insurance cash values based upon carrier guaranteed rates for the minimum credited interest and maximum mortality charges in Block 152. This projection is unrealistic and will look unattractive to the applicant. (See Guaranteed Life Insurance Values, in FIG 27D. However, by current law this projection must be presented to the prospective applicant. The cash value will in many instances drop to below zero before the end of the required period. The system continues the computation, but the display shows the insurance lapsing in the first month the cash value is negative.

This projection therefore uses the LIFPAY and LNUM for the actual projected insurance premium values, the $rxg(â_n)$ table(s) in place of rx(n) table/formula, and iC1=iC2=inlp. However, if the iC year-one guarantee flag for this projection is set because the carrier guarantees its first year rate, the system uses iC1 and iC2 for n=1 to 12. These are used to compute INTC(n). Similarly, if the qx year-one guarantee flag for this projection is set because the carrier guarantees the first year mortality changes, the systems uses rx(n) instead of $rxg(â_n)$, for n=1 to 12 for the first year.

The system also computes the required policy cost indices, see Block 153, FIG. 3B-5, for each insurance product illustrated. These are the Surrender Cost Index At 5%, also called the Interest Adjusted Net Cost Index (IANC), and the Net Payment Cost Index At 5%. The formulas are noted below:

Surrender Cost Index At 5% at year t:

$$IANC(t) = \frac{LIFPAY \sum_{i=1}^{LNUM} (1+INVI)^{t-i+1} - CV(12t)}{SA \sum_{i=1}^{t} (1+INVI)^i}$$

where INVI is the investment interest rate, here assumed to be 5%. The cash value term, CV(12t), is the illustrated cash value at the end of policy year t. The Surrender Cost Index is typically computed for years 10 and 20 of the policy.

Similarly, the Net Payment Cost Index (NPI), Formula is identical to IANC(t) except that the cash value term CV(12t) is omitted, as shown below:

Net Payment Cost Index At 5% at year t:

$$NPI(t) = \frac{LIFPAY \sum_{i=1}^{LNUM} (1+INVI)^{t-i+1}}{SA \sum_{i=1}^{t} (1+INVI)^i}$$

Discussion of FIGS. 27A–E and 29A–B

FIGS. 27A–E, 28, and 29A–B provide samples of part of the output that would be printed on the user's printer, FIGS. 27A–27E collectively provide an example of the textual data which would be merged with illustration data in order to create an illustration. In FIG. 28 provides an example of textual data that can be combined with multiple illustration data to allow users to compare various policies identified by the system. FIGS. 29A–29B collectively provide an example of textual data than can be merged with client data to provide a completed insurance application form.

Conclusion

While this invention has been particularly shown and described with reference to a preferred embodiment, it will be readily appreciated by those of ordinary skill in the art that various changes and modifications may be made without departing from the spirit or scope of the invention. For example, the particular formats of the various display screens or output herein described may be modified, as desired. Likewise, the present invention should not be limited to the specific examples described herein since a greater or lesser number of options and functions for each of the menus and submenus that may be displayed on a CRT or VDT are within the scope of this invention. It is, therefore, contemplated that the appended claims be interpreted as including the foregoing and other changes and modifications.

We claim:

1. A method for using a digital computer processing electrical signals, the method comprising the steps of:
   modifying electrical signals in a a digital electrical computer having a programmed processor, means for inputting data electrically connected to the computer, and means for outputting processed data electrically connected to the computer, the modifying being carried out by:
   entering first data representing a first universal life insurance policy at the means for inputting data to the computer so as to convert the entered first data into electrical signals for processing by the computer;
   entering second data representing a second universal life insurance policy at the means for inputting data to the computer so as to convert the entered second data into electrical signals for processing by the computer;
   entering selection data representing at least one criteria for selecting between the universal life insurance policies at the means for inputting data to the computer so as to convert the entered selection data into electrical signals for processing by the computer;
   engaging the programmed processor to modify electrical signals in the computer so as to compute to produce electrical signals representing processed data for each said universal life insurance policy in accordance with the entered selection criteria;
   engaging the programmed processor to modify electrical signals in the computer so as to compare the processed data in accordance with the selection data to form electrical signals representing a selection between the insurance policies; and
   converting the electrical signals representing the selection into output at the means for outputting processed data.

2. The method of claim 1, wherein the method is carried out without a second digital computer.

3. The method of claim 1, further comprising the step of:
   entering third data characterizing a prospective purchase of insurance at the means for inputting data to the computer so as to convert the entered third data into electrical signals for processing by the computer; and wherein
   insurance premium is the entered selection criteria;
   said step of engaging the programmed processor to modify electrical signals in the computer so as to compute to produce electrical signals representing processed data for each said universal life insurance policy includes generating electrical signals representing a premium corresponding to each of the universal life insurance policies in response to the third entered data; and
   the selection between the universal life insurance policies includes identifying which of the universal life insurance policies has a lesser insurance premium.

4. The method of claim 1, further comprising the step of:
   entering third data characterizing a prospective purchase of insurance at the means for inputting data to the computer so as to convert the entered third data into electrical signals for processing by the computer; and wherein cash value at a future time is the input selection criteria;

said step of engaging the programmed processor to modify electrical signals in the computer so as to compute to produce electrical signals representing processed data for each said universal life insurance policy includes generating electrical signals representing a cash value at the future time for each of the universal life insurance policies in response to the third entered data; and the selection between the universal life insurance policies includes identifying which of the universal life insurance policies has a greater cash value at the future time.

5. The method of claim 1, further comprising the step of:

entering third data characterizing a prospective purchase of insurance at the means for inputting data to the computer so as to convert the entered third data into electrical signals for processing by the computer; and wherein death benefit is the entered selection criteria;

said step of engaging the programmed processor to modify electrical signals in the computer so as to compute to produce electrical signals representing processed data for each said universal life insurance policy include generating electrical signals representing a death benefit for each of the universal life insurance policies in response to the third entered data; and the selection between the universal life insurance policies includes identifying which of the universal life insurance policies has a greater death benefit.

6. The method of claim 1, further comprising the step of:

entering third data characterizing a prospective purchase of insurance at the means for inputting data to the computer so as to convert the entered third data into electrical signals for processing by the computer; and wherein paid-up policy which remains in force for the longest period of time is the entered selection criteria;

said step of engaging the programmed processor to modify electrical signals in the computer so as to compute to produce electrical signals representing processed data for each said universal life insurance policy includes generating electrical signals representing a paid-up policy which remains in force for the longest period of time for each of the universal life insurance policies in response to the third entered data; and the selection between the universal life insurance policies includes identifying which of the universal life insurance policies has a greater paid-up policy which remains in force for the longest period of time.

7. The method of any one of claims 1-6, further comprising the steps of:

entering further data representing a further universal life insurance policy at the means for inputting data to the computer so as to convert the entered further data into electrical signals for processing by the computer;

storing the data representing the universal life insurance policies in memory accessible by the processor;

entering state data characterizing more than one state, each said state corresponding respectively to one of the universal life insurance policies, at the means for inputting data to the computer so as to convert the entered state data into electrical signals for processing by the computer; and engaging the programmed processor to modify electrical signals in the computer so as to identify the universal life insurance policies in response to the entered state data.

8. The method of claim 1, wherein the step of engaging the programmed processor to modify electrical signals in the computer so as to compute to produce electrical signals representing processed data for each said universal life insurance policy includes producing the processed data by interpolation.

9. The method of claim 1, wherein the step of engaging the programmed processor to modify electrical signals in the computer so as to compute to produce electrical signals representing processed data for each said universal life insurance policy includes producing the processed data by iteration.

10. The method of claim 1, further comprising the steps of:

entering rider data characterizing a rider for at least one of the first universal life insurance policies at the means for inputting data to the computer so as to convert the entered rider data into electrical signals for processing by the computer; and wherein the step of engaging the programmed processor to modify electrical signals in the computer so as to compute to produce electrical signals representing processed data for each said universal life insurance policy includes computing in response to the entered rider data.

11. The method of claim 10, wherein the step of entering rider data is carried out by entering data characterizing an accidental death and disability rider.

12. The method of claim 10, wherein the step of entering rider data is carried out by entering data characterizing a spousal death benefit rider.

13. The method of claim 10, wherein the step of entering rider data is carried out by entering data characterizing a waiver of premium rider.

14. The method of claim 1, wherein at least one of the steps of entering data representing one of the universal life insurance policies includes entering data representing an insurance policy for more than one insured.

15. The method of claim 1, wherein the step of engaging the programmed processor to modify electrical signals in the computer so as to compute to produce electrical signals representing processed data for each said universal life insurance policy is carried out by calculating interest credited from indexed values for at least one of the universal life insurance policies.

16. The method of claim 1, wherein the first data includes mortality rates corresponding to the first universal life insurance policy, the second data includes mortality rates corresponding to the second universal life insurance policy, the rates being stored in memory accessible by the processor; and wherein the step of engaging the programmed processor to modify electrical signals in the computer so as to compute to produce electrical signals representing processed data for each said universal life insurance policy is carried out by accessing the rates in the memory.

17. The method of claim 1, wherein the first data includes interest rates corresponding to the first universal life insurance policy, the second data includes interest rates corresponding to the second universal life insurance policy, the rates being stored in memory accessible by the processor; and wherein the step of engaging the programmed processor to modify electrical signals in the computer so as to compute to produce electrical signals representing processed data for each said universal life insurance policy is carried out by accessing the rates in the memory.

18. The method of claim 1, wherein the programmed processor is programmed to have at least one flag settable for identifying respective carriers of the universal life insurance policies; and wherein the step of engaging the programmed processor to modify electrical signals in the computer so as to compute to produce electrical signals representing processed data for each said universal life insurance policy includes setting the flag.

19. The method of claim 10, wherein the programmed processor is programmed to have at least one flag settable for selecting different methods of calculating rider values; and wherein the step of engaging the programmed processor to modify electrical signals in the computer so as to compute to produce electrical signals representing processed data for each said universal life insurance policy includes setting the flag.

20. The method of claim 1, wherein:
the step of entering first data representing a first universal life insurance policy at the means for inputting data to the computer is carried out for a policy of a first carrier;
the step of entering second data representing a second universal life insurance policy at the means for inputting data to the computer is carried out for a policy of a second carrier; and the steps of entering are carried out to correspond to the respective carriers' policy requirements.

21. The method of any one of claims 1–6, further comprising the steps of:
entering further data representing a further universal life insurance policy at the means for inputting data to the computer so as to convert the entered further data into electrical signals for processing by the computer;
storing the data representing the universal life insurance policies in memory accessible by the programmed processor; and wherein
the step of engaging the programmed processor to modify electrical signals in the computer so as to compare the processed first data with the processed second data and make a selection between the insurance policies includes generating electrical signals representing a ranking of the insurance policies to reflect the selection.

22. The method of claim 21, wherein cash value of the respective the life insurance policies is the selection data.

23. The method of claim 21, wherein credit rating of respective carriers for the life insurance policies is the selection data.

24. The method of claim 21, wherein death benefit for the life insurance policies is the selection data.

25. The method of claim 21, wherein year in-force for the life insurance policies is the selection data.

26. The method of claim 21, wherein premium amount the life insurance policies is the selection data.

27. A digital computer apparatus for processing electrical signals, the apparatus comprising:
a digital electrical computer having a programmed processor modifying electrical signals, means for inputting data electrically connected to the computer, and means for outputting processed data electrically connected to the computer;
wherein said programmed processor enables:
entering first data representing a first universal life insurance policy at the means for inputting data to the computer so as to convert the entered first data into electrical signals for processing by the computer;
entering second data representing a second universal life insurance policy at the means for inputting data to the computer so as to convert the entered second data into electrical signals for processing by the computer;
entering selection data representing at least one criteria for selecting between the universal life insurance policies at the means for inputting data to the computer so as to convert the entered selection data into electrical signals for processing by the computer;
modifying electrical signals in the computer so as to compute to produce electrical signals representing processed data for each said universal life insurance policy in accordance with the entered selection criteria;
modifying electrical signals in the computer so as to compare the processed data in accordance with the selection data to form electrical signals representing a selection between the insurance policies; and
converting electrical signals representing the selection into output at the means for outputting processed data.

28. The apparatus of claim 27, wherein the apparatus does not comprise a second digital computer.

29. The apparatus of claim 27, wherein the programmed processor enables:
entering third data characterizing a prospective purchase of insurance at the means for inputting data to the computer so as to convert the entered third data into electrical signals for processing by the computer; and wherein
insurance premium is the entered selection criteria;
the programmed processor enables the modifying electrical signals in the computer so as to compute to produce electrical signals representing processed data for each said universal life insurance policy by generating electrical signals representing a premium corresponding to each of the universal life insurance policies in response to the third entered data; and
the selection between the universal life insurance policies includes identifying which of the universal life insurance policies has a lesser insurance premium.

30. The apparatus of claim 27, wherein the programmed processor enables:
entering third data characterizing a prospective purchase of insurance at the means for inputting data to the computer so as to convert the entered third data into electrical signals for processing by the computer; and wherein
cash value at a future time is the input selection criteria;
the programmed processor enables the modifying electrical signals in the computer so as to compute to produce electrical signals representing processed data for each said universal life insurance policy by generating electrical signals representing a cash value at the future time for each of the universal life insurance policies in response to the third entered data; and
the selection between the universal life insurance policies includes identifying which of the universal life insurance policies has a greater cash value at the future time.

31. The apparatus of claim 27, wherein the programmed processor enables:
entering third data characterizing a prospective purchase of insurance at the means for inputting data to the computer so as to convert the entered third data into electrical signals for processing by the computer; and wherein death benefit is the entered selection criteria;

the programmed processor enables the modifying electrical signals in the computer so as to compute to produce electrical signals representing processed data for each said universal life insurance policy by generating electrical signals representing a death benefit for each of the universal life insurance policies in response to the third entered data; and the selection between the universal life insurance policies includes identifying which of the universal life insurance policies has a greater death benefit.

32. The apparatus of claim 27, wherein the programmed processor enables:

entering third data characterizing a prospective purchase of insurance at the means for inputting data to the computer so as to convert the entered third data into electrical signals for processing by the computer; and wherein paid-up policy which remains in force for the longest period of time is the entered selection criteria;

the programmed processor enables the modifying electrical signals in the computer so as to compute to produce electrical signals representing processed data for each said universal life insurance policy by generating electrical signals representing a paid-up policy which remains in force for the longest period of time for each of the universal life insurance policies in response to the third entered data; and the selection between the universal life insurance policies includes identifying which of the universal life insurance policies has a greater paid-up policy which remains in force for the longest period of time.

33. The apparatus of any one of claims 27–32, wherein the programmed processor enables:

entering further data representing a further universal life insurance policy at the means for inputting data to the computer so as to convert the entered further data into electrical signals for processing by the computer;

storing the data representing the universal life insurance policies in memory accessible by the processor;

entering state data characterizing more than one state, each said state corresponding respectively to one of the universal life insurance policies, at the means for inputting data to the computer so as to convert the entered state data into electrical signals for processing by the computer; and modifying electrical signals in the computer so as to identify the universal life insurance policies in response to the entered state data.

34. The apparatus of claim 27, wherein the programmed processor includes means for interpolating to produce the processed data.

35. The apparatus of claim 27, wherein the programmed processor includes means for iterating to produce the processed data.

36. The apparatus of claim 27, wherein the programmed processor enables:

entering rider data characterizing a rider for at least one of the first universal life insurance policies at the means for inputting data to the computer so as to convert the entered rider data into electrical signals for processing by the computer; and wherein the modifying electrical signals in the computer so as to compute to produce electrical signals representing processed data for each said universal life insurance policy includes computing in response to the entered rider data.

37. The apparatus of claim 36, wherein the enables entering data characterizing an accidental death and disability rider.

38. The apparatus of claim 36, wherein the programmed processor enables entering data characterizing a spousal death benefit rider.

39. The apparatus of claim 36, wherein the programmed processor enables entering data characterizing a waiver of premium rider.

40. The apparatus of claim 27, wherein the programmed processor enables entering data representing an insurance policy for more than one insured.

41. The apparatus of claim 27, wherein the programmed processor enables the computing to produce electrical signals representing processed data for each said universal life insurance policy by calculating interest credited from indexed values for at least one of the universal life insurance policies.

42. The apparatus of claim 27, wherein the first data includes mortality rates corresponding to the first universal life insurance policy, the second data includes mortality rates corresponding to the second universal life insurance policy, the rates being stored in memory accessible by the processor; and wherein the programmed processor enables the modifying electrical signals in the computer so as to compute to produce electrical signals representing processed data for each said universal life insurance policy by accessing the rates in the memory.

43. The apparatus of claim 27, wherein the first data includes interest rates corresponding to the first universal life insurance policy, the second data includes interest rates corresponding to the second universal life insurance policy, the rates being stored in memory accessible by the processor; and wherein the programmed processor enables modifying electrical signals in the computer so as to compute to produce electrical signals representing processed data for each said universal life insurance policy by accessing the rates in the memory.

44. The apparatus of claim 27, wherein the programmed processor includes at least one flag settable for enabling one of a plurality of portions of the programmed processor, each of the portions corresponding to respective carriers of the universal life insurance policies; and wherein the programmed processor enables modifying electrical signals in the computer so as to compute to produce electrical signals representing processed data for each said universal life insurance policy by setting the flag.

45. The apparatus of claim 27, wherein the programmed processor includes at least one flag settable for enabling one of a plurality of portions of the programmed processor, each of the portions corresponding respectively to different apparatus of calculating rider values; and wherein the programmed processor enables modifying electrical signals in the computer so as to compute to produce electrical signals representing processed data for each said universal life insurance policy by setting the flag.

46. The apparatus of claim 27, wherein the programmed processor enables:

the entering first data representing a first universal life insurance policy at the means for inputting data to the computer by linking the policy with a first carrier;

the entering second data representing a second universal life insurance policy at the means for inputting data to the computer by linking the policy with a second carrier; and the programmed processor enables the entering to distinctly correspond to policy requirements of the respective carriers.

47. The apparatus of any one of claims 27–32 or 33–39, wherein the programmed processor enables:

entering further data representing a further universal life insurance policy at the means for inputting data to the computer so as to convert the entered further data into electrical signals for processing by the computer;

storing the data representing the universal life insurance policies in memory accessible by the processor; and wherein the programmed processor enables the modifying electrical signals in the computer so as to compare the processed first data with the processed second data and make a selection between the insurance policies by generating electrical signals representing a ranking of the insurance policies to reflect the selection.

48. The apparatus of claim 47, wherein the programmed processor enables receipt of credit rating of the respective carriers for the life insurance policies as the selection data.

49. The apparatus of claim 47, wherein the programmed processor enables receipt of cash value of the respective the life insurance policies as the selection data.

50. The apparatus of claim 47, wherein the programmed processor enables receipt of death benefit for the life insurance policies as the selection data.

51. The apparatus of claim 45, wherein the programmed processor enables receipt of year in-force for the life insurance policies as the selection data.

52. The apparatus of claim 45, wherein the programmed processor enables receipt of premium amount the life insurance policies as the selection data.

* * * * *